US005793938A

United States Patent [19]

Jackson, Jr.

[11] Patent Number: 5,793,938

[45] Date of Patent: Aug. 11, 1998

[54] DOCUMENT PRINTING MANAGEMENT SYSTEM

[75] Inventor: Willie A. Jackson, Jr., Sugarland, Tex.

[73] Assignee: IKON Office Solutions, Inc., Wayne, Pa.

[21] Appl. No.: 579,870

[22] Filed: Dec. 28, 1995

[51] Int. Cl.$^{6}$ .............................. B41B 15/00; B41J 15/00; G06F 15/00

[52] U.S. Cl. .............................................. 395/114; 395/117

[58] Field of Search ...................................... 395/114, 117, 395/110, 112, 789, 101, 784, 785; 358/296, 468, 401, 407

[56] References Cited

U.S. PATENT DOCUMENTS

| | | | |
|---|---|---|---|
| 5,126,858 | 6/1992 | Kurdgane et al. | 358/450 |
| 5,528,742 | 6/1996 | Moore et al. | 395/145 |

OTHER PUBLICATIONS

Booklet, *Getting Started—Acrobat Exchange 2.0* ©1995 Adobe Systems Inc., pp. i–v, 1–3, 27–32.

*Primary Examiner*—Kim Yen Vu
*Assistant Examiner*—Kimberly A. Wiliams
*Attorney, Agent, or Firm*—Howson and Howson

[57] ABSTRACT

A computer-aided document printing management system for the seamless transmission and reproduction of documents, created in digital format at a computer terminal, at a remote high-speed printing facility. The documents are reformatted and compressed into a cross-platform format with all resources for printing necessary at the facility. The documents and an electronic work order entered at the computer terminal are compressed into a single electronic folder for transmission to the printing facility, where it is decompressed and separated into work order and job databases for printing according to the instructions therein. The reformatted documents may be previewed before transmission to the facility, audited for compression integrity at both the computer terminal and at the facility, and the files maintained in a central storage facility after the work order is completed.

18 Claims, 4 Drawing Sheets

DOCUMENT PRINTING MANAGEMENT SYSTEM

APPENDIX

Appended hereto constitute the source code for the program installed at a computer terminal transmitting files; and Appended hereto constitute the source code for the program installed at a printing facility.

SUMMARY OF THE INVENTION

This invention relates generally to the printing of documents which have been stored and/or transmitted in digital format. More particularly, it relates to a document printing management system in which documents in digital format and an electronic work order are submitted for high-speed printing at a remote facility.

There are two traditional methods for quantity reproduction of documents which were created in digital format at a computer terminal. One of the most common is to print a "hard copy" of the document on a conventional desktop printer and deliver the printed document to a high-speed printing facility for copying, collating, finishing and distribution. This method is acceptable as long as the hard copy image is sharp and clean, and appropriate quality controls are employed by the printing facility. Unfortunately, the hard copy is usually made on a desktop printer with 300×300 or 600×600 dots per inch (dpi) resolution, and any reproductions will be at least one generation lower in print quality. Even when the hard copy image is produced on a 1200 dpi printer, the quality of high-speed reproductions is diminished in the reproduction process.

Another method for high speed reproduction is to transmit the document in digital format from a computer terminal directly to the high-speed printing facility. This method offers better quality documents because they are reproduced according to printer command language embedded in the document. The document is usually delivered to the printing facility in digital portable document format, such as Hewlett-Packard PCL™ or ADOBE PostScript™ printer language.

However, documents prepared in this manner have limitations which affect their so-called seamless transfer to a printing facility. For example, software applications do not follow a standard user interface for downloading to high-speed printing facilities, the procedures from software program to software program being different and often obscure. When downloading a portable document file to the storage media at a high speed printing facility, the operator must know what procedures are required for each software application in order to embed in the portable document file all resources used, such as pages, fonts and graphics. If the operator fails to do this, he produces a file merely referencing the resources. The actual resources remain in the original document software and are not delivered to the printing facility. The printing facility must then embed the resources. This increases costs to the customer, interrupts the smooth transfer of the documents to the printer, and exposes the documents to errors in resource embedments not recognizable at the printing facility.

If the printing facility's storage medium receiving the portable document file already has a significant amount of graphic image data in storage, the downloading process becomes extremely time-consuming, particularly if the document and resources are delivered through a network. The amount of data transferred across the network may be so large that it significantly impedes network operation and may even cause all other network system resources to become suspended while the portable document file is being transferred. Even then, there is no assurance that all the required printer commands or resources have been properly embedded in the portable document file received at the printing facility until the document is actually printed. Portable document files, when properly created, may also contain redundant amounts of font and graphic resources causing the files to be extremely large, and delivery of these large files to the printing facility can create a problem because of limitations in the facility's storage media.

Accordingly, it is an object of the invention to provide a computer-aided method for uninterrupted delivery to a high-speed printing facility of original documents in digital format with all printer commands and resources embedded.

Another object is to provide a method in which documents in a digital cross-platform format can be viewed at a local computer terminal before delivery to a high-speed printing facility.

A further object is to provide a method for delivering documents in digital format with a work order and printing instructions from a computer terminal to a remote high-speed printing facility.

Still another object is to provide a method which allows documents in cross-platform format to be submitted by various modes of delivery to a high-speed printing facility.

A still further object is to provide a document printing management system in which documents are received with an electronic work order by a high speed printing facility for review of work requirements and immediate printing or scheduling.

These and other objects of the invention are achieved in a seamless, or uninterrupted, computer-aided method for producing at a remote high-speed printing facility, documents created in digital format at a computer terminal. The documents are transformed and compressed into a document file cross-platform formatted with all resources including fonts and graphics embedded and previewed. Electronic work order and audit files are prepared at the terminal, and compressed, audited for compression integrity, and transmitted to the printing facility where the files are decompressed and separated into work order and job databases. The work order is printed out on a desktop printer and merged with the job database by facility personnel for printing the documents according to the embedded resource and the instructions in the work order. The work order and the document files are also transmitted to a central storage where a database is maintained for all work performed.

Further objects, advantages and details of the invention will be apparent from the following detailed description, read in conjunction with the accompanying drawings.

DETAILED DESCRIPTION

Figure 1A:
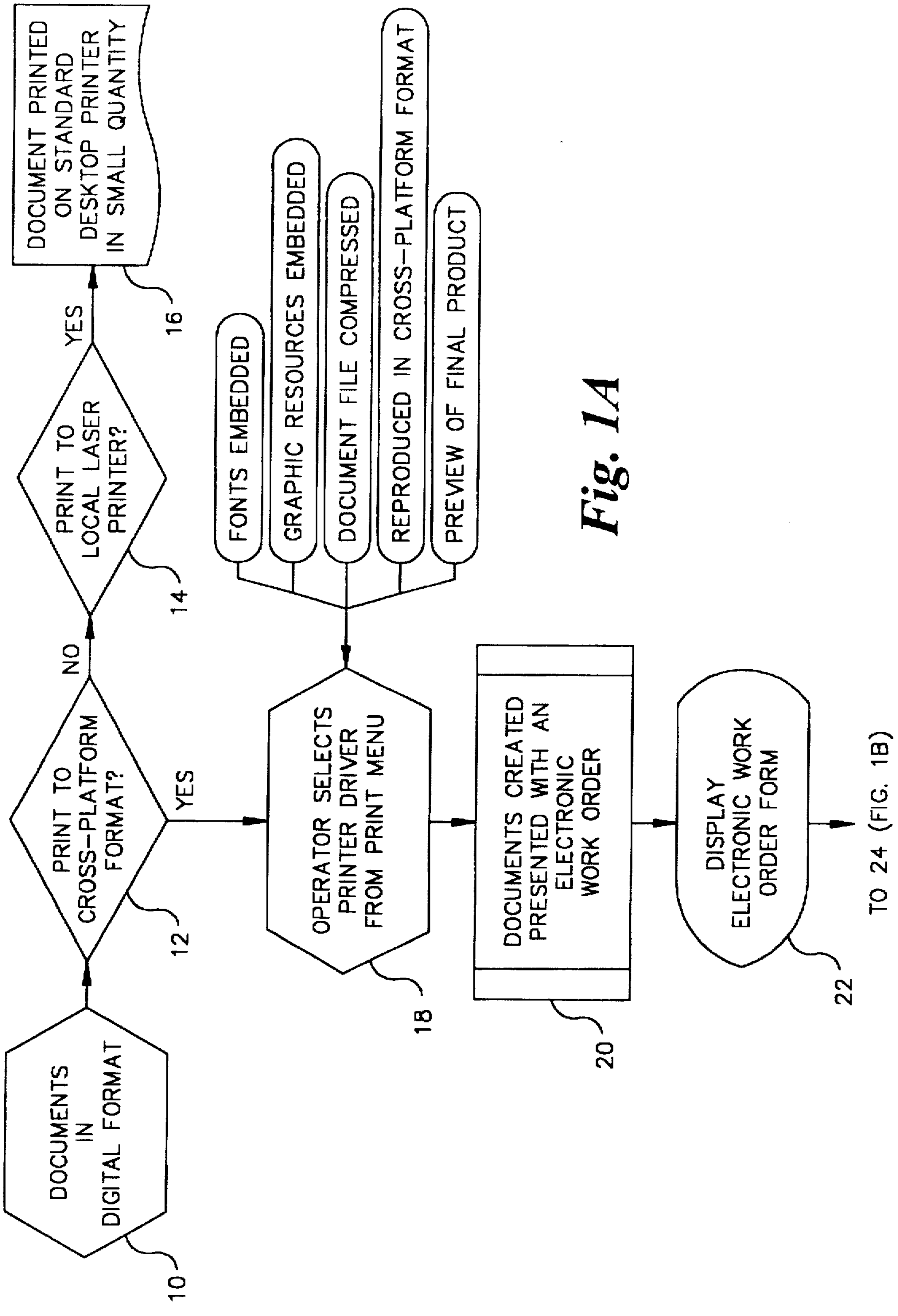
FIGS. 1*a*, 1*b*, 1*c* and 1*d*, inclusive, represent a flow chart depicting a computer-aided method for an improved document printing management system according to principles of the present invention.
Figure 1B:
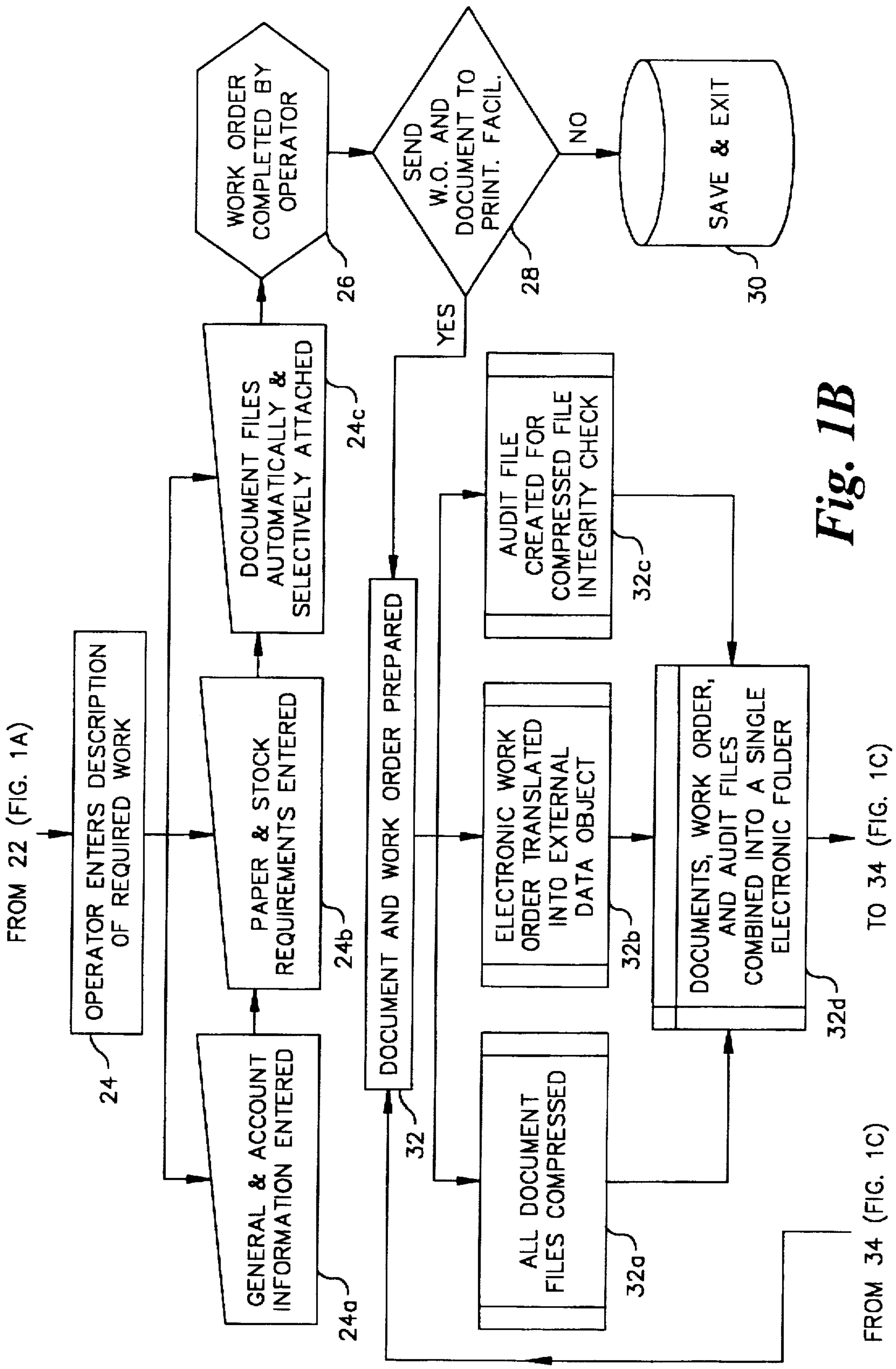
Figure 1C:
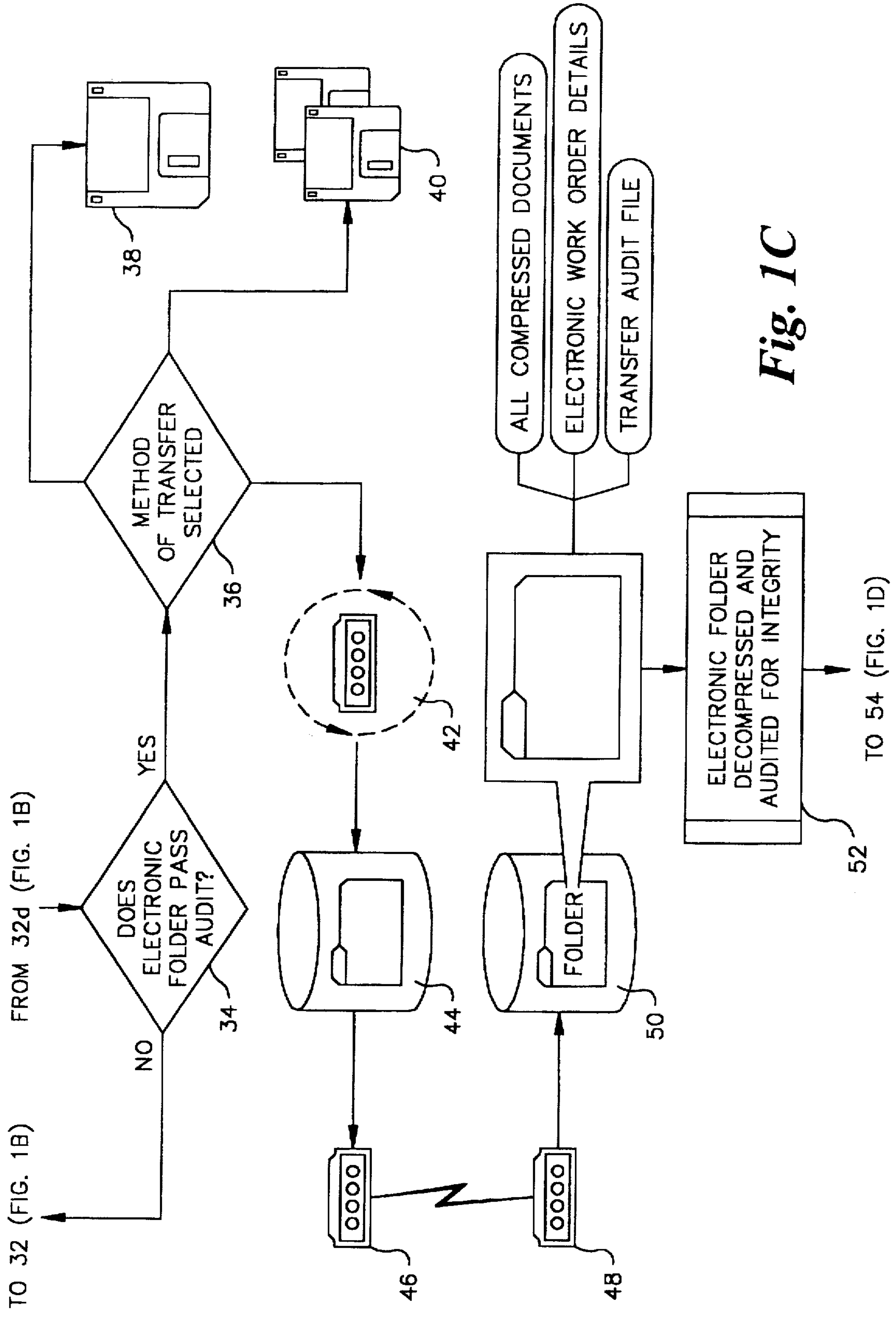
Figure 1D:
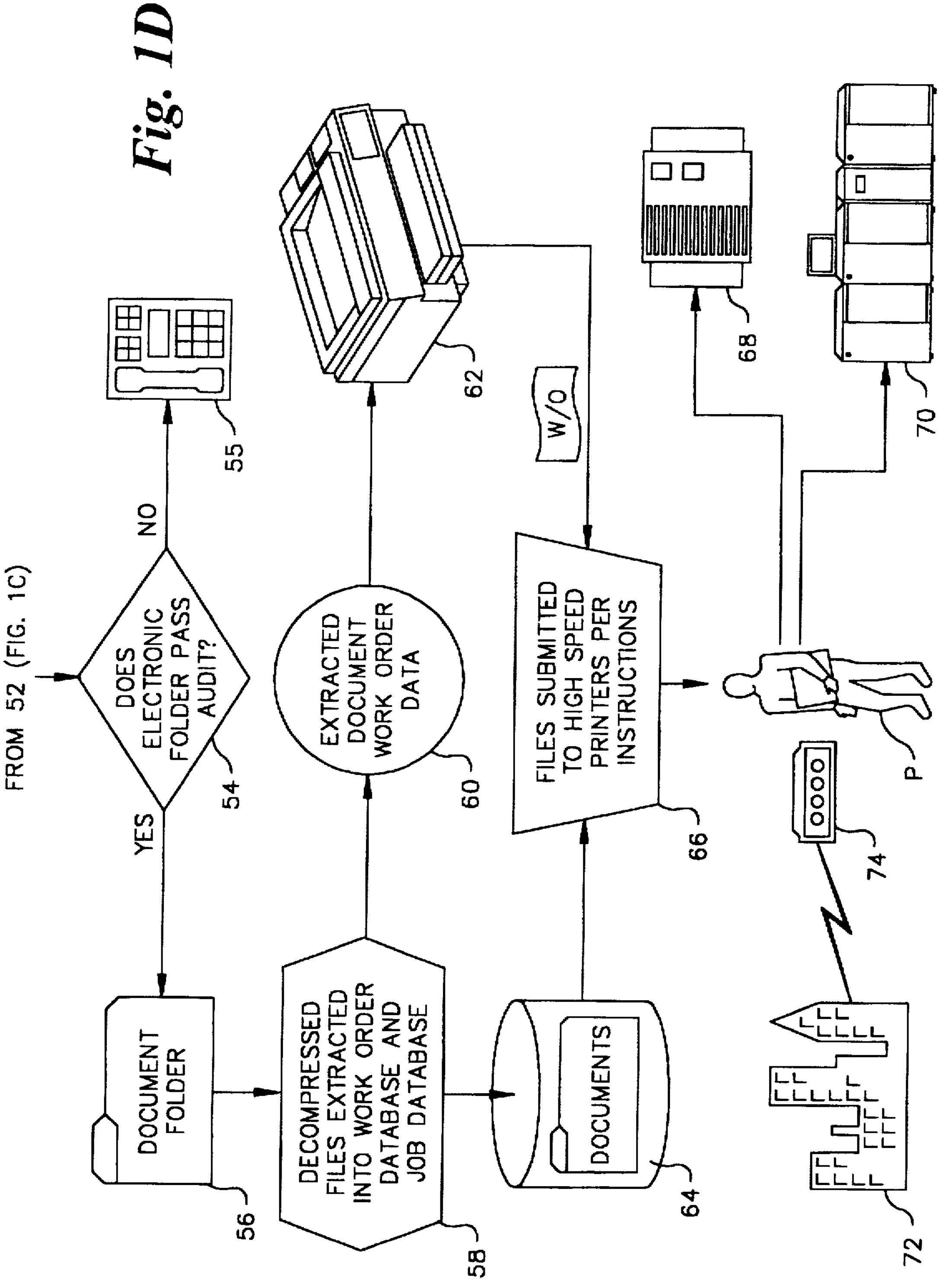

Block 10 represents a file of original multiple documents created in digital format on a conventional computer, by word processing software, such as Microsoft WINDOWS® based software, with compatible printer command language for operating a standard desktop printer. At block 12, an operator selects a print mode based on the quantity of documents to be produced. If only a small number of the documents is required at block 12, the operator directs the documents to decision block 14 where the operator executes a command block 16 to print the documents in small quantities on a standard desktop printer. However, where large quantities of the document are needed, the operator elects at block 12 a conventional printer driver file, such as Adobe ACROBAT® PDF Writer 2.0, for converting software commands in the documents at block 18 into a cross-platform format, with fonts and graphic resources embedded. The newly formatted document file is then compressed and previewed locally. Block 20 represents the newly formatted document file with an electronic work order form displayed at block 22. The operator then enters a description of the required work at block 24, general and account information (block 24*a*), and paper and stock requirements (block 24*b*). The file entries are automatically and selectively organized at block 24*c* to provide a completed work order file, with the document file attached at block 26.

The operator has the option at block 28 to store the work order and document files at block 30 for retrieval and submission to the printing facility at a later time, or to prepare them at block 32 for sending to a high-speed printing facility. Upon choosing the latter, all of the files are compressed at block 32*a*, the work order file translated into an external object code (block 32*b*), an audit file created (block 32*c*) for checking the compressed document file for integrity, the compressed document and work order and audit files are combined at block 32*d* into a single electronic folder, and the audit file is executed at block 34.

If the folder does not pass audit, all of the combined files are returned to block 32 for corrections and iteration. However, if the folder passes audit, the operator has the option of transmitting the folder electronically to a conventional computer at the printing facility by one of several media, selected at block 36. These media include a removable 5.25" or 3.5" medium 38, such as SyQuest™, standard 5.25" or 3.5" diskettes 40, a modem 42, or alternatively, an Integrated Services Digital Network (ISDN) or a similar wide-area network facility (not shown). Transmission by diskettes, of course, usually entails courier delivery to the printing facility, a modem or ISDN enables digital transmission of the databases by wire or fiberoptic cable. In each instance, the printing facility receives the original documents with all printer commands and resources embedded.

If the operator elects to transmit the files by modem 42, the electronic folder is entered into a memory 44 of a modem 46 and sent to a modem 48 at the printing facility and entered into memory at block 50. The electronic folder is then decompressed and the audit file executed at the printing facility for compression integrity at block 52. If the folder does not pass the audit at block 54, printing facility personnel contact the operator by telephone 55 regarding the status of the data transfer.

However, if the folder passes audit, the files in the decompressed folder 56 are separated at block 58 into a work order database and a job database of the documents for workflow routing and tracking. A single copy of the work order database is displayed or printed out on a desktop printer 62 at the printing facility. The job database is downloaded in block 64 and merged with the work order 60 at block 66 to allow printing facility personnel P to set up the appropriate output device, such as a high-resolution color printer 68 or a high-speed, black-and-white printer 70, to print the documents in accordance with the work order.

In order to maintain a database for all work performed at the printing facility, a high speed modem 74 transmits the work order and document files to a central storage facility 72.

Some of the many advantages and novel features of the invention should now be readily apparent. A computer-aided document printing management system is provided in which original documents in digital format with all printer commands and resources embedded at a computer terminal are delivered with no interruption in data transfer to a high-speed printing facility. The documents can be previewed at the computer terminal before being delivered to the printing facility. A work order and printing instructions entered at the computer terminal are delivered with the documents to the printing facility for audit and review of work requirements and immediate printing or scheduling.

It is understood, of course, that the above-described arrangement is merely illustrative of the principles of the invention. Numerous modifications and adaptations thereof will be readily apparent to those skilled in the art without departing from the spirit and scope of the invention.

08579870

APPLICATION OF WILLIE A. JACKSON, JR.

DOCUMENT PRINTING MANAGEMENT SYSTEM

FILED: DECEMBER 28, 1995

APPENDIX A

```
Application: aiconadm                                                    Page: 1
Library: d:\projects\nwire\admin\v1 0b1\aiconadm.pbl
Date: 7/6/95      Time: 11:25:02

App
Application: aiconadm


Global Variables
str_setup_parameters gstr_setup_parameters
string s_work_order_status
string gs_app_drive
string gs_app_directory
string gs_nav_drive
string gs_nav_directory
string gs_transmit_status
booleangb_saveas
string gs_unread, gs_temp, gs_opened, gs_zipfile
string app_title = "NightWire"
string gs_values_ini = "AICONADM.INI"
string gs_acrobat_reader = "c:\windows\acroexch\acroexch.exe"
string gs_bds_phone  = "9,587-4189"
string gs_bds_phone2 = "9,315-8099"
string gs_transfer_method
string gs_target_drive, gs_zipfilename
string gs_aicon_phone, gs_dialprefix, gs_init_string
string gs_tape_command, gs_tape_suffix
booleangs_new_wo, gb_cancelled


End of Global Variables


 Script for: open  event
 string ODBC_DB = "aiconadm.ini"

 Open( w_aicon_nrider_admin )


 If UPPER(ProfileString(ODBC_DB, "Switches", "Firstrun", "YES")) = "YES" then
 //  messagebox("","run setup2")
    Run( "SETUP2.PIF", minimized! )
    SetProfileString(ODBC_DB, "Switches", "Firstrun", "NO")
 end if

 // Establish database values from INI file
 SQLCA.DBMS         =ProfileString(ODBC_DB,"database","DBMS",                " ")
 SQLCA.database     =ProfileString(ODBC_DB,"database","Database",            " ")
 SQLCA.LogID        =ProfileString(ODBC_DB,"database","LogID",               " ")
 SQLCA.LogPass      =ProfileString(ODBC_DB,"database","LogPassword",         " ")
 SQLCA.ServerName   =ProfileString(ODBC_DB,"database","ServerName",          " ")
 SQLCA.UserID       =ProfileString(ODBC_DB,"database","UserID",              " ")
 SQLCA.DBPass       =ProfileString(ODBC_DB,"database","DatabasePassword",    " ")
 SQLCA.Lock         =ProfileString(ODBC_DB,"database","Lock",                " ")
 SQLCA.DBParm       =ProfileString(ODBC_DB,"database","DBParm",              " ")

 Connect using sqlca;

 nv_diskfile nv_diskfile
```

```
Application: aiconadm
Library: d:\projects\nwire\admin\v1-0b1\aiconadm.pbl                    Page: 1
Date: [illegible]      Time: 11:35:02

nv_diskfile = create nv_diskfile
gs_app_drive = nv_diskfile.fnv_get_drive()
gs_app_directory = nv_diskfile.fnv_get_directory()
gs_nav_drive = gs_app_drive
gs_nav_directory = gs_app_directory
destroy nv_diskfile

toolbartext = true

Open(w_mdi_frame)

Open(w_mdi_clock)

SetFocus(w_mdi_frame)


End of Script



Application References

                          str_setup_parameters
                          d:\projects\nwire\client\v1-0b1\aiconc.pbl

Window                    w_aicon_nrider_admin
                          d:\projects\nwire\admin\v1-0b1\aiconadm.pbl
                                  uo_nightwire_adm24
                                  d:\projects\nwire\admin\v1-0b1\aiconadm.pbl

                          nv_diskfile
                          d:\projects\nwire\client\v1-0b1\aiconcu.pbl

Window                    w_mdi_frame
                          d:\projects\nwire\admin\v1-0b1\aiconadm.pbl

Window                    w_mdi_clock
                          d:\projects\nwire\client\v1-0b1\aiconcw.pbl

End of Application References
```

[illegible]: d_[illegible]_update Page: 1
Library: d:\projects\nwire\admin\v1-0b1\aiconadm.pbl
Date: [illegible] Time: 11:[illegible]
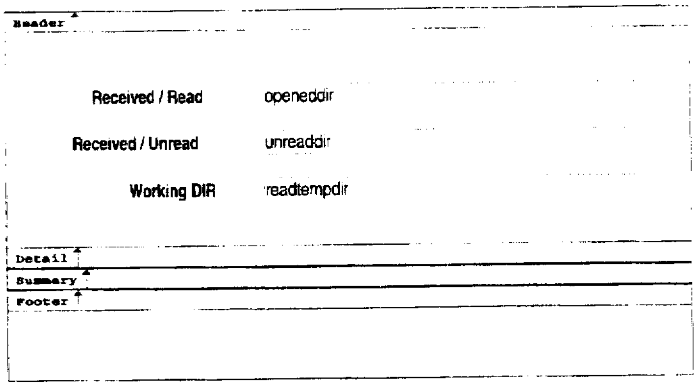

```
DataWindow: d_system_update                                                     Page: 1
Library: o:\projects\nwire\admin\v1-0b1\alconadm.pbl
Date: 7.6.95    Time: 11:15:11

Retrieve: PBSELECT(TABLE(NAME="system")  COLUMN(NAME="system.unreaddir")
    COLUMN(NAME="system.openeddir") COLUMN(NAME="system.readtempdir") COLUMN(NAME="system.rec_no")
    COLUMN(NAME="system.sa_password"))
Arguments: None
Update Table: system
Filter: None
Sort: None
Sparse: None
Column: openeddir
    Updateable:  Yes
    Key:  No
    Format: "[general]"
    Border style: Shadow Box
    Validation: None
    Validation Message: None
    Tab Sequence: 10
    Initial Value: None
    Edit Style: Edit
    Edit limit: 0
Column: unreaddir
    Updateable:  Yes
    Key:  No
    Format: "[general]"
    Border style: Shadow Box
    Validation: None
    Validation Message: None
    Tab Sequence: 20
    Initial Value: None
    Edit Style: Edit
    Edit limit: 0
Column: readtempdir
    Updateable:  Yes
    Key:  No
    Format: "[general]"
    Border style: Shadow Box
    Validation: None
    Validation Message: None
    Tab Sequence: 30
    Initial Value: None
    Edit Style: Edit
    Edit limit: 0
```

[illegible] Page: 1
Library: d: projects\nwire\admin\v1-0b1\aiconadm.pbl
[illegible]

| Number | Customer Id | Job Number | Wo Date | Time In | Due Cust Day | Due Cust Date | Due Cust Time | Due Vend Day | Due Ver |
|---|---|---|---|---|---|---|---|---|---|
| number | customer_id | job_number | wo_date | time_in | due_ | due_cust_date | due_cust_tim | due_ | due_vend |

Detail
Summary
Footer

| Date | Due Vend Time | Production Approval | Pager Phone | Media Format | Proof Required | |
|---|---|---|---|---|---|---|
| date | due_vend_tir | production_approva | pager_phone | media_format | pr | ordered_by |

| Ordered By | Job Type | Transmitted | Wo Type | | Job Na. |
|---|---|---|---|---|---|
| | job_type | tra | wo_type | job_name | |

Account Telephone account telephone message

Message

Instructions

Instructions delive

Deliver To

Originals Sets Impressions Input Output originals sets impressions input_output coll

| Collated | Page Numbering | Num Font Size | Tabs Numbered | Num Location | Mirror | Pg Num Orientation | Start Page | Start Number | Covers | F |
|---|---|---|---|---|---|---|---|---|---|---|
| ated | pa | num_font_size | tat | num | mi | pg_num_orienta | start_page | start_number | co | pr |

| Provided | Front Back Same | Front Text Side1 | Front Text Side2 | Back Text Side1 | Back Text Side2 | Page Level Color | Page Level Weight | Pag |
|---|---|---|---|---|---|---|---|---|
| b | fro | fro | fro | ba | ba | page_level_colc | page_level_wei | page_ |

| Level Size | Page Level Brand | Front Color | Front Weight | Front Size | Front Brand | Back Color | Back Weight | Back Size | Back Brand |
|---|---|---|---|---|---|---|---|---|---|
| level_size | page_level_brai | front_color | front_weight | front_size | front_brand | back_color | back_weight | back_size | back_brand |

| Tabs | Color | Tabs Bank Num | Tabs Printed | Tabs Provided | Inserts | Inserts Instructions | Input Orientation | Output Orientation | Orientation Instr |
|---|---|---|---|---|---|---|---|---|---|
| | tabs_color | tabs_bank num | tat | tat | ins | ins | input_orientatio | output_orientati | or |

| Spec table | Reduction Percent | Enlarge Percent | Scale Instructions | Crop | Window | Image Shift | Merge | Finishing | Inhouse | ( |
|---|---|---|---|---|---|---|---|---|---|---|
| ser | reduction_perce | enlarge_percen | sc | crc | wi | im | me | finishing | inhouse | color_specificatic |

Color Specifications

| Specifications | Explanations | Image Shiftx | Image |
|---|---|---|---|
| ns | explanations | image_shiftx | image_s |

Shift1

| | | |
|---|---|---|
| ~~[illegible]~~ | Center image | Pnmary Software |
| ~~[illegible]~~ shift1 | cel | pnmary_software |
| | | |
| | | |

```
DataWindow: d_update_wo
Library: d:\projects\nwire\admin\v1-0b1\a\conadm.pbl          Page: 1
Date: [illegible]   Time: [illegible]
```

[redacted]

```
  UMN(NAME="work_order.scale_instructions") COLUMN(NAME="work_order.crop")
  UMN(NAME="work_order.window") COLUMN(NAME="work_order.image_shift")
 COLUMN(NAME="work_order.merge") COLUMN(NAME="work_order.finishing")
 COLUMN(NAME="work_order.inhouse") COLUMN(NAME="work_order.color_specifications")
 COLUMN(NAME="work_order.explanations") COLUMN(NAME="work_order.image_shiftx")
 COLUMN(NAME="work_order.image_shifty") COLUMN(NAME="work_order.center_image")
 COLUMN(NAME="work_order.primary_software"))
Arguments: None
Update Table: work_order
Filter: None
Sort: None
Sparse: None
Column: number
    Updateable:  Yes
    Key:  Yes
    Format: "[general]"
    Border style: None
    Validation: None
    Validation Message: None
    Tab Sequence: 10
    Initial Value: None
    Edit Style: Edit
    Edit limit: 0
Column: customer_id
    Updateable:  Yes
    Key:  Yes
    Format: "[general]"
    Border style: None
    Validation: None
    Validation Message: None
    Tab Sequence: 20
    Initial Value: None
    Edit Style: Edit
    Edit limit: 15
Column: job_number
    Updateable:  Yes
    Key:  No
    Format: "[general]"
    Border style: None
    Validation: None
    Validation Message: None
    Tab Sequence: 30
    Initial Value: None
    Edit Style: Edit
    Edit limit: 0
Column: wo_date
    Updateable:  Yes
    Key:  No
    Format: "[general]"
    Border style: None
    Validation: None
    Validation Message: None
```

```
[illegible]
Library: d:\projects\nwire\admin\v1-0b1\a_conadm.pbl
[illegible]

    Tab Sequence: 40
    Initial Value: None
    Edit Style: Edit
    Edit limit: 0
Column: time_in
    Updateable:  Yes
    Key:  No
    Format: "[time]"
    Border style: None
    Validation: None
    Validation Message: None
    Tab Sequence: 50
    Initial Value: None
    Edit Style: Edit
    Edit limit: 0
Column: due_cust_day
    Updateable:  Yes
    Key:  No
    Format: "[general]"
    Border style: None
    Validation: None
    Validation Message: None
    Tab Sequence: 60
    Initial Value: None
    Edit Style: Edit
    Edit limit: 3
Column: due_cust_date
    Updateable:  Yes
    Key:  No
    Format: "[general]"
    Border style: None
    Validation: None
    Validation Message: None
    Tab Sequence: 70
    Initial Value: None
    Edit Style: Edit
    Edit limit: 0
Column: due_cust_time
    Updateable:  Yes
    Key:  No
    Format: "[time]"
    Border style: None
    Validation: None
    Validation Message: None
    Tab Sequence: 80
    Initial Value: None
    Edit Style: Edit
    Edit limit: 0
Column: due_vend_day
    Updateable:  Yes
    Key:  No
    Format: "[general]"
    Border style: None
```

```
DataWindow: d_update_w
Library: d:\projects\nwire\admin\v1.0b1\aiconacm.pbl                    Page: 7
Date: 9/6/95    Time: 11:25:12

     Validation: None
     Validation Message: None
     Tab Sequence: 90
     Initial Value: None
     Edit Style: Edit
     Edit limit: 3
Column: due_vend_date
     Updateable:  Yes
     Key:  No
     Format: "[general]"
     Border style: None
     Validation: None
     Validation Message: None
     Tab Sequence: 100
     Initial Value: None
     Edit Style: Edit
     Edit limit: 0
Column: due_vend_time
     Updateable:  Yes
     Key:  No
     Format: "[time]"
     Border style: None
     Validation: None
     Validation Message: None
     Tab Sequence: 110
     Initial Value: None
     Edit Style: Edit
     Edit limit: 0
Column: production_approval
     Updateable:  Yes
     Key:  No
     Format: "[general]"
     Border style: None
     Validation: None
     Validation Message: None
     Tab Sequence: 120
     Initial Value: None
     Edit Style: Edit
     Edit limit: 25
Column: pager_phone
     Updateable:  Yes
     Key:  No
     Format: "[general]"
     Border style: None
     Validation: None
     Validation Message: None
     Tab Sequence: 130
     Initial Value: None
     Edit Style: Edit
     Edit limit: 20
Column: media_format
     Updateable:  Yes
     Key:  No
```

```
DataWindow: d_[illegible]                                              Page: [illegible]
Library: d:\projects\nwire\admin\v1 0b1\atconadm.pbl
Date: [illegible]   Time: [illegible]

    Format: "[general]"
    Border style: None
    Validation: None
    Validation Message: None
    Tab Sequence: 140
    Initial Value: None
    Edit Style: Edit
    Edit limit: 0
Column: proof_required
    Updateable:  Yes
    Key:  No
    Format: "[general]"
    Border style: None
    Validation: None
    Validation Message: None
    Tab Sequence: 150
    Initial Value: None
    Edit Style: Edit
    Edit limit: 1
Column: ordered_by
    Updateable:  Yes
    Key:  No
    Format: "[general]"
    Border style: None
    Validation: None
    Validation Message: None
    Tab Sequence: 160
    Initial Value: None
    Edit Style: Edit
    Edit limit: 128
Column: job_type
    Updateable:  Yes
    Key:  No
    Format: "[general]"
    Border style: None
    Validation: None
    Validation Message: None
    Tab Sequence: 170
    Initial Value: None
    Edit Style: Edit
    Edit limit: 0
Column: transmitted
    Updateable:  Yes
    Key:  No
    Format: "[general]"
    Border style: None
    Validation: None
    Validation Message: None
    Tab Sequence: [illegible]
    Initial Value: None
    Edit Style: Edit
    Edit limit: 1
Column: wo_type
```

```
Datawindow: d_update_wc
Library: d:\projects\nwire\admin\v1-0b2\aiconadm.pbl                 Page: 6
Date: 7/8/95   Time: 11:25:11

     Updateable:  Yes
     Key:  No
     Format: "[general]"
     Border style: None
     Validation: None
     Validation Message: None
     Tab Sequence: 190
     Initial Value: None
     Edit Style: Edit
     Edit limit: 0
 Column: job_name
     Updateable:  Yes
     Key:  No
     Format: "[general]"
     Border style: None
     Validation: None
     Validation Message: None
     Tab Sequence: 200
     Initial Value: None
     Edit Style: Edit
     Edit limit: 128
 Column: account
     Updateable:  Yes
     Key:  No
     Format: "[general]"
     Border style: None
     Validation: None
     Validation Message: None
     Tab Sequence: 210
     Initial Value: None
     Edit Style: Edit
     Edit limit: 30
 Column: telephone
     Updateable:  Yes
     Key:  No
     Format: "[general]"
     Border style: None
     Validation: None
     Validation Message: None
     Tab Sequence: 220
     Initial Value: None
     Edit Style: Edit
     Edit limit: 20
 Column: message
     Updateable:  Yes
     Key:  No
     Format: "[general]"
     Border style: None
     Validation: None
     Validation Message: None
     Tab Sequence: 230
     Initial Value: None
     Edit Style: Edit
```

DataWindow: d_update_wo
Library: d:\projects\nwire\admin\v1-0b1\aiconadm.pbl
Date: 7/6/95 Time: 11:25:12

Page: 7

Column Edit limit: 128
Column: instructions
Updateable: Yes
Key: No
Format: "[general]"
Border style: None
Validation: None
Validation Message: None
Tab Sequence: 240
Initial Value: None
Edit Style: Edit
Edit limit: 250
Column: deliver_to
Updateable: Yes
Key: No
Format: "[general]"
Border style: None
Validation: None
Validation Message: None
Tab Sequence: 250
Initial Value: None
Edit Style: Edit
Edit limit: 128
Column: originals
Updateable: Yes
Key: No
Format: "[general]"
Border style: None
Validation: None
Validation Message: None
Tab Sequence: 260
Initial Value: None
Edit Style: Edit
Edit limit: 0
Column: sets
Updateable: Yes
Key: No
Format: "[general]"
Border style: None
Validation: None
Validation Message: None
Tab Sequence: 270
Initial Value: None
Edit Style: Edit
Edit limit: 0
Column: impressions
Updateable: Yes
Key: No
Format: "[general]"
Border style: None
Validation: None
Validation Message: None
Tab Sequence: 280

```
DataWindow: d_update_wo
Library: d:\projects\nwirc\admin\v1-0b1\aiconadm.pbl                    Page: 8
Date: 7/6/95    Time: 11:25:12

     Initial Value: None
     Edit Style: Edit
     Edit limit: 0
Column: input_output
     Updateable:  Yes
     Key:  No
     Format: "[general]"
     Border style: None
     Validation: None
     Validation Message: None
     Tab Sequence: 290
     Initial Value: None
     Edit Style: Edit
     Edit limit: 0
Column: collated
     Updateable:  Yes
     Key:  No
     Format: "[general]"
     Border style: None
     Validation: None
     Validation Message: None
     Tab Sequence: 300
     Initial Value: None
     Edit Style: Edit
     Edit limit: 0
Column: page_numbering
     Updateable:  Yes
     Key:  No
     Format: "[general]"
     Border style: None
     Validation: None
     Validation Message: None
     Tab Sequence: 310
     Initial Value: None
     Edit Style: Edit
     Edit limit: 1
Column: num_font_size
     Updateable:  Yes
     Key:  No
     Format: "[general]"
     Border style: None
     Validation: None
     Validation Message: None
     Tab Sequence: 320
     Initial Value: None
     Edit Style: Edit
     Edit limit: 0
Column: tabs_numbered
     Updateable:  Yes
     Key:  No
     Format: "[general]"
     Border style: None
     Validation: None
```

34

```
DataWindow: d_update_wt                                              Page: 9
Library: d:\projects\nwire\admin\v1-0n1\aiconadm.pbl
Date: 7 t '95    Time: 11:28:12

    Validation Message: None
    Tab Sequence: 330
    Initial Value: None
    Edit Style: Edit
    Edit limit: 1
Column: num_location
    Updateable:  Yes
    Key:  No
    Format: "[general]"
    Border style: None
    Validation: None
    Validation Message: None
    Tab Sequence: 340
    Initial Value: None
    Edit Style: Edit
    Edit limit: 2
Column: mirror
    Updateable:  Yes
    Key:  No
    Format: "[general]"
    Border style: None
    Validation: None
    Validation Message: None
    Tab Sequence: 350
    Initial Value: None
    Edit Style: Edit
    Edit limit: 1
Column: pg_num_orientation
    Updateable:  Yes
    Key:  No
    Format: "[general]"
    Border style: None
    Validation: None
    Validation Message: None
    Tab Sequence: 360
    Initial Value: None
    Edit Style: Edit
    Edit limit: 0
Column: start_page
    Updateable:  Yes
    Key:  No
    Format: "[general]"
    Border style: None
    Validation: None
    Validation Message: None
    Tab Sequence: 370
    Initial Value: None
    Edit Style: Edit
    Edit limit: 0
Column: start_number
    Updateable:  Yes
    Key:  No
    Format: "[general]"
```

```
DataWindow: d_update_wo
Library: d:\projects\nwire\admin\v1-0b1\aiconadm.pbl
Date:        Time:

     Border style: None
     Validation: None
     Validation Message: None
     Tab Sequence: 380
     Initial Value: None
     Edit Style: Edit
     Edit limit: 0
 Column: covers
     Updateable:  Yes
     Key:  No
     Format: "[general]"
     Border style: None
     Validation: None
     Validation Message: None
     Tab Sequence: 390
     Initial Value: None
     Edit Style: Edit
     Edit limit: 1
 Column: provided
     Updateable:  Yes
     Key:  No
     Format: "[general]"
     Border style: None
     Validation: None
     Validation Message: None
     Tab Sequence: 400
     Initial Value: None
     Edit Style: Edit
     Edit limit: 1
 Column: front_back_same
     Updateable:  Yes
     Key:  No
     Format: "[general]"
     Border style: None
     Validation: None
     Validation Message: None
     Tab Sequence: 410
     Initial Value: None
     Edit Style: Edit
     Edit limit: 1
 Column: front_text_side1
     Updateable:  Yes
     Key:  No
     Format: "[general]"
     Border style: None
     Validation: None
     Validation Message: None
     Tab Sequence: 420
     Initial Value: None
     Edit Style: Edit
     Edit limit: 1
 Column: front_text_side2
     Updateable:  Yes
```

```
DataWindow: d_update_wc                                              Page: [illegible]
Library: d:\projects\nwire\admin\v1-0b1\atconadm.pbl
Date: [illegible] 95    Time: [illegible]

    Key:  No
    Format: "[general]"
    Border style: None
    Validation: None
    Validation Message: None
    Tab Sequence: 430
    Initial Value: None
    Edit Style: Edit
    Edit limit: 1
Column: back_text_side1
    Updateable:  Yes
    Key:  No
    Format: "[general]"
    Border style: None
    Validation: None
    Validation Message: None
    Tab Sequence: 440
    Initial Value: None
    Edit Style: Edit
    Edit limit: 1
Column: back_text_side2
    Updateable:  Yes
    Key:  No
    Format: "[general]"
    Border style: None
    Validation: None
    Validation Message: None
    Tab Sequence: 450
    Initial Value: None
    Edit Style: Edit
    Edit limit: 1
Column: page_level_color
    Updateable:  Yes
    Key:  No
    Format: "[general]"
    Border style: None
    Validation: None
    Validation Message: None
    Tab Sequence: 460
    Initial Value: None
    Edit Style: Edit
    Edit limit: 0
Column: page_level_weight
    Updateable:  Yes
    Key:  No
    Format: "[general]"
    Border style: None
    Validation: None
    Validation Message: None
    Tab Sequence: 470
    Initial Value: None
    Edit Style: Edit
    Edit limit: 0
```

```
DataWindow: d_update_w[illegible]                                                    Page: [illegible]
Library: d:\projects\nwire\admin-v1-0b1\aiconadm.pbl
Date: [illegible]    Time: [illegible]

Column: page_level_size
    Updateable: Yes
    Key: No
    Format: "[general]"
    Border style: None
    Validation: None
    Validation Message: None
    Tab Sequence: 480
    Initial Value: None
    Edit Style: Edit
    Edit limit: 0
Column: page_level_brand
    Updateable: Yes
    Key: No
    Format: "[general]"
    Border style: None
    Validation: None
    Validation Message: None
    Tab Sequence: 490
    Initial Value: None
    Edit Style: Edit
    Edit limit: 0
Column: front_color
    Updateable: Yes
    Key: No
    Format: "[general]"
    Border style: None
    Validation: None
    Validation Message: None
    Tab Sequence: 500
    Initial Value: None
    Edit Style: Edit
    Edit limit: 0
Column: front_weight
    Updateable: Yes
    Key: No
    Format: "[general]"
    Border style: None
    Validation: None
    Validation Message: None
    Tab Sequence: 510
    Initial Value: None
    Edit Style: Edit
    Edit limit: 0
Column: front_size
    Updateable: Yes
    Key: No
    Format: "[general]"
    Border style: None
    Validation: None
    Validation Message: None
    Tab Sequence: 520
    Initial Value: None
```

DataWindow: d_update_wo
Library: d:\projects\nwire\admin\v1-0b1\aiconadm.pbl
Date: 7/6/95 Time: 11:21:11

```
    Edit Style: Edit
    Edit limit: 0
Column: front_brand
    Updateable:  Yes
    Key:  No
    Format: "[general]"
    Border style: None
    Validation: None
    Validation Message: None
    Tab Sequence: 530
    Initial Value: None
    Edit Style: Edit
    Edit limit: 0
Column: back_color
    Updateable:  Yes
    Key:  No
    Format: "[general]"
    Border style: None
    Validation: None
    Validation Message: None
    Tab Sequence: 540
    Initial Value: None
    Edit Style: Edit
    Edit limit: 0
Column: back_weight
    Updateable:  Yes
    Key:  No
    Format: "[general]"
    Border style: None
    Validation: None
    Validation Message: None
    Tab Sequence: 550
    Initial Value: None
    Edit Style: Edit
    Edit limit: 0
Column: back_size
    Updateable:  Yes
    Key:  No
    Format: "[general]"
    Border style: None
    Validation: None
    Validation Message: None
    Tab Sequence: 560
    Initial Value: None
    Edit Style: Edit
    Edit limit: 0
Column: back_brand
    Updateable:  Yes
    Key:  No
    Format: "[general]"
    Border style: None
    Validation: None
    Validation Message: None
```

```
Datawindow: d_update_vt                                              Page: 14
Library: d:\projects\nwire\admin\v1-0b1\aiconadm.pbl
Date: 7/6/95   Time: 11:15:12

     Tab Sequence: 570
     Initial Value: None
     Edit Style: Edit
     Edit limit: 0
Column: tabs_color
     Updateable:  Yes
     Key:  No
     Format: "[general]"
     Border style: None
     Validation: None
     Validation Message: None
     Tab Sequence: 580
     Initial Value: None
     Edit Style: Edit
     Edit limit: 0
Column: tabs_bank_num
     Updateable:  Yes
     Key:  No
     Format: "[general]"
     Border style: None
     Validation: None
     Validation Message: None
     Tab Sequence: 590
     Initial Value: None
     Edit Style: Edit
     Edit limit: 0
Column: tabs_printed
     Updateable:  Yes
     Key:  No
     Format: "[general]"
     Border style: None
     Validation: None
     Validation Message: None
     Tab Sequence: 600
     Initial Value: None
     Edit Style: Edit
     Edit limit: 1
Column: tabs_provided
     Updateable:  Yes
     Key:  No
     Format: "[general]"
     Border style: None
     Validation: None
     Validation Message: None
     Tab Sequence: 610
     Initial Value: None
     Edit Style: Edit
     Edit limit: 1
Column: inserts
     Updateable:  Yes
     Key:  No
     Format: "[general]"
     Border style: None
```

```
    Validation: None
    Validation Message: None
    Tab Sequence: 620
    Initial Value: None
    Edit Style: Edit
    Edit limit: 1
Column: inserts_instructions
    Updateable:  Yes
    Key:  No
    Format: "[general]"
    Border style: None
    Validation: None
    Validation Message: None
    Tab Sequence: 630
    Initial Value: None
    Edit Style: Edit
    Edit limit: 1
Column: input_orientation
    Updateable:  Yes
    Key:  No
    Format: "[general]"
    Border style: None
    Validation: None
    Validation Message: None
    Tab Sequence: 640
    Initial Value: None
    Edit Style: Edit
    Edit limit: 0
Column: output_orientation
    Updateable:  Yes
    Key:  No
    Format: "[general]"
    Border style: None
    Validation: None
    Validation Message: None
    Tab Sequence: 650
    Initial Value: None
    Edit Style: Edit
    Edit limit: 0
Column: orientation_instr
    Updateable:  Yes
    Key:  No
    Format: "[general]"
    Border style: None
    Validation: None
    Validation Message: None
    Tab Sequence: 660
    Initial Value: None
    Edit Style: Edit
    Edit limit: 1
Column: scalable
    Updateable:  Yes
    Key:  No
```

DataWindow: d_update_wo
Library: d:\projects\nwire\admin\v1-0b1\aiconadm.pbl
Date: 7/6/95 Time: 11:28:10

Page: 24

```
    Format: "[general]"
    Border style: None
    Validation: None
    Validation Message: None
    Tab Sequence: 670
    Initial Value: None
    Edit Style: Edit
    Edit limit: 1
Column: reduction_percent
    Updateable:  Yes
    Key:  No
    Format: "[general]"
    Border style: None
    Validation: None
    Validation Message: None
    Tab Sequence: 680
    Initial Value: None
    Edit Style: Edit
    Edit limit: 0
Column: enlarge_percent
    Updateable:  Yes
    Key:  No
    Format: "[general]"
    Border style: None
    Validation: None
    Validation Message: None
    Tab Sequence: 690
    Initial Value: None
    Edit Style: Edit
    Edit limit: 0
Column: scale_instructions
    Updateable:  Yes
    Key:  No
    Format: "[general]"
    Border style: None
    Validation: None
    Validation Message: None
    Tab Sequence: 700
    Initial Value: None
    Edit Style: Edit
    Edit limit: 1
Column: crop
    Updateable:  Yes
    Key:  No
    Format: "[general]"
    Border style: None
    Validation: None
    Validation Message: None
    Tab Sequence: 710
    Initial Value: None
    Edit Style: Edit
    Edit limit: 1
Column: window
```

```
DataWindow: d_updatejob
Library: d:\projects\nwiro\admin\v1-0b1\alconadm.pbl
Date:          Time: 11:15:12
```

```
    Updateable:  Yes
    Key:  No
    Format: "[general]"
    Border style: None
    Validation: None
    Validation Message: None
    Tab Sequence: 720
    Initial Value: None
    Edit Style: Edit
    Edit limit: 1
Column: image_shift
    Updateable:  Yes
    Key:  No
    Format: "[general]"
    Border style: None
    Validation: None
    Validation Message: None
    Tab Sequence: 730
    Initial Value: None
    Edit Style: Edit
    Edit limit: 1
Column: merge
    Updateable:  Yes
    Key:  No
    Format: "[general]"
    Border style: None
    Validation: None
    Validation Message: None
    Tab Sequence: 740
    Initial Value: None
    Edit Style: Edit
    Edit limit: 1
Column: finishing
    Updateable:  Yes
    Key:  No
    Format: "[general]"
    Border style: None
    Validation: None
    Validation Message: None
    Tab Sequence: 750
    Initial Value: None
    Edit Style: Edit
    Edit limit: 0
Column: inhouse
    Updateable:  Yes
    Key:  No
    Format: "[general]"
    Border style: None
    Validation: None
    Validation Message: None
    Tab Sequence: 760
    Initial Value: None
    Edit Style: Edit
```

```
DataWindow: d_update_wc
Library: d:\projects\nwire\admin\v1.0b1\aiconadm.pbl                    Page: 15
Date: 7.6.95    Time: 11:25:11

     Edit limit: 0
     mn: color_specifications
     Updateable:  Yes
     Key:  No
     Format: "[general]"
     Border style: None
     Validation: None
     Validation Message: None
     Tab Sequence: 770
     Initial Value: None
     Edit Style: Edit
     Edit limit: 40
Column: explanations
     Updateable:  Yes
     Key:  No
     Format: "[general]"
     Border style: None
     Validation: None
     Validation Message: None
     Tab Sequence: 780
     Initial Value: None
     Edit Style: Edit
     Edit limit: 128
Column: image_shiftx
     Updateable:  Yes
     Key:  No
     Format: "[general]"
     Border style: None
     Validation: None
     Validation Message: None
     Tab Sequence: 790
     Initial Value: None
     Edit Style: Edit
     Edit limit: 0
Column: image_shifty
     Updateable:  Yes
     Key:  No
     Format: "[general]"
     Border style: None
     Validation: None
     Validation Message: None
     Tab Sequence: 800
     Initial Value: None
     Edit Style: Edit
     Edit limit: 0
Column: center_image
     Updateable:  Yes
     Key:  No
     Format: "[general]"
     Border style: None
     Validation: None
     Validation Message: None
     Tab Sequence: 810
```

44

```
DataWindow: d_update_wc                                                    Page: 1?
Library: d:\projects\nwire\admin\v1-0b1\aiconadm.pbl
Date: 7/6/95    Time: 11:25:12

    Initial Value: None
    Edit Style: Edit
    Edit limit: 1
Column: primary_software
    Updateable:  Yes
    Key:  No
    Format: "[general]"
    Border style: None
    Validation: None
    Validation Message: None
    Tab Sequence: 820
    Initial Value: None
    Edit Style: DropDownList
    Edit limit: 0
    Coded Values:
        "MS Word for Windows" to "MS Word for Windows"
        "MS Word for MAC" to "MS Word for MAC"
        "Quark / MAC" to "Quark / MAC"
        "MS Excel Windows" to "MS Excel Windows"
        "MS Excel MAC" to "MS Excel MAC"
        "Word Perfect" to "Word Perfect"
        "AMI Pro" to "AMI Pro"
        "PageMaker Windows" to "PageMaker Windows"
        "PageMaker MAC" to "PageMaker MAC"
```

DataWindow: d_w[illegible]_documents
Library: d:\projects\nwire\admin\v1-0b1\a[illegible]conadm.pbl
Page: 1
Date: [illegible] Time: [illegible]
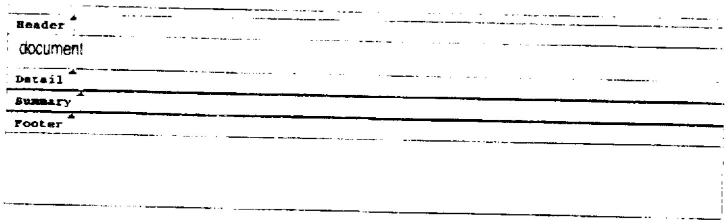

```
DataWindow: d_wo_documents                                                    Page: 1
Library: d:\projects\nwire\admin\v1-0b1\aiconadm.pbl
Date: 7/6/95    Time: 11:25:29

Retrieve: PBSELECT(TABLE(NAME="work_order_documents" )
    LUMN(NAME="work_order_documents.document") COLUMN(NAME="work_order_documents.seq_no")WHERE(
    P( ="~"work_order_documents~".~"number~"" OP ="=" EXP ="":job_number" ) )
 ORDER(NAME="work_order_documents.seq_no" ASC=yes ) ARG(NAME = "job_number" TYPE = number)
Arguments: job_number
Update Table: Not Allowed
Filter: None
Sort: None
Sparse: None
Column: document
    Format: "[general]"
    Border style: None
    Validation: None
    Validation Message: None
    Tab Sequence: 0
    Initial Value: None
    Edit Style: Edit
    Edit limit: 128
```

DataWindow: d_wo_number_adm
Library: d:\projects\nwire\admin\v1-0b1\aiconadm.pbl
Date: [illegible]/6/95 Time: [illegible]:25:29

Page: 1

| Acctl / Job # | Job Description | WO Number |
| --- | --- | --- |
| **Header** | | |
| account number | job_name | job_number |
| **Detail** | | |
| **Summary** | | |
| **Footer** | | |

```
DataWindow: d_wo_[illegible]_adm                                          Page: 7
Library: d:\projects\nwire\admin\v1-0b1\aiconadm.pbl
Date: 7/6/95   Time: 11:2[illegible]:29

Retrieve: PBSELECT(TABLE(NAME="work_order" ) COLUMN(NAME="work_order.number")
   [illegible]UMN(NAME="work_order.job_number") COLUMN(NAME="work_order.job_name")
   [illegible]UMN(NAME="work_order.transmitted") COLUMN(NAME="work_order.customer_id")
 COLUMN(NAME="work_order.account")) ORDER(NAME="work_order.job_number" ASC=no)
Arguments: None
Update Table: work_order
Filter: None
Sort: None
Sparse: None
Column: account
    Updateable:  Yes
    Key:  No
    Format: "[general]"
    Border style: Shadow Box
    Validation: None
    Validation Message: None
    Tab Sequence: 0
    Initial Value: None
    Edit Style: Edit
    Edit limit: 0
Column: job_name
    Updateable:  Yes
    Key:  No
    Format: "[general]"
    Border style: Shadow Box
    Validation: None
    Validation Message: None
    Tab Sequence: 0
    Initial Value: None
    Edit Style: Edit
    Edit limit: 0
Column: job_number
    Updateable:  Yes
    Key:  No
    Format: "[currency]"
    Border style: Shadow Box
    Validation: None
    Validation Message: None
    Tab Sequence: 0
    Initial Value: None
    Edit Style: Edit Mask
Column: number
    Updateable:  Yes
    Key:  Yes
    Format: "[currency]"
    Border style: Shadow Box
    Validation: None
    Validation Message: None
    Tab Sequence: 0
    Initial Value: None
    Edit Style: Edit Mask
```

DataWindow: d_work_order_rpt
Library: d:\projects\nwire\admin\v1-0b1\aiconadm.pbl
Date: 7 9 95 Time:

Page: 1

NightRider Business Document Services

NightWire Work Order

Header

| | |
|---|---|
| Number: | number |
| Customer Id: | customer_id |
| Job Number: | job_number |
| Wo Date: | wo_date |
| Time In: | time_in |
| Due Cust Day: | due_ |
| Due Cust Date: | due_cust_date |
| Due Cust Time: | due_cust_tir |
| Due Vend Day: | due_ |
| Due Vend Date: | due_vend_date |
| Due Vend Time: | due_vend_tir |
| Production Approval: | production_approval |
| Pager Phone: | pager_phone |
| Media Format: | media_format |
| Proof Required: | pr |
| Ordered By: | ordered_by |
| Job Type: | job_type |
| Transmitted: | tra |
| Wo Type: | wo_type |
| Job Name: | job_name |
| Account: | account |
| Telephone: | telephone |
| Message: | message |
| Instructions: | instructions |
| Deliver To: | deliver_to |

50

| | |
|---|---|
| Page Numbering: | pa |
| Num Font Size: | num_font_size |
| Tabs Numbered: | tat |
| Num Location: | num |
| Mirror: | mi |
| Pg Num Orientation: | pg_num_orient |
| Start Page: | start_page |
| Start Number: | start_number |
| Covers: | co |
| Provided: | pro |
| Front Back Same: | fro |
| Front Text Side1: | fro |
| Front Text Side2: | fro |
| Back Text Side1: | ba |
| Back Text Side2: | ba |
| Page Level Color: | page_level_colo |
| Page Level Weight: | page_level_wei |
| Page Level Size: | page_level_size |
| Page Level Brand: | page_level_bra |
| Front Color: | front_color |
| Front Weight: | front_weight |
| Front Size: | front_size |
| Front Brand: | front_brand |
| Back Color: | back_color |
| Back Weight: | back_weight |

51

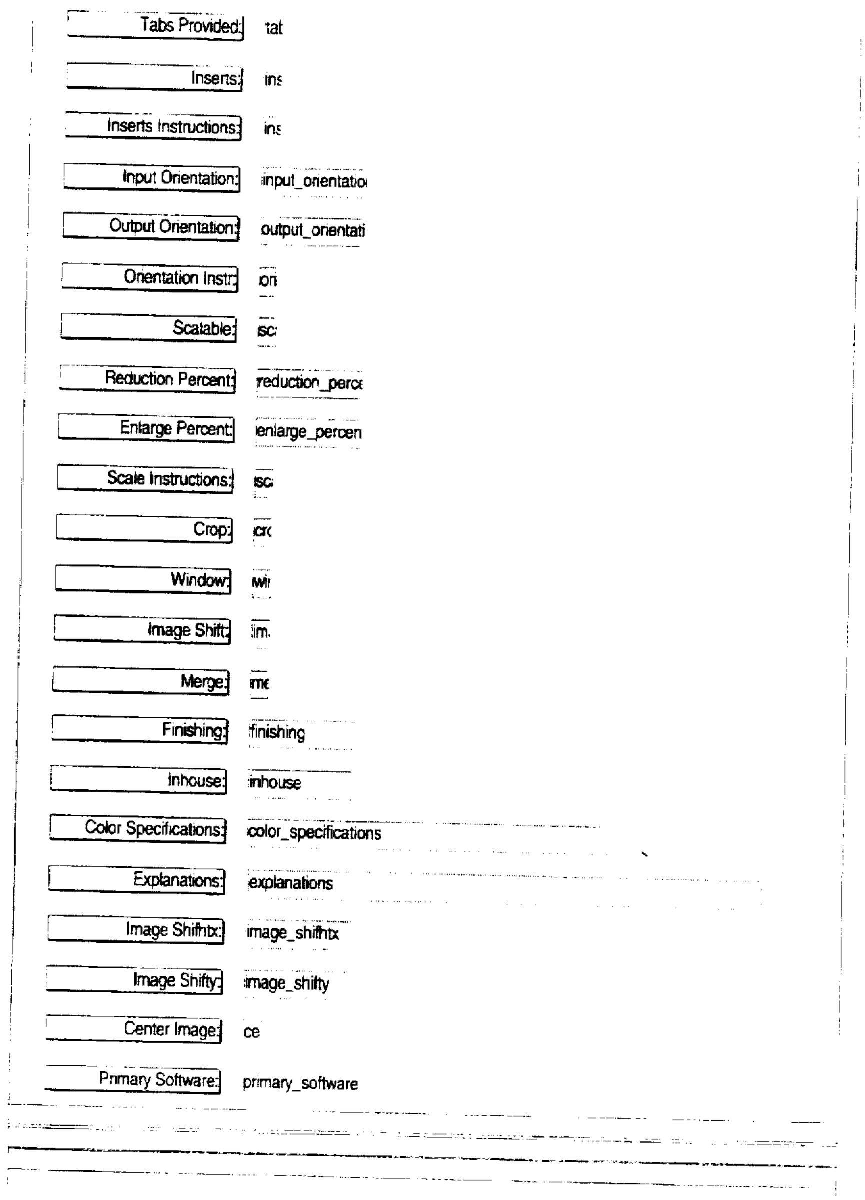
52

```
[illegible] Page: [illegible]
Library: d:\projects\nwire\admin\v1-0b1\aiconadm.pbl
Date: [illegible] 95   Time: [illegible]

UMN(NAME="work_order.scale_instructions") COLUMN(NAME="work_order.crop")
UMN(NAME="work_order.window") COLUMN(NAME="work_order.image_shift")
COLUMN(NAME="work_order.merge") COLUMN(NAME="work_order.finishing")
COLUMN(NAME="work_order.inhouse") COLUMN(NAME="work_order.color_specifications")
COLUMN(NAME="work_order.explanations") COLUMN(NAME="work_order.image_shiftx")
COLUMN(NAME="work_order.image_shifty") COLUMN(NAME="work_order.center_image")
COLUMN(NAME="work_order.primary_software")WHERE( EXP1 ="~"work_order~".~"job_number~"" OP ="="
EXP2 =":job_number" ) ) ARG(NAME = "job_number" TYPE = number)
Arguments: job_number
Update Table: work_order
Filter: None
Sort: None
Sparse: None
Column: number
    Updateable:  Yes
    Key:  No
    Format: "[general]"
    Border style: Shadow Box
    Validation: None
    Validation Message: None
    Tab Sequence: 0
    Initial Value: None
    Edit Style: Edit
    Edit limit: 0
Column: customer_id
    Updateable:  Yes
    Key:  No
    Format: "[general]"
    Border style: Shadow Box
    Validation: None
    Validation Message: None
    Tab Sequence: 0
    Initial Value: None
    Edit Style: Edit
    Edit limit: 15
Column: job_number
    Updateable:  Yes
    Key:  Yes
    Format: "[general]"
    Border style: Shadow Box
    Validation: None
    Validation Message: None
    Tab Sequence: 0
    Initial Value: None
    Edit Style: Edit
    Edit limit: 0
Column: wc_date
    Updateable:  Yes
    Key:  No
    Format: "[general]"
    Border style: Shadow Box
    Validation: None
```

```
DataWindow: d_work_order_rpt
Library: d:\projects\nwire\admin\v1-0b1\alconadm.pbl                    Page: 3
Date: 7/6/95   Time: 11:25:21

     Validation Message: None
     Tab Sequence: 0
     Initial Value: None
     Edit Style: Edit
     Edit limit: 0
Column: time_in
     Updateable:  Yes
     Key:  No
     Format: "[time]"
     Border style: Shadow Box
     Validation: None
     Validation Message: None
     Tab Sequence: 0
     Initial Value: None
     Edit Style: Edit
     Edit limit: 0
Column: due_cust_day
     Updateable:  Yes
     Key:  No
     Format: "[general]"
     Border style: Shadow Box
     Validation: None
     Validation Message: None
     Tab Sequence: 0
     Initial Value: None
     Edit Style: Edit
     Edit limit: 3
Column: due_cust_date
     Updateable:  Yes
     Key:  No
     Format: "[general]"
     Border style: Shadow Box
     Validation: None
     Validation Message: None
     Tab Sequence: 0
     Initial Value: None
     Edit Style: Edit
     Edit limit: 0
Column: due_cust_time
     Updateable:  Yes
     Key:  No
     Format: "[time]"
     Border style: Shadow Box
     Validation: None
     Validation Message: None
     Tab Sequence: 0
     Initial Value: None
     Edit Style: Edit
     Edit limit: 0
Column: due_vend_day
     Updateable:  Yes
     Key:  No
     Format: "[general]"
```

```
DataWindow: d_work_order_rpt                                        Page: 4
Library: d:\projects\nwirc\admin\v1.0s1\aiconadm.pbl
Date: 7/6/95   Time: 11:25:31

    Border style: Shadow Box
    Validation: None
    Validation Message: None
    Tab Sequence: 0
    Initial Value: None
    Edit Style: Edit
    Edit limit: 3
Column: due_vend_date
    Updateable:  Yes
    Key:  No
    Format: "[general]"
    Border style: Shadow Box
    Validation: None
    Validation Message: None
    Tab Sequence: 0
    Initial Value: None
    Edit Style: Edit
    Edit limit: 0
Column: due_vend_time
    Updateable:  Yes
    Key:  No
    Format: "[time]"
    Border style: Shadow Box
    Validation: None
    Validation Message: None
    Tab Sequence: 0
    Initial Value: None
    Edit Style: Edit
    Edit limit: 0
Column: production_approval
    Updateable:  Yes
    Key:  No
    Format: "[general]"
    Border style: Shadow Box
    Validation: None
    Validation Message: None
    Tab Sequence: 0
    Initial Value: None
    Edit Style: Edit
    Edit limit: 25
Column: pager_phone
    Updateable:  Yes
    Key:  No
    Format: "[general]"
    Border style: Shadow Box
    Validation: None
    Validation Message: None
    Tab Sequence: 0
    Initial Value: None
    Edit Style: Edit
    Edit limit: 20
Column: media_format
    Updateable:  Yes
```

```
DataWindow: d_work_order_rpt
Library: d:\projects\nwire\admin\v1-0b1\aiconadm.pbl
Date: 7/6/95   Time: 11:25:31
```

```
    Key:  No
    Format: "[general]"
    Border style: Shadow Box
    Validation: None
    Validation Message: None
    Tab Sequence: 10
    Initial Value: None
    Edit Style: Edit
    Edit limit: 0
Column: proof_required
    Updateable:  Yes
    Key:  No
    Format: "[general]"
    Border style: Shadow Box
    Validation: None
    Validation Message: None
    Tab Sequence: 20
    Initial Value: None
    Edit Style: Edit
    Edit limit: 1
Column: job_type
    Updateable:  Yes
    Key:  No
    Format: "[general]"
    Border style: Shadow Box
    Validation: None
    Validation Message: None
    Tab Sequence: 40
    Initial Value: None
    Edit Style: Edit
    Edit limit: 0
Column: transmitted
    Updateable:  Yes
    Key:  No
    Format: "[general]"
    Border style: Shadow Box
    Validation: None
    Validation Message: None
    Tab Sequence: 50
    Initial Value: None
    Edit Style: Edit
    Edit limit: 1
Column: wo_type
    Updateable:  Yes
    Key:  No
    Format: "[general]"
    Border style: Shadow Box
    Validation: None
    Validation Message: None
    Tab Sequence: 60
    Initial Value: None
    Edit Style: Edit
    Edit limit: 0
```

```
DataWindow: d_work_order_rpt                                    Page: 6
Library: d:\projects\nwire\admin\v1-0pbl\aiconadm.pbl
Date: 7/8/96    Time: 11:25:31

Column: account
    Updateable:  Yes
    Key:  No
    Format: "[general]"
    Border style: Shadow Box
    Validation: None
    Validation Message: None
    Tab Sequence: 80
    Initial Value: None
    Edit Style: Edit
    Edit limit: 30
Column: telephone
    Updateable:  Yes
    Key:  No
    Format: "[general]"
    Border style: Shadow Box
    Validation: None
    Validation Message: None
    Tab Sequence: 90
    Initial Value: None
    Edit Style: Edit
    Edit limit: 20
Column: originals
    Updateable:  Yes
    Key:  No
    Format: "[general]"
    Border style: Shadow Box
    Validation: None
    Validation Message: None
    Tab Sequence: 130
    Initial Value: None
    Edit Style: Edit
    Edit limit: 0
Column: sets
    Updateable:  Yes
    Key:  No
    Format: "[general]"
    Border style: Shadow Box
    Validation: None
    Validation Message: None
    Tab Sequence: 140
    Initial Value: None
    Edit Style: Edit
    Edit limit: 0
Column: impressions
    Updateable:  Yes
    Key:  No
    Format: "[general]"
    Border style: Shadow Box
    Validation: None
    Validation Message: None
    Tab Sequence: 150
    Initial Value: None
```

DataWindow: d_work_ordr_rpt Page: ?
Library: d:\projects\nwire\admin\v1-0b1\alconadm.pbl
Date: 7/8/96 Time: 11:25:31

```
        Edit Style: Edit
        Edit limit: 0
    Column: input_output
        Updateable:  Yes
        Key:  No
        Format: "[general]"
        Border style: Shadow Box
        Validation: None
        Validation Message: None
        Tab Sequence: 160
        Initial Value: None
        Edit Style: Edit
        Edit limit: 0
    Column: collated
        Updateable:  Yes
        Key:  No
        Format: "[general]"
        Border style: Shadow Box
        Validation: None
        Validation Message: None
        Tab Sequence: 170
        Initial Value: None
        Edit Style: Edit
        Edit limit: 0
    Column: page_numbering
        Updateable:  Yes
        Key:  No
        Format: "[general]"
        Border style: Shadow Box
        Validation: None
        Validation Message: None
        Tab Sequence: 180
        Initial Value: None
        Edit Style: Edit
        Edit limit: 1
    Column: num_font_size
        Updateable:  Yes
        Key:  No
        Format: "[general]"
        Border style: Shadow Box
        Validation: None
        Validation Message: None
        Tab Sequence: 190
        Initial Value: None
        Edit Style: Edit
        Edit limit: 0
    Column: tabs_numbered
        Updateable:  Yes
        Key:  No
        Format: "[general]"
        Border style: Shadow Box
        Validation: None
        Validation Message: None
```

```
DataWindow: d_work_order_rpt                                          Page: 5
Library: d:\projects\nwire\admin\v1 0b1\aiconadm.pbl
Date: [illegible]95    Time: [illegible]

    Tab Sequence: 200
    Initial Value: None
    Edit Style: Edit
    Edit limit: 1
Column: num_location
    Updateable:  Yes
    Key:  No
    Format: "[general]"
    Border style: Shadow Box
    Validation: None
    Validation Message: None
    Tab Sequence: 210
    Initial Value: None
    Edit Style: Edit
    Edit limit: 2
Column: mirror
    Updateable:  Yes
    Key:  No
    Format: "[general]"
    Border style: Shadow Box
    Validation: None
    Validation Message: None
    Tab Sequence: 220
    Initial Value: None
    Edit Style: Edit
    Edit limit: 1
Column: pg_num_orientation
    Updateable:  Yes
    Key:  No
    Format: "[general]"
    Border style: Shadow Box
    Validation: None
    Validation Message: None
    Tab Sequence: 230
    Initial Value: None
    Edit Style: Edit
    Edit limit: 0
Column: start_page
    Updateable:  Yes
    Key:  No
    Format: "[general]"
    Border style: Shadow Box
    Validation: None
    Validation Message: None
    Tab Sequence: 240
    Initial Value: None
    Edit Style: Edit
    Edit limit: 0
Column: start_number
    Updateable:  Yes
    Key:  No
    Format: "[general]"
    Border style: Shadow Box
```

```
DataWindow: d_work_order_rpt
Library: d:\projects\nwire\admin\v1-0b1\aiconadm.pbl                    Page: 6
Date: 7/6/95    Time: 11:25:31

      Validation: None
      Validation Message: None
      Tab Sequence: 250
      Initial Value: None
      Edit Style: Edit
      Edit limit: 0
  Column: covers
      Updateable:  Yes
      Key:  No
      Format: "[general]"
      Border style: Shadow Box
      Validation: None
      Validation Message: None
      Tab Sequence: 260
      Initial Value: None
      Edit Style: Edit
      Edit limit: 1
  Column: provided
      Updateable:  Yes
      Key:  No
      Format: "[general]"
      Border style: Shadow Box
      Validation: None
      Validation Message: None
      Tab Sequence: 270
      Initial Value: None
      Edit Style: Edit
      Edit limit: 1
  Column: front_back_same
      Updateable:  Yes
      Key:  No
      Format: "[general]"
      Border style: Shadow Box
      Validation: None
      Validation Message: None
      Tab Sequence: 280
      Initial Value: None
      Edit Style: Edit
      Edit limit: 1
  Column: front_text_side1
      Updateable:  Yes
      Key:  No
      Format: "[general]"
      Border style: Shadow Box
      Validation: None
      Validation Message: None
      Tab Sequence: 290
      Initial Value: None
      Edit Style: Edit
      Edit limit: 1
  Column: front_text_side2
      Updateable:  Yes
      Key:  No
```

```
DataWindow: d_work_order_rpt                                    Page: 10
Library: d:\projects\nwire\admin\v1-0b1\alconadm.pbl
Date: 7/6/95   Time: 11:28:31

     Format: "[general]"
     Border style: Shadow Box
     Validation: None
     Validation Message: None
     Tab Sequence: 300
     Initial Value: None
     Edit Style: Edit
     Edit limit: 1
Column: back_text_side1
     Updateable:  Yes
     Key:  No
     Format: "[general]"
     Border style: Shadow Box
     Validation: None
     Validation Message: None
     Tab Sequence: 310
     Initial Value: None
     Edit Style: Edit
     Edit limit: 1
Column: back_text_side2
     Updateable:  Yes
     Key:  No
     Format: "[general]"
     Border style: Shadow Box
     Validation: None
     Validation Message: None
     Tab Sequence: 320
     Initial Value: None
     Edit Style: Edit
     Edit limit: 1
Column: page_level_color
     Updateable:  Yes
     Key:  No
     Format: "[general]"
     Border style: Shadow Box
     Validation: None
     Validation Message: None
     Tab Sequence: 330
     Initial Value: None
     Edit Style: Edit
     Edit limit: 0
Column: page_level_weight
     Updateable:  Yes
     Key:  No
     Format: "[general]"
     Border style: Shadow Box
     Validation: None
     Validation Message: None
     Tab Sequence: 340
     Initial Value: None
     Edit Style: Edit
     Edit limit: 0
Column: page_level_size
```

```
[illegible]: [illegible]_order_rpt
Library: d:\projects\nwirc\admin\v1-0b1\atconadm.pbl                Page: [illegible]
Date: [illegible]    Time: [illegible]

       Updateable:  Yes
       Key:  No
       Format: "[general]"
       Border style: Shadow Box
       Validation: None
       Validation Message: None
       Tab Sequence: 350
       Initial Value: None
       Edit Style: Edit
       Edit limit: 0
   Column: page_level_brand
       Updateable:  Yes
       Key:  No
       Format: "[general]"
       Border style: Shadow Box
       Validation: None
       Validation Message: None
       Tab Sequence: 360
       Initial Value: None
       Edit Style: Edit
       Edit limit: 0
   Column: front_color
       Updateable:  Yes
       Key:  No
       Format: "[general]"
       Border style: Shadow Box
       Validation: None
       Validation Message: None
       Tab Sequence: 370
       Initial Value: None
       Edit Style: Edit
       Edit limit: 0
   Column: front_weight
       Updateable:  Yes
       Key:  No
       Format: "[general]"
       Border style: Shadow Box
       Validation: None
       Validation Message: None
       Tab Sequence: 380
       Initial Value: None
       Edit Style: Edit
       Edit limit: 0
   Column: front_size
       Updateable:  Yes
       Key:  No
       Format: "[general]"
       Border style: Shadow Box
       Validation: None
       Validation Message: None
       Tab Sequence: 390
       Initial Value: None
       Edit Style: Edit
```

```
    Edit limit: 0
umn: front_brand
    Updateable:  Yes
    Key:  No
    Format: "[general]"
    Border style: Shadow Box
    Validation: None
    Validation Message: None
    Tab Sequence: 400
    Initial Value: None
    Edit Style: Edit
    Edit limit: 0
Column: back_color
    Updateable:  Yes
    Key:  No
    Format: "[general]"
    Border style: Shadow Box
    Validation: None
    Validation Message: None
    Tab Sequence: 410
    Initial Value: None
    Edit Style: Edit
    Edit limit: 0
Column: back_weight
    Updateable:  Yes
    Key:  No
    Format: "[general]"
    Border style: Shadow Box
    Validation: None
    Validation Message: None
    Tab Sequence: 420
    Initial Value: None
    Edit Style: Edit
    Edit limit: 0
Column: back_size
    Updateable:  Yes
    Key:  No
    Format: "[general]"
    Border style: Shadow Box
    Validation: None
    Validation Message: None
    Tab Sequence: 430
    Initial Value: None
    Edit Style: Edit
    Edit limit: 0
Column: back_brand
    Updateable:  Yes
    Key:  No
    Format: "[general]"
    Border style: Shadow Box
    Validation: None
    Validation Message: None
    Tab Sequence: 440
```

```
DataWindow: d_work_order_rpt
Library: d:\projects\nwire\admin\v1-0b1\aiconadm.pbl
Date: 7-6-95    Time: 11:25:31
```

```
    Initial Value: None
    Edit Style: Edit
    Edit limit: 0
Column: tabs_color
    Updateable:  Yes
    Key:  No
    Format: "[general]"
    Border style: Shadow Box
    Validation: None
    Validation Message: None
    Tab Sequence: 450
    Initial Value: None
    Edit Style: Edit
    Edit limit: 0
Column: tabs_bank_num
    Updateable:  Yes
    Key:  No
    Format: "[general]"
    Border style: Shadow Box
    Validation: None
    Validation Message: None
    Tab Sequence: 460
    Initial Value: None
    Edit Style: Edit
    Edit limit: 0
Column: tabs_printed
    Updateable:  Yes
    Key:  No
    Format: "[general]"
    Border style: Shadow Box
    Validation: None
    Validation Message: None
    Tab Sequence: 470
    Initial Value: None
    Edit Style: Edit
    Edit limit: 1
Column: tabs_provided
    Updateable:  Yes
    Key:  No
    Format: "[general]"
    Border style: Shadow Box
    Validation: None
    Validation Message: None
    Tab Sequence: 480
    Initial Value: None
    Edit Style: Edit
    Edit limit: 1
Column: insertc
    Updateable:  Yes
    Key:  No
    Format: "[general]"
    Border style: Shadow Box
    Validation: None
```

```
    Validation Message: None
    Tab Sequence: 490
    Initial Value: None
    Edit Style: Edit
    Edit limit: 1
Column: inserts_instructions
    Updateable:  Yes
    Key:  No
    Format: "[general]"
    Border style: Shadow Box
    Validation: None
    Validation Message: None
    Tab Sequence: 500
    Initial Value: None
    Edit Style: Edit
    Edit limit: 1
Column: input_orientation
    Updateable:  Yes
    Key:  No
    Format: "[general]"
    Border style: Shadow Box
    Validation: None
    Validation Message: None
    Tab Sequence: 510
    Initial Value: None
    Edit Style: Edit
    Edit limit: 0
Column: output_orientation
    Updateable:  Yes
    Key:  No
    Format: "[general]"
    Border style: Shadow Box
    Validation: None
    Validation Message: None
    Tab Sequence: 520
    Initial Value: None
    Edit Style: Edit
    Edit limit: 0
Column: orientation_instr
    Updateable:  Yes
    Key:  No
    Format: "[general]"
    Border style: Shadow Box
    Validation: None
    Validation Message: None
    Tab Sequence: 530
    Initial Value: None
    Edit Style: Edit
    Edit limit: 1
Column: scalable
    Updateable:  Yes
    Key:  No
    Format: "[general]"
```

DataWindow: d_work_order_rpt
Library: d:\projects\nwire\admin\v1-0b1\aiconadm.pbl
Date: ... Time: 11:05:31

Page: 15

Border style: Shadow Box
Validation: None
Validation Message: None
Tab Sequence: 540
Initial Value: None
Edit Style: Edit
Edit limit: 1
Column: reduction_percent
Updateable: Yes
Key: No
Format: "[general]"
Border style: Shadow Box
Validation: None
Validation Message: None
Tab Sequence: 550
Initial Value: None
Edit Style: Edit
Edit limit: 0
Column: enlarge_percent
Updateable: Yes
Key: No
Format: "[general]"
Border style: Shadow Box
Validation: None
Validation Message: None
Tab Sequence: 560
Initial Value: None
Edit Style: Edit
Edit limit: 0
Column: scale_instructions
Updateable: Yes
Key: No
Format: "[general]"
Border style: Shadow Box
Validation: None
Validation Message: None
Tab Sequence: 570
Initial Value: None
Edit Style: Edit
Edit limit: 1
Column: crop
Updateable: Yes
Key: No
Format: "[general]"
Border style: Shadow Box
Validation: None
Validation Message: None
Tab Sequence: 580
Initial Value: None
Edit Style: Edit
Edit limit: 1
Column: window
Updateable: Yes

66

```
DataWindow: d_work_order_[illegible]
Library: d:\projects\nwirc\admin\v1-[illegible]\aiconadm.pbl
Date: [illegible]    Time: [illegible]

    Key:  No
    Format: "[general]"
    Border style: Shadow Box
    Validation: None
    Validation Message: None
    Tab Sequence: 590
    Initial Value: None
    Edit Style: Edit
    Edit limit: 1
Column: image_shift
    Updateable:  Yes
    Key:  No
    Format: "[general]"
    Border style: Shadow Box
    Validation: None
    Validation Message: None
    Tab Sequence: 600
    Initial Value: None
    Edit Style: Edit
    Edit limit: 1
Column: merge
    Updateable:  Yes
    Key:  No
    Format: "[general]"
    Border style: Shadow Box
    Validation: None
    Validation Message: None
    Tab Sequence: 610
    Initial Value: None
    Edit Style: Edit
    Edit limit: 1
Column: finishing
    Updateable:  Yes
    Key:  No
    Format: "[general]"
    Border style: Shadow Box
    Validation: None
    Validation Message: None
    Tab Sequence: 620
    Initial Value: None
    Edit Style: Edit
    Edit limit: 0
Column: inhouse
    Updateable:  Yes
    Key:  No
    Format: "[general]"
    Border style: Shadow Box
    Validation: None
    Validation Message: None
    Tab Sequence: 630
    Initial Value: None
    Edit Style: Edit
    Edit limit: 0
```

```
DataWindow: d_work_order_rpt
Library: d:\projects\nwire\admin\v1-0b1\aiconadm.pbl                Page: 17
Date: 7/6/95    Time: 11:25:21

Column: color_specifications
    Updateable:  Yes
    Key:  No
    Format: "[general]"
    Border style: Shadow Box
    Validation: None
    Validation Message: None
    Tab Sequence: 640
    Initial Value: None
    Edit Style: Edit
    Edit limit: 40
Column: image_shifhtx
    Updateable:  Yes
    Key:  No
    Format: "[general]"
    Border style: Shadow Box
    Validation: None
    Validation Message: None
    Tab Sequence: 660
    Initial Value: None
    Edit Style: Edit
    Edit limit: 0
Column: image_shifty
    Updateable:  Yes
    Key:  No
    Format: "[general]"
    Border style: Shadow Box
    Validation: None
    Validation Message: None
    Tab Sequence: 670
    Initial Value: None
    Edit Style: Edit
    Edit limit: 0
Column: center_image
    Updateable:  Yes
    Key:  No
    Format: "[general]"
    Border style: Shadow Box
    Validation: None
    Validation Message: None
    Tab Sequence: 680
    Initial Value: None
    Edit Style: Edit
    Edit limit: 1
Column: primary_software
    Updateable:  Yes
    Key:  No
    Format: "[general]"
    Border style: Shadow Box
    Validation: None
    Validation Message: None
    Tab Sequence: 690
    Initial Value: None
```

```
DataWindow: d_work_order_rpt                                         Page: 16
Library: d:\projects\nwire\admin\v1-0b1\alconadm.pbl
Date: 7/6/95   Time: 11:25:31

    Edit Style: DropDownList
    Edit limit: 0
    Coded Values:
        "MS Word for Windows" to "MS Word for Windows"
        "MS Word for MAC" to "MS Word for MAC"
        "Quark / MAC" to "Quark / MAC"
        "MS Excel Windows" to "MS Excel Windows"
        "MS Excel MAC" to "MS Excel MAC"
        "Word Perfect" to "Word Perfect"
        "AMI Pro" to "AMI Pro"
        "PageMaker Windows" to "PageMaker Windows"
        "PageMaker MAC" to "PageMaker MAC"
Column: job_name
    Updateable:  Yes
    Key:  No
    Format: "[general]"
    Border style: Shadow Box
    Validation: None
    Validation Message: None
    Tab Sequence: 70
    Initial Value: None
    Edit Style: Edit
    Edit limit: 128
Column: message
    Updateable:  Yes
    Key:  No
    Format: "[general]"
    Border style: Shadow Box
    Validation: None
    Validation Message: None
    Tab Sequence: 100
    Initial Value: None
    Edit Style: Edit
    Edit limit: 128
Column: instructions
    Updateable:  Yes
    Key:  No
    Format: "[general]"
    Border style: Shadow Box
    Validation: None
    Validation Message: None
    Tab Sequence: 110
    Initial Value: None
    Edit Style: Edit
    Edit limit: 250
Column: deliver_to
    Updateable:  Yes
    Key:  No
    Format: "[general]"
    Border style: Shadow Box
    Validation: None
    Validation Message: None
    Tab Sequence: 120
```

```
DataWindow: d_work_order_rpt
Library: d:\projects\nwire\admin\v1 0p1\aiconadm.pbl          Page: 18
Date: 6/95    Time: 11:25:31

    Initial Value: None
    Edit Style: Edit
    Edit limit: 128
Column: explanations
    Updateable:  Yes
    Key:  No
    Format: "[general]"
    Border style: Shadow Box
    Validation: None
    Validation Message: None
    Tab Sequence: 650
    Initial Value: None
    Edit Style: Edit
    Edit limit: 128
Column: ordered_by
    Updateable:  Yes
    Key:  No
    Format: "[general]"
    Border style: Shadow Box
    Validation: None
    Validation Message: None
    Tab Sequence: 30
    Initial Value: None
    Edit Style: Edit
    Edit limit: 128
```

```
Function:  f_get_sysparms                                                    Page: 1
Library: d:\projects\nwire\admin\v1-0b1\aiconadm.pbl
Date: [illegible]        Time: 11:25:02


Function        :   f_get_sysparms
Return Type     :   none
Arguments       :   none


  SELECT "system"."unreaddir",
         "system"."openeddir",
         "system"."readtempdir"
    INTO :gs_unread,
         :gs_opened,
         :gs_temp
    FROM "system"  ;


end subroutine
```

```
Menu: m_main
Library: d:\projects\nwire\admin\v1-0b1\aiconadm.pbl                Page:
Date: 7 6 96     Time: 11:25:02

Menu:

   r = m_main
MenuItem = m_file    "&File"
Visible = true     Enabled = true
MicroHelp - "Work Order, print, and setup options"

MenuItem = m_queues    "&Queues"
Visible = true     Enabled = true

MenuItem = m_tabs    "&Tabs"
    Enabled = true
MicroHelp = "Text manipulation"

MenuItem = m_help    "&Help"
Visible = true     Enabled = true
MicroHelp = "Help and About"

MenuItems for m_file
MenuItem = m_new    "&New Work Order    Alt+N"
    Enabled = true
MicroHelp = "Open new work order"
ToolBarItemName = "ScriptNo!"
ToolBarItemText = "&New"    ToolBarItemOrder = 1    Shortcut = 590

Script for: clicked  event
m_main.m_file.m_new.disable()
m_main.m_file.m_open.disable()
m_main.m_file.m_close.enable()
m_main.m_file.m_cancel.enable()
m_main.m_file.m_save.enable()
m_main.m_file.m_saveas.disable()
m_main.m_file.m_delete.enable()
m_main.m_file.m_print.enable()
m_main.m_file.m_transmit.enable()

//m_main.m_tabs.visible = true
//m_main.m_tabs.enable()

w_mdi_frame.triggerevent("ueb_new")
m_main.m_file.m_exit.toolbaritemvisible = false
m_main.m_file.m_close.toolbaritemvisible = true


End of Script


MenuItem = m_open    "&Open Work Order...  Alt+O"
Visible = true     Enabled = true
MicroHelp = "Open existing work order"
 ToolBarItemName = "Custom050!"    ToolBarItemVisible = true
 ToolBarItemText = "&Open"    ToolBarItemOrder = 2    Shortcut = 591

Script for: clicked  event

w_mdi_frame.triggerevent("ueb_open")
```

```
Menu: m_oper                                                    Page: 1
Library: d:\projects\nwire\admin\v1-0b1\aiconadm.pbl
Date: [illegible]     Time: [illegible]

//if
  gb_cancelled <> true then
//  m_main.m_file.m_exit.toolbaritemvisible = false
//  m_main.m_file.m_close.toolbaritemvisible = true
//end if

End of Script


MenuItem = m_close    "Close Work Order Ctrl+F4"
Visible = true
MicroHelp = "Close the current work order"
ToolBarItemName = "Custom038!"
ToolBarItemText = "Close"    ToolBarItemOrder = 98    ToolBarItemSpace = 20    Shortcut = 371

Script for: clicked  event

m_main.m_file.m_exit.toolbaritemvisible = true
m_main.m_file.m_close.toolbaritemvisible = false
w_mdi_frame.triggerevent("ueb_close")

End of Script


MenuItem = m_cancel    "&Cancel Work Order"

MicroHelp = "Cancel current work order"
ToolBarItemName = "Custom021!"
ToolBarItemText = "Cancel"    ToolBarItemOrder = 3

Script for: clicked  event

m_main.m_file.m_exit.toolbaritemvisible = true
m_main.m_file.m_close.toolbaritemvisible = false

w_mdi_frame.triggerevent("ueb_cancel")

End of Script


MenuItem = m_save    "&Save Work Order"

MicroHelp = "Save work order"
ToolBarItemName = "Custom008!"
ToolBarItemText = "Save"    ToolBarItemOrder = 3

Script for: clicked  event
w_mdi_frame.triggerevent("ueb_save_wo")

End of Script
```

```
MenuItem = m_saveas    "Copy Work Order"


Script for: clicked  event
gb_saveas = true

w_mdi_frame.triggerevent("ueb_saveas")

End of Script



MenuItem = m_delete    "&Delete Work Order"
Visible = true    Enabled = true
MicroHelp = "Delete work order"
ToolBarItemName = "Clear!"
ToolBarItemText = "Delete"    ToolBarItemOrder = 4    ToolBarItemSpace = 5

Script for: clicked  event
//if isvalid(w_work_order) then
//  return
////    w_work_order.cb_save_and_exit.triggerevent(clicked!)
//else
//  beep(1)
//end if

w_mdi_frame.triggerevent("ueb_delete")

m_main.m_file.m_exit.toolbaritemvisible = true
m_main.m_file.m_close.toolbaritemvisible = false

End of Script



MenuItem = m_-2    "-"
Visible = true    Enabled = true

MenuItem = m_print    "&Print Work Order    Ctrl+P"
Visible = true
MicroHelp = "Print work order"
ToolBarItemName = "Print!"    ToolBarItemVisible = true
ToolBarItemText = "Print"    ToolBarItemOrder = 5    ToolBarItemSpace = 5    Shortcut = 336

Script for: clicked  event
//Script clicked for m_print of m_menu

triggerevent( parentwindow, "we_print_wo" )
```

```
Menu: m_print                                                    Page: 4
Library: d:\projects\nwire\admin\v1-0b1\aiconadm.pbl
Date: 1/6/95     Time: 11:25:02


End of Script


MenuItem = m_printsetup    "P&rint Setup"
Visible = true     Enabled = true
MicroHelp = "Printer selection and printer setup"

Script for: clicked  event
PrintSetup()

End of Script



MenuItem = m_-3     "-"
Visible = true     Enabled = true

MenuItem = m_setup     "System S&etup"
Visible = true     Enabled = true
MicroHelp = "Setup user preferences"

MenuItem = m_-     "-"
    Enabled = true

MenuItem = m_transmit     "&Transmit Work Order"

MicroHelp = "Transfer work order to Nightrider"
ToolBarItemName = "Custom020!"
ToolBarItemText = "Send"     ToolBarItemOrder = 6     ToolBarItemSpace = 5

Script for: clicked  event

triggerevent(parentwindow, "we_transmit")



End of Script



MenuItem = m_-4     "-"
Visible = true     Enabled = true

MenuItem = m_exit     "E&xit  Alt+F4"
Visible = true     Enabled = true
MicroHelp = "Exit application"
ToolBarItemName = "Exit!"     ToolBarItemVisible = true
ToolBarItemText = "Exit"     ToolBarItemOrder = 98     ToolBarItemSpace = 20     Shortcut = 627

Script for: clicked  event
Close(parentwindow)

End of Script
```

```
[illegible]
Library: d:\projects\nwire\admin\v1 0b1\aiconadm.pbl                    Page: [illegible]
Date: [illegible]     Time: 11:25:[illegible]


     Items for m_setup
MenuItem = m_transferparameters     "&Modem Port Setup ..."
     Enabled = true

Script for: clicked  event

triggerevent(parentwindow, "we_transmit_setup")



End of Script


MenuItem = m_modeminitstring     "Modem &Init String"
     Enabled = true

Script for: clicked  event
//
//
//
     open( w_modem_setup )

End of Script


MenuItem = m_-1     "-"
     Enabled = true

MenuItem = m_tapecommand     "Tape &Transfer Command"
     Enabled = true

Script for: clicked  event
//
//
//
     open( w_set_tapeparms )

End of Script


MenuItem = m_-6     "-"
     Enabled = true

MenuItem = m_searchpathmask     "File Search &Path && Mask"
     Enabled = true

Script for: clicked  event
Open(w_user_preferences)

End of Script
```

```
Menu: m_main
Library: d:\projects\nwire\admin\v1 0b1\aiconadm.pbl
Date: 8/95    Time: 11:31:02

Menu
    MenuItem = m_documentpaths    "&Document Paths"
Visible = true      Enabled = true
Script for: clicked   event
//

//

    setpointer( hourglass! )
    open(w_system_update)


End of Script


MenuItem = m_-8     "-"
Visible = true      Enabled = true

MenuItem = m_loadnightwirehost    "Load &NightWire Host"
Visible = true      Enabled = true

Script for: clicked   event
//

//

setpointer( hourglass! )

w_mdi_frame.setmicrohelp ( "Loading NightRider " + app_title + &
                         " HOST/BBS Software ... " )

    run("nwirebbs.exe")

w_mdi_frame.setmicrohelp ("")

setpointer( arrow! )


End of Script


MenuItems for m_queues
MenuItem = m_documentsrecieved    "&Documents Recieved (Un-Read) Ctrl+Q"
Visible = true      Enabled = true
ToolBarItemName = "AddWatch!"     ToolBarItemVisible = true
ToolBarItemText = "Queue"    ToolBarItemOrder = 50    Shortcut = 337
Script for: clicked   event


    triggerevent( parentwindow, "we_poll_received" )
```

```
Menu: m_Documentsretrieved
Library: d:\projects\nwire\admin\v1-0b1\aiconadm.pbl
Date: 7 6 95     Time: 11:21:02
```

```
    of Script


MenuItem = m_docsnotproduced    "Documents Opened &Not Produced"
Visible = true     Enabled = true

Script for: clicked  event
//
//
//
    triggerevent( parentwindow, "we_list_suspended" )


End of Script


MenuItem = m_docsproduced    "Documents Opened &Produced"
Visible = true     Enabled = true

Script for: clicked  event
//
//
//
    triggerevent( parentwindow, "we_list_produced" )


End of Script


MenuItem = m_-7    "-"
    Enabled = true

MenuItem = m_filter    "&Filter ..."
    Enabled = true
ToolBarItemName = "Group!"
ToolBarItemText = "Filter"    ToolBarItemOrder = 55

Script for: clicked  event
triggerevent( parentwindow, "we_setfilter" )


End of Script


Menu
Item = m_sort    "&Sort ..."
    Enabled = true
ToolBarItemName = "Sort!"
ToolBarItemText = "Sort"    ToolBarItemOrder = 50

Script for: clicked  event
triggerevent( parentwindow, "we_setsort" )
```

```
End of Script


MenuItems for m_tabs
MenuItem = m_general_info    "&General Info Alt+G"
Visible = true      Enabled = true
MicroHelp = "Undo previous cut, copy, paste, or clear"     Shortcut = 583

Script for: clicked  event
w_mdi_frame.cb_tabs.ActivateTab &
                    (w_mdi_frame.cb_tabs.iTabs[1].TabGraphic)


End of Script


MenuItem = m_account     "&Account    Alt+A"
Visible = true      Enabled = true
MicroHelp = "Cut selected item"     Shortcut = 577

Script for: clicked  event
w_mdi_frame.cb_tabs.ActivateTab &
                    (w_mdi_frame.cb_tabs.iTabs[2].TabGraphic)


End of Script


MenuItem = m_page     "&Page  Alt+P"
Visible = true      Enabled = true      Shortcut = 592

Script for: clicked  event
w_mdi_frame.cb_tabs.ActivateTab &
                    (w_mdi_frame.cb_tabs.iTabs[3].TabGraphic)


End of Script


MenuItem = m_stock     "Stoc&k    Alt+K"
Visible = true      Enabled = true
MicroHelp = "Copy selected item"     Shortcut = 587

Script for: clicked  event
w_mdi_frame.cb_tabs.ActivateTab &
                    (w_mdi_frame.cb_tabs.iTabs[4].TabGraphic)


End of Script
```

```
Menu: m_main
Library: d:\projects\nwire\admin\v1 0b1\aiconadm.pbl                    Page: 8
Date: [illegible]   Time: 11:25:02

Menuitem = m_notes    "No&tes   Alt+T"
Visible = true     Enabled = true
MicroHelp = "Paste selected item"     Shortcut = 596

Script for: clicked  event
w_mdi_frame.cb_tabs.ActivateTab &
                   (w_mdi_frame.cb_tabs.iTabs[5].TabGraphic)


End of Script



MenuItem = m_documents    "&Documents   Alt+D"
Visible = true     Enabled = true
MicroHelp = "Clear selected item"     Shortcut = 580

Script for: clicked  event
w_mdi_frame.cb_tabs.ActivateTab &
                   (w_mdi_frame.cb_tabs.iTabs[6].TabGraphic)


End of Script



MenuItem = m_selectdocuments    "Se&lect Documents Alt+L"
   Enabled = true     Shortcut = 588

Script for: clicked  event
w_mdi_frame.cb_tabs.ActivateTab &
           (w_mdi_frame.cb_tabs.iTabs[7].TabGraphic)


End of Script



MenuItems for m_help
MenuItem = m_help1    "&Help"
Visible = true     Enabled = true
MicroHelp = "Application Help"
ToolBarItemName = "Help!"     ToolBarItemVisible = true
ToolBarItemText = "Help"     ToolBarItemOrder = 90

MenuItem = m_helponhelp    "H&ow to Use Help"
Visible = true     Enabled = true
MicroHelp = "Help on How to Use Help"

Script for: clicked  event
ShowHelp("winhelp.HLP", index!)
End of Script



MenuItem = m_-5    "-"
Visible = true     Enabled = true
```

80

```
Menu: m_main                                                    Page: 1[illegible]
Library: d:\projects\nwirc\admin\v1-0b1\aiconadm.pbl
Date: 7/6/95     Time: 11:25:02

MenuItem = m_about     "&About"
    Visible = true      Enabled = true

Script for: clicked  event
open( w_about_admin )


End of Script
```

User Object: uo_nightwire_adm14 Page: 
Library: d:\projects\nwire\admin\v1-0bl\aiconadm.pbl
Date: 6/95 Time: 11:25:02 ghtWire / Office

User Object: uo_nightwire_adm14

| | | | |
|---|---|---|---|
| X = 0 | Y = 0 | Width = 823 | Height = 105 |
| TabOrder = 0 | Visible = true | Text = "NightWire / Office" | |
| TextColor = 33554432 | BackColor = 12632256 | Alignment = center! | FillPattern = solid! |

User Object: uo_nightwire_adm24 Page: 1
Library: d:\projects\nwire\admin\v1-0b1\aiconadm.pbl
Date: 1/6/95 Time: 11:25:02

NightWire / Office

User Object: uo_nightwire_adm24

| | | | |
|---|---|---|---|
| X = 0 | Y = 0 | Width = 1294 | Height = 169 |
| TabOrder = 0 | Visible = true | Text = "NightWire / Office" | |
| TextColor = 33554432 | BackColor = 12632256 | Alignment = center! | FillPattern = solid! |

```
User Object: uo_page_1                                                Page: 1
Library: d:\projects\nwire\admin\v1 0b1\aiconadm.pbl
Date: [illegible]     Time: 11:25:02
```

User Object: uo_page_1

```
X = 0                   Y = 0                   Width = 2314            Height = 1161
TabOrder = 0            Visible = true          Enabled = true          Border = true
BackColor = 12632256    ObjectType = customvisual!
```

Window: dw_wo_page_1

```
X = 0                   Y = 0                   Width = 2300            Height = 1137
TabOrder = 10           Visible = true          Enabled = true
DataObject = "d_job_ticket_general"             LiveScroll = true       BorderStyle = stylebox!

Script for: itemchanged event
//
//
string ls_colname, ls_due_day
long      ll_row

ll_row = getrow()

ls_colname = UPPER( getcolumnname() )

choose case ls_colname
   case "DUE_CUST_DATE"
//      if getitemdate(ll_row  , "DUE_CUST_DATE") >= getitemdate(getrow(), "WO_DATE" ) then
//          ls_due_day = mid( dayname( getitemdate(ll_row , "DUE_CUST_DATE" ) ), 1, 3)
//
//          w_mdi_frame.uo_page_01.dw_wo_page_1.setitem(ll_row , "due_cust_day",ls_due_day)

//      else
//          beep(1)
            messagebox("Invalid Due Date", &
                  "Due Date can't be earlier than Work Order Date", stopsign!)
//          setcolumn( "DUE_CUST_DATE" )
            selecttext(1,99)
//      end if
   case "DUE_CUST_TIME"
```

Window: w_page_1
Library: d:\projects\nwire\admin\v1-0b1\aiconadm.pbl
Date: 7 6 95    Time: 11:15:07

```
end choose
```

End of Script

User Object: uo_select_items
Library: d:\projects\nwire\admin\v1-0b1\aiconadm.pbl
Date: 7/6/95 Time: 1:1_:07
Page:

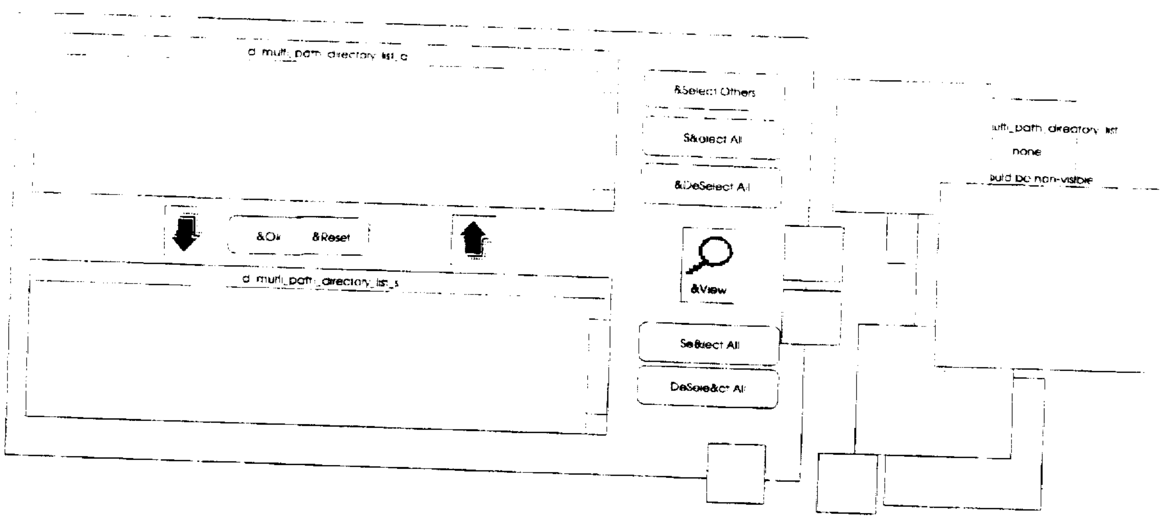

User Object: uo_select_items

| | | | |
|---|---|---|---|
| X = 0 | Y = 0 | Width = 2487 | Height = 1217 |
| TabOrder = 0 | Visible = true | Enabled = true | Border = true |
| BackColor = 12632256 | ObjectType = customvisual! | | |

Instance Variables
string is_transmitted_status
long il_selected_totalrows
long il_available_totalrows
long il_row
long il_i
long il_selected_rownum
boolean ib_selected_result
long il_selected_selectedrows
long il_selected_selected_row
long Il_selected_lowest_row
long il_selected_oldrow
long il_selected_startrow
long il_selected_endrow
long il_selected_i
long il_selected_newrow
long il_available_rownum
boolean ib_available_result
long il_available_selectedrows
long il_available_selected_row
long Il_available_lowest_row
long il_max_row_s
long il_max_row
string is_selected_str
string is_available_str
long il_available_oldrow
long il_available_startrow
long il_available_endrow Page: 1

```
Window: w_select_items
Library: d:\projects\nwire\admin\v1-0b1\aiconadm.pbl
Date: 7/6/95     Time: 11:25:07
long
ic - il_available_i
     il_available_newrow
long
End of Instance Variables


Script for: constructor  event
uf_new()



End of Script


Script for: destructor  event
////Function to move selected items to available datawindow
//setpointer(hourglass!)
//
////Total rows in dw_available
//il_max_row_s = dw_available.RowCount() + 1
//
////Total rows in dw_selected
//il_max_row = dw_selected.RowCount()
//
//    /If no rows available return
    il_max_row  < 1 then
//    return
//end if
//
////Set i to lowest row to optimize the do until
//il_i = il_selected_lowest_row
//
////Look for available and process until the end of the data or
////until all available rows have been processed
//DO UNTIL il_i > il_max_row or &
//          il_selected_selectedrows = 0
////Was this row available
//  ib_selected_result = dw_selected.Isselected(il_i)
////if not then bump i up by 1 and continue the process
//  if not ib_selected_result then
//      il_i = il_i + 1
//      continue
//  end if
//
////Get the item string from the selected side
//  is_selected_str = getitemstring(dw_selected,il_i,1)
//
////Insert a row on the available side
//  il_row = insertrow(dw_available,0)
////Set the item on the available side to the value from the selected
    side
    setitem(dw_available,il_row,1,is_selected_str)
////Delete the item on the selected side
//  deleterow(dw_selected,il_i)
////Decrement the il_max_row total for the selected side
//  il_max_row = il_max_row - 1
```

```
[illegible]
Library: c:\projects\nwire\admin\v1-0b1\aiconadm.pbl
[illegible]            Time: 11:15:01

   Increment the il_max_row_s total for the available side
//   il_max_row_s = il_max_row_s + 1
   Fix the displayed totals for selected and available
//  il_available_totalrows = il_available_totalrows - 1
   il_selected_selectedrows = il_selected_selectedrows + 1
   il_selected_totalrows = il_selected_totalrows + 1

 loop

 if il_available_selectedrows + il_selected_selectedrows = 1 then
   cb_view.enabled = true
//else
//  cb_view.enabled = false
//end if
//
////dw_available.setsort("1A")
////dw_available.sort()
//setpointer(arrow!)
//
//return
//
//

End of Script


  Script for: rbuttondown  event

x = 1

End of Script



Script for: ueb_select  event
//Function to move selected from available to selected datawindow
setpointer(hourglass!)

//Total rows in dw_selected
il_max_row_s = dw_selected.RowCount() + 1

//Total rows in dw_available
il_max_row = dw_available.RowCount()

//If no rows selected return
if il_max_row  < 1 then
   return
end if

// Set i to lowest row to optimize the do until
il_i = il_available_lowest_row

//Look for selected and process until the end of the data or
//until all selected rows have been processed
DO UNTIL il_i > il_max_row or &
         il_available_selectedrows = 0
```

Page: [illegible]

```
User Object: uo_select_items                                              Page:
Library: d:\projects\nwire\admin\v1.0b1\aiconadm.pbl
Date:            Time:    :01

//Was this row selected
    ib_available_result = dw_available.IsSelected(il_i)
    If not then bump i up by 1 and continue the process
    if not ib_available_result then
        il_i = il_i + 1
    continue
    end if
// if selected then...

//Get the item string from the selected side
    is_available_str = getitemstring(dw_available,il_i,1)

//Insert a row on the available side
    il_row = insertrow(dw_selected,0)
//Set the item on the selected side to the value from the available
//side
    setitem(dw_selected,il_row,1,is_available_str)
//Delete the item on the available side
    deleterow(dw_available,il_i)
//Decrement the il_max_row total for the available side
    il_max_row = il_max_row - 1
//Increment the il_max_row_s total for the selected side
    il_max_row_s = il_max_row_s + 1
//Fix the displayed totals for available and selected
    il_selected_totalrows = il_selected_totalrows + 1
    il_available_selectedrows = il_available_selectedrows - 1
    il_available_totalrows = il_available_totalrows - 1

if il_available_selectedrows + il_selected_selectedrows = 1 then
    pb_view.enabled = true
else
    pb_view.enabled = false
end if

//dw_selected.setsort("1A")
//dw_selected.sort()
setpointer(arrow!)

return


End of Script


Script for: ueb_deselect  event
//Function to move selected from selected to available datawindow
setpointer(hourglass!)

//  Total rows in dw_available
    il_max_row_s = dw_available.RowCount()

//Total rows in dw_selected
il_max_row   dw_selected.RowCount() + 1
```

```
Object: uo_select_items                                              Page: 1
Library: d:\projects\nwire\admin\v1-0b1\aiconadm.pbl
Date: 7/6/95     Time: 11:25:02

//if no rows available return
   if il_max_row < 1 then
   return
end if

//Set i to lowest row to optimize the do until
il_i = il_selected_lowest_row

//Look for available and process until the end of the data or
//until all available rows have been processed
DO UNTIL il_i > il_max_row or &
          il_selected_selectedrows = 0
//Was this row available
   ib_selected_result = dw_selected.Isselected(il_i)
//if not then bump i up by 1 and continue the process
   if not ib_selected_result then
      il_i = il_i + 1
   continue
   end if
//if available then...

//Get the item string from the available side
   is_selected_str = getitemstring(dw_selected,il_i,1)

//Insert a row on the selected side
   il_row = insertrow(dw_available,0)
//Set the item on the available side to the value from the selected
  side
   setitem(dw_available,il_row,1,is_selected_str)
//Delete the item on the selected side
   deleterow(dw_selected,il_i)
//Decrement the il_max_row total for the selected side
   il_max_row = il_max_row - 1
//Increment the il_max_row_s total for the available side
   il_max_row_s = il_max_row_s + 1
//Fix the displayed totals for selected and available
   il_available_totalrows = il_available_totalrows + 1
   il_selected_selectedrows = il_selected_selectedrows - 1
   il_selected_totalrows = il_selected_totalrows - 1

loop

if il_selected_selectedrows + il_available_selectedrows = 1 then
   pb_view.enabled = true
else
   pb_view.enabled = false
end if

//dw_available.setsort("1A")
//dw_available.sort()
setpointer(arrow!)
return (return)


End of Script
```

```
[illegible] select_items                                                Page [illegible]
Library: d:\projects\nwi\rc\admin\v1-0b1\aicondcm.pbl
[illegible]   Time: [illegible]

Script for: ueb_initialize  event
long l
long l1
long l3

string docname
l = dw_available.rowcount()
l1 = 1
do until l1 > l
    dw_available.deleterow(l1)
    l1 = l1 + l1
loop

l = dw_save_available.rowcount()
l1 = 1

do until l1 > l
    docname = dw_save_available.getitemstring(l1,1)
    l3 = dw_available.insertrow(0)
    dw_available.setitem(l3,1,docname)
    l1 = l1 + l1
loop


End of Script


Script for: ueb_save_docs  event
long l
long l1
long l3
long l4
long l_wo_number
string s_wo_number
string docname
long lrt
int irt

//w_mdi_frame.uo_page_01.dw_wo_page_1.accepttext()
l_wo_number = w_mdi_frame.uo_page_01.dw_wo_page_1.getitemdecimal(1,"job_number")

dw_documents.settransobject(sqlca)
dw_documents.retrieve(l_wo_number)

l = dw_documents.rowcount()
l1 = 1
do until l1 > l
//  dw_documents.deleterow(0)
    l = l1 + 1
loop
if l > 0 then
    dw_documents.update()
end if
```

```
User Object: uf_select_items                                    Page: 
Library: d:\projects\nwire\admin\v1-0b1\aiconadm.pbl
Date: 7 6 96      Time: 11:25:01

COMMIT;

    dw_selected.rowcount()
l1 = 1

do until l1 > l
    docname = dw_selected.getitemstring(l1,1)
    l4 = dw_documents.insertrow(0)
    irt = dw_documents.setitem(l4,"job_number",l_wo_number)
    irt = dw_documents.setitem(l4,"document",docname)
    irt = dw_documents.setitem(l4,"seq_no",l1)
    l1 = l1 + 1
loop

dw_documents.update()
COMMIT;

w_mdi_frame.title = app_title + " - Work Order (" + &
                    string(l_wo_number) + ")"

m_main.m_file.m_new.disable()
m_main.m_file.m_open.disable()
m_main.m_file.m_close.enable()
m_main.m_file.m_cancel.enable()
m_main.m_file.m_save.enable()
m_main.m_file.m_saveas.enable()
m_main.m_file.m_delete.enable()
m_main.m_file.m_print.enable()
m_main.m_file.m_transmit.enable()




End of Script


public subroutine uf_new ()
dw_1.settransobject(sqlca)
dw_1.retrieve()
dw_2.settransobject(sqlca)
dw_2.retrieve()
long l
long l2
long l3

string mask_args[]
string path_args[]

l = dw_1.RowCount()
```

```
User Object: u_select_items                                        Page: 
Library: d:\projects\nwire\admin\v1-0b1\aiconadm.pbl
Date: 7/6/95     Time: 1:02:02

12 = 1
13 = 0
do until 12 > 1
    13 = 13 + 1
    mask_args[13] = dw_1.getitemstring(12,1)
    12 = 12 + 1
loop

l = dw_2.RowCount()
12 = 1
13 = 0
do until 12 > 1
    13 = 13 + 1
    path_args[13] = dw_2.getitemstring(12,1)
    12 =  12 + 1
loop

gstr_setup_parameters.s_mask = mask_args
gstr_setup_parameters.s_path = path_args

setpointer(hourglass!)
uo_1.uf_listdirs(gstr_setup_parameters.s_mask,gstr_setup_parameters.s_path,dw_available)
il_available_totalrows = dw_available.RowCount()
gs_transmit_status = 'N'
setpointer(arrow!)
this.pb_view.enabled = false

end subroutine



public subroutine uf_restore ()
long 11
long 1
long 13
string docname


dw_available.setredraw(false)

1 = dw_available.rowcount()
11 = 1
do until 11 > 1
    dw_available.deleterow(0)
    11 = 11 + 1
loop

1 = dw_save_available.rowcount()
11 = 1

do until 11 > 1
    docname = dw_save_available.getitemstring(11,1)
    13 = dw_available.insertrow(0)
    dw_available.setitem(13,1,docname)
    11 = 11 + 1
loop
```

```
User Object: uo_select_items
Library: d:\projects\nwire\admin\v1.0b1\aiconadm.pbl
Date: 7/6/9?     Time: 11:??:02
```

```
dw available.setredraw(true)

  selected.setredraw(false)

l = dw_selected.rowcount()
l1 = 1
do until l1 > l
    dw_selected.deleterow(0)
    l1 = l1 + 1
loop

l = dw_save_selected.rowcount()
l1 = 1

do until l1 > l
    docname = dw_save_selected.getitemstring(l1,1)
    l3 = dw_selected.insertrow(0)
    dw_selected.setitem(l3,1,docname)
    l1 = l1 + 1
loop
dw_selected.setredraw(true)




 subroutine


public subroutine uf_save ()
long l
long l1
long l3
string docname

l = dw_save_available.rowcount()
l1 = 1
do until l1 > l
    dw_save_available.deleterow(0)
    l1 = l1 + 1
loop

l = dw_available.rowcount()
l1 = 1

do until l1 > l
    docname = dw_available.getitemstring(l1,1)
    l3 = dw_save_available.insertrow(0)
    dw_save_available.setitem(l3,1,docname)
    l1 = l1 + 1


l = dw_save_selected.rowcount()
l1 = 1
do until l1 > l
    dw_save_selected.deleterow(0)
```

```
User Object: uf_select_items                                                    Page: 11
Library: d:\projects\nwire\admin\v1-0b1\aiconadm.pbl
Date: 7/6/95     Time: 11:23:01

    l1 = l1 + 1
end do

l = dw_selected.rowcount()
l1 = 1

do until l1 > l
    docname = dw_selected.getitemstring(l1,1)
    l3 = dw_save_selected.insertrow(0)
    dw_save_selected.setitem(l3,1,docname)
    l1 = l1 + 1
loop



end subroutine


public subroutine uf_clear ()
long l
long l1

l = dw_available.rowcount()
l1 = 1
do until l1 > l
    dw_available.deleterow(0)
    l1 = l1 + 1
loop

l = dw_selected.rowcount()
l1 = 1
do until l1 > l
    dw_selected.deleterow(0)
    l1 = l1 + 1
loop

end subroutine


public subroutine uf_open ()
long l
long l1
long l3
long l4
long wo_number
string docname

wo_number = w_mdi_frame.uc_page_01.dw_wo_page_1.getitemdecimal(1,"number")
dw_open.settransobject(sqlca)
dw_open.retrieve(wo_number)

dw_wo.settransobject(sqlca)
dw_wo.retrieve(wo_number)

l = dw_open.rowcount()
```

```
User Object: uo_select_items
Library: d:\projects\nwire\admin\v1-0b1\aiconadm.pbl                    Page: 11
Date: 9/6/95     Time: 11:25:02

l1 = 1
do until l1 > 1
    docname = dw_open.getitemstring(l1,"document")
    l3 = dw_selected.insertrow(0)
    dw_selected.setitem(l3,1,docname)
l4 = dw_available.dwFind("directory_detail_line = '" + docname + "'", 1, dw_available.rowcoun
t())
    if l4 > 0 then
        dw_available.deleterow(l4)
    end if
    l1 = l1 + 1
loop

l = dw_wo.rowcount()

is_transmitted_status = &
    w_mdi_frame.uo_page_01.dw_wo_page_1.getitemstring( 1 ,"transmitted")
if upper(is_transmitted_status) = 'Y' then
    w_mdi_frame.wf_disable_controls()
    gs_transmit_status = 'Y'
else
    gs_transmit_status = 'N'
end if

w_mdi_frame.title = app_title + " - Work Order (" + string &
            (w_mdi_frame.uo_page_01.dw_wo_page_1.getitemnumber &
            ( 1,"job_number" ) ) + ")"


end subroutine


public subroutine uf_delete (string str)
long l4
//Get the item string from the selected side
    is_selected_str = str
//Insert a row on the available side
    il_row = insertrow(dw_available,0)
//Set the item on the available side to the value from the selected
//side
    setitem(dw_available,il_row,1,is_selected_str)
//Delete the item on the selected side
    l4 = dw_selected.dwFind("directory_detail_line = '" + str + "'", 1, dw_selected.rowcount())
    deleterow(dw_selected,l4)
//Decrement the il_max_row total for the selected side
    il_max_row_s = il_max_row_s - 1
//Increment the il_max_row_s total for the available side
    il_max_row = il_max_row + 1
//the displayed totals for selected and available
    il_available_totalrows = il_available_totalrows + 1
    il_selected_selectedrows = il_selected_selectedrows - 1
    il_selected_totalrows = il_selected_totalrows - 1
```

```
if il_available_selectedrows + il_selected_selectedrows = 1 then
   pb_view.enabled = true

   pb_view.enabled = false
end if

//dw_available.setsort("1A")
//dw_available.sort()
setpointer(arrow!)

return


end subroutine



public subroutine test ()
string str
int l

   l = dw_available.getclickedrow()

   str = upper( getitemstring(dw_selected,l,1) )
   if pos( str, ".PDF" ) > 0 then
      dw_available.dragicon = "acrobat.ico"
   end if

end subroutine



public subroutine uf_get_file ()
int i_value
string s_docname
string s_named

nv_diskfile = create nv_diskfile
nv_diskfile.fnv_change_drive(gs_nav_drive)
nv_diskfile.fnv_change_dir(gs_nav_directory)
s_docname = gs_nav_directory
i_value = GetFileOpenName("Select Document", s_docname, s_named, "PDF", &
   "PDF Files (*.pdf), *.pdf," + &
   "DOC files (*.doc), *.doc,"  + &
   "Excel files (*.xl?), *.xl?," + &
   "All files (*.*), *.*" )
gs_nav_drive = nv_diskfile.fnv_get_drive()
gs_nav_directory = nv_diskfile.fnv_get_directory()
nv_diskfile.fnv_change_drive(gs_app_drive)
nv_diskfile.fnv_change_dir(gs_app_directory)
destroy nv_diskfile
if i_value = 0 then
   return
elseif i_value = -1 then
   return
else
   il_row = insertrow(dw_selected,0)
```

```
    setitem(dw_selected,il_row,1,lower(s_docname))
    end if
    end subroutine



public subroutine uf_view_file ()
setpointer(hourglass!)
long l
long la
long ls
boolean selected
string str
string run_str

la = dw_available.RowCount() + 1

l = 1

DO UNTIL l > la
    selected = dw_available.Isselected(l)
    if not selected then
        l = l + 1
    continue
    end if
    is_selected_str = getitemstring(dw_available,l,1)
    str = upper(getitemstring(dw_available,l,1))
    if pos( str, ".PDF" ) > 0 then
        run_str = gs_acrobat_reader + ' ' + str
    else
        run_str = 'notepad ' + ' ' + str
    end if
    run(run_str, maximized!)
    exit
loop

ls = dw_selected.RowCount() + 1
l = 1
DO UNTIL l > ls

    selected = dw_selected.Isselected(l)

    if not selected then
        l = l + 1
    continue
    end if

    str = upper( getitemstring(dw_selected,l,1) )
    if pos( str, ".PDF" ) > 0 then
        run_str = gs_acrobat_reader + ' ' + str
    else
        run_str = 'notepad ' + ' ' + str
    end if
    run(run_str, maximized!)
    exit
loop
setpointer(arrow!)
```

```
User Object: uo_select_items                                              Page: 14
Library: d:\projects\nwire\admin\v1-0b1\aiconadm.pbl
Date: 7/6 95     Time: 11:2 :01

return


end subroutine


PictureButton: pb_view
X = 3094                Y = 529                 Width = 174             Height = 205
TabOrder = 170          Visible = true          Enabled = true
PictureName = "view.bmp"                        Text = "&View"          OriginalSize = true
HTextAlign = center!    VTextAlign = bottom!

Script for: clicked  event
uf_view_file()


////Function to move selected items to available datawindow
//setpointer(hourglass!)
//long l
//long la
//long ls
//boolean selected
//string str
//string run_str
////Total rows in dw_available
//la = dw_available.RowCount() + 1

//l = 1
////Look for selected and process until the end of the data or
////until all available rows have been processed
//DO UNTIL l > la
////Was this row selected
//  selected = dw_available.Isselected(l)
////if not then bump i up by 1 and continue the process
//  if not selected then
//      l = l + 1
//      continue
//  end if
////Get the item string from the available side
//  is_selected_str = getitemstring(dw_available,l,1)
//  str = getitemstring(dw_available,l,1)
//  run_str = 'notepad ' + ' ' + str
//  run(run_str)
//  exit
//loop
//
////Look for selected and process until the end of the data or
////until all selected rows have been processed
////Total rows in dw_selected
//ls = dw_selected.RowCount() + 1
//l = 1
//DO UNTIL l > ls
////Was this row selected
//  selected = dw_selected.Isselected(l)
////if not then bump i up by 1 and continue the process
//  if not selected then
//      l = l + 1
```

```
//        continue
    end if
    Get the item string from the selected side
    str = upper( getitemstring(dw_selected,1,1) )
//  if pos( str, ".PDF" ) > 0 then
//      run_str = gs_acrobat_reader + ' ' + str
//  else
//      run_str = 'notepad ' + ' ' + str
//  end if
//  run(run_str, maximized!)
//  exit
//loop
//setpointer(arrow!)
//
//return
//
//

End of Script


Script for: dragdrop  event
triggerevent( this, clicked! )

End of Script
```

User Object: uo_1

```
X = 2730              Y = 153                 Width = 586         Height = 457
TabOrder = 0          Visible = true          Enabled = true      Border = true
BackColor = 12632256  ObjectType = customvisual!
```

User Object: dw_wo

```
X = 2748              Y = 913                 Width = 494                     Height = 361
TabOrder = 10         Visible = true          Enabled = true                  DataObject = "d_wo"
Border = true         LiveScroll = true       BorderStyle = stylelowered!

Script for: sqlpreview  event
call uo_adw_base::sqlpreview;string s
s = dw_wo.dwgetsqlpreview()
s = dw_wo.dwgetsqlpreview()

End of Script
```

User Object: dw_open

```
X = 2651              Y = 777                 Width = 494                     Height = 361
TabOrder = 20         Enabled = true          DataObject = "d_documents"
Border = true         LiveScroll = true       BorderStyle = stylelowered!
```

Object: dw_work_order
X = 2561 Y = 113 Width = 494 Height = 361
TabOrder = 30 Enabled = true DataObject = "d_work_order"
Border = true LiveScroll = true BorderStyle = stylebox!

User Object: dw_documents
X = 2890 Y = 385 Width = 897 Height = 505
TabOrder = 40 Enabled = true DataObject = "d_documents"
Border = true LiveScroll = true BorderStyle = stylebox!

User Object: dw_save_selected
X = 2542 Y = 1137 Width = 183 Height = 161
TabOrder = 120 Enabled = true DataObject = "d_multi_path_directory_list_s"
Border = true LiveScroll = true BorderStyle = stylebox!

User Object: dw_save_available
X = 2195 Y = 1121 Width = 183 Height = 161
TabOrder = 50 Enabled = true DataObject = "d_multi_path_directory_list_a"
Border = true LiveScroll = true BorderStyle = stylebox!

User
Object: dw_2
2414 Y = 689 Width = 183 Height = 153
order = 160 Enabled = true DataObject = "d_path" Border = true
LiveScroll = true BorderStyle = stylebox!

User Object: dw_1
X = 2414 Y = 513 Width = 183 Height = 153
TabOrder = 180 Enabled = true DataObject = "d_mask" Border = true
LiveScroll = true BorderStyle = stylebox!

PictureButton: pb_deselect
X = 1381 Y = 517 Width = 138 Height = 137
TabOrder = 130 Visible = true Enabled = true
PictureName = "arw04up.bmp" DisabledName = "arw04upd.bmp"
HTextAlign = center! VTextAlign = bottom!

```
Script for: clicked event
parent.triggerevent("ueb_deselect")

End of Script
```

PictureButton: pb_select
476 Y = 517 Width = 138 Height = 137
order = 80 Visible = true Enabled = true
PictureName = "arw04dn.bmp" DisabledName = "arw04dnd.bmp"
HTextAlign = center! VTextAlign = bottom!

```
Script for: clicked event
parent.triggerevent("ueb_select")
```

```
Window: w_select_items                                                    Page:
Library: d:\projects\nwire\admin\v1-0b1\aiconadm.pbl
Date: 5/6/95    Time: 11:05:01

End of Script

CommandButton: cb_reset
X = 874              Y = 533              Width = 247          Height = 105
TabOrder = 150       Visible = true       Enabled = true       Text = "&Reset"

Script for: clicked  event
uf_restore()

End of Script

CommandButton: cb_ok
X = 677              Y = 537              Width = 247          Height = 105
TabOrder = 140       Enabled = true       Text = "&Ok"

Script for: clicked  event
//w_mdi_frame.ChangeMenu(m_main)
message.stringparm = "OK"
//parent.hide()

End of Script

CommandButton: cb_s_deselect_all
X = 1971             Y = 913              Width = 439          Height = 109
TabOrder = 110       Visible = true       Enabled = true       Text = "DeSele&ct All"

Script for: clicked  event
//Deselect all rows
dw_selected.SelectRow(0,false)

il_selected_selectedrows = 0
il_selected_selected_row = 0

//Set the lowest row selected to 0
il_selected_lowest_row = 0

if il_available_selectedrows + il_selected_selectedrows = 1 then
   pb_view.enabled = true
else
   pb_view.enabled = false
end if

End of Script

CommandButton: cb_s_select_all
X = 1971             Y = 793              Width = 439          Height = 109
TabOrder = 70        Visible = true       Enabled = true       Text = "S&elect All"
```

```
Library: d:\projects\nwire\admin\v1-0b1\aiconadm.pbl
Time: 11:51:32                                                Page: 1[illegible]

Script for: clicked event
//Select all rows
dw_selected.SelectRow(0,true)

il_selected_selectedrows = il_selected_totalrows

//Set the lowest row selected to 1
il_selected_lowest_row = 1

if il_available_selectedrows + il_selected_selectedrows = 1 then
    pb_view.enabled = true
else
    pb_view.enabled = false
end if


End of Script
```

CommandButton: cb_a_desect_all

```
X = 1962            Y = 361            Width = 439        Height = 109
TabOrder = 100      Visible = true     Enabled = true     Text = "&DeSelect All"
Script for: clicked event
//Deselect all rows
dw_available.SelectRow(0,false)

il_available_selectedrows = 0
il_available_selected_row = 0

//Set the lowest row selected to 0
il_available_lowest_row = 0

if il_available_selectedrows + il_selected_selectedrows = 1 then
    pb_view.enabled = true
else
    pb_view.enabled = false
end if

End of Script
```

CommandButton: cb_a_select_all

```
X = 1962            Y = 233            Width = 439        Height = 109
TabOrder = [illegible]   Visible = true     Enabled = true     Text = "S&elect All"
Script for: clicked event
//Select all rows
dw_available.SelectRow(0,true)

il_available_selectedrows = il_available_totalrows
```

```
Window: uf_select_items
Library: d:\projects\nwire\admin\v1.0b1\aiconadm.pbl
Date: [illegible]     Time: [illegible]

//Set the lowest row selected to 1
[illegible]_lowest_row = 1

if il_available_selectedrows - il_selected_selectedrows = 1 then
    pb_view.enabled = true
else
    pb_view.enabled = false
end if

End of Script
```

CommandButton: cb_a_select_others

| | | | |
|---|---|---|---|
| X = 1962 | Y = 105 | Width = 439 | Height = 105 |
| TabOrder = 190 | Visible = true | Enabled = true | Text = "&Select Others" |

```
Script for: clicked  event
uf_get_file()


//int i_value
//string s_docname
//string s_named
//
//nv_diskfile = create nv_diskfile
//nv_diskfile.fnv_change_drive(gs_nav_drive)
//nv_diskfile.fnv_change_dir(gs_nav_directory)
//s_docname = gs_nav_directory
//i_value = GetFileOpenName("Select Document", s_docname, s_named, "PDF", &
//  "PDF Files (*.pdf), *.pdf" + &
//  "DOC files (*.doc), *.doc"   + &
//  "Excel files (*.xl?), *.xl?" + &
//  "All files (*.*), *.*" )
//gs_nav_drive = nv_diskfile.fnv_get_drive()
//gs_nav_directory = nv_diskfile.fnv_get_directory()
//nv_diskfile.fnv_change_drive(gs_app_drive)
//nv_diskfile.fnv_change_dir(gs_app_directory)
//destroy nv_diskfile
//
//if i_value = 0 then
//  return
//elseif i_value = -1 then
//  return
//else
//  il_row = insertrow(dw_selected,0)
//  setitem(dw_selected,il_row,1,lower(s_docname))
//end if

End of Script
```

```
Window: uo_select_items                                              Page: [illegible]
Library: d:\projects\nwire\admin\v1-0b1\aiconadm.pbl
Date: [illegible]      Time: [illegible]


   Object: dw_selected
X = 60                  Y = 672                  Width = 1825           Height = 437
TabOrder = 200          Visible = true           Enabled = true
DataObject = "d_multi_path_directory_list_s"     DragIcon = "DRAG2PC.ICO"
TitleBar = true         Title = "Selected Document File(s)"             VScrollBar = true
Border = true           LiveScroll = true        BorderStyle = stylelowered!

Script for: clicked  event
call uo_adw_base::clicked;//Clicked Event

il_selected_rownum = dw_selected.getclickedrow()
if il_selected_rownum = 0 then
   return
end if
ib_selected_result = dw_selected.IsSelected(il_selected_rownum)

dw_selected.setrow(il_selected_rownum)

i_row = il_available_rownum

if il_selected_rownum > 0 then
   if keydown(keycontrol!) then
      dw_selected.selectrow(il_selected_rownum,true)
   else
      dw_selected.selectrow(0,false)
      il_selected_selectedrows = 1
      dw_selected.SelectRow(il_selected_rownum,true)
   end if
end if
if il_selected_selected_row > 0 then
   if keydown(keyshift!) THEN
      This.TriggerEvent ("Shiftclicked")
      return
   else
      if keydown(keycontrol!) then
         this.Triggerevent ("CtrlClicked")
         return
      end if
   end if
end if

il_selected_selected_row = il_selected_rownum
dw_selected.SetRow(il_selected_rownum)
dw_selected.SetColumn(1)

il_selected_lowest_row  = il_selected_selected_row

if il_available_selectedrows + il_selected_selectedrows = 1 then
   pb_view.enabled = true
else
   pb_view.enabled = false
end if

This.I_Mouse_Down = True
This.I_Mouse_Down_X = PointerX()
This.I_Mouse_Down_Y = PointerY()
```

```
Library: d:\projects\nwire\admin\v1-0b1\aiconadm.pbl
Time: 11:25:02
```

```
End of Script


Script for: constructor  event
call uo_adw_base::constructor;this.I_Drag_Enabled = True

End of Script


Script for: doubleclicked  event
call uo_adw_base::doubleclicked;parent.triggerevent("ueb_deselect")

End of Script


Script for: dragdrop  event
call uo_adw_base::dragdrop;if il_available_rownum = 0 then
    This.Drag(End!)
    return
end if

    il_frame.uo_selection.triggerevent('ueb_select')

End of Script


Script for: shiftclicked  event
call uo_adw_base::shiftclicked;//ShiftClicked Event

// This script is triggered by the Clicked event when
// the shift key is pressed at the same time as a mouseclick

il_selected_oldrow = il_selected_selected_row

il_selected_newrow = il_selected_rownum

il_selected_selectedrows = il_selected_selectedrows - 1

if il_selected_oldrow > il_selected_newrow then
    il_selected_startrow = il_selected_newrow
    il_selected_endrow = il_selected_oldrow
else
    il_selected_startrow = il_selected_oldrow
    il_selected_endrow = il_selected_newrow
    if

for il_selected_i = il_selected_startrow to il_selected_endrow
    dw_selected.SelectRow(il_selected_i,true)
    il_selected_selectedrows = il_selected_selectedrows + 1
next
```

106

```
Window: uo_select_items                                          Page: 11
Library: d:\projects\nwire\admin\v1-0b1\alconadm.pbl
Date: 7/6/95    Time: 11:25:02

dw_selected.SetRow(il_selected_newrow)
dw_selected.SetColumn(1)

if il_selected_lowest_row > il_selected_startrow then
   il_selected_lowest_row = il_selected_startrow
end if

if il_available_selectedrows + il_selected_selectedrows = 1 then
   pb_view.enabled = true
else
   pb_view.enabled = false
end if

End of Script

Script for: ctrlclicked event
   uo_adw_base::ctrlclicked;//CtrlClicked Event

// This script is triggered by the Clicked event when
// the control key is pressed at the same time as a mouse click

if ib_selected_result then
   dw_selected.SelectRow(il_selected_rownum,false)
   il_selected_selectedrows = il_selected_selectedrows - 1
else
   dw_selected.SelectRow(il_selected_rownum,true)
   il_selected_selectedrows = il_selected_selectedrows + 1
   if il_selected_lowest_row  > il_selected_rownum then
      il_selected_lowest_row  = il_selected_rownum
   end if
end if

dw_selected.SetRow(il_selected_rownum)
dw_selected.SetColumn(1)

if il_available_selectedrows + il_selected_selectedrows = 1 then
   pb_view.enabled = true
else
   pb_view.enabled = false
end if

End of Script

Script for: ueb_dwbuttonup event
call uo_adw_base::ueb_dwbuttonup; / ***************107*****************************************
```

```
***********
// This script resets the mouse down boolean to false since we're letting
// it go.  If we're in drag mode, reset the boolean and end drag mode
// since we've released the mouse.  If we're not in drag mode, check to
// see if we need to deselect any rows.  This will be determined by the
// selection method...see the clicked event for more information.
//***************************************************************
This.I_Mouse_Down = False
IF This.I_Mouse_Drag THEN
    This.I_Mouse_Drag = False
    This.Drag(End!)
ELSE
    IF This.I_Wait_Until_Mouse_Up THEN
            IF KeyDown(keyControl!) THEN
                This.SelectRow(This.I_Row, False)
            ELSE
                This.SelectRow(0, False)
                This.SelectRow(This.I_Row, True)
            END IF
    END IF
END IF


End of Script


Script for: ueb_dwmousemove  event
call uo_adw_base::ueb_dwmousemove;// **************************************************************
************
// This script initiates drag mode if we move the mouse more than 50
// pixels while holding down the left mouse button and we have drag and
// drop enabled.
// ******************************************************************
IF This.I_Drag_Enabled THEN
    IF This.I_Mouse_Down THEN
IF (Abs(PointerX() - This.I_Mouse_Down_X) > 50) OR (Abs(PointerY() - This.I_Mouse_Down_Y)
 > 50) OR (PointerX() = 0) OR (PointerY() = 0) THEN
            This.I_Mouse_Drag = True
            This.Drag(Begin!)
        END IF
    END IF
END IF


End of Script
```

User Object: dw_available

```
X = 60                  Y = 57                    Width = 1825             Height = 437
TabOrder = 60           Visible = true            Enabled = true
DataObject = "d_multi_path_directory_list_a"      DragIcon = "DRAG2PG.ICO"
TitleBar = true         Title = "Available Document Files"                 VScrollBar = true
Border = true           Icon = "DRAG2PG.ICO"      LiveScroll = true
BorderStyle = stylelowered!

Script for: clicked  event
call uo_adw_base::clicked;//Clicked Event

il_available_rownum = dw_available.getclickedrow()
```

```
Window: [illegible]                                          Page: [illegible]
Library: d:\projects\nwire\admin\v1-0b1\aiconadm.pbl
Date: [illegible]     Time: 11:2[illegible]

if il_available_rownum = 0 then
    return
end if

il_available_result = dw_available.IsSelected(il_available_rownum)
il_row = il_available_rownum

dw_available.setrow(il_available_rownum)

if il_available_rownum > 0 then
    if keydown(keycontrol!) then
        dw_available.selectrow(il_available_rownum,true)
    else
        dw_available.selectrow(0,false)
        il_available_selectedrows = 1
        dw_available.SelectRow(il_available_rownum,true)
    end if
end if

if il_available_selectedrows + il_selected_selectedrows = 1 then
    pb_view.enabled = false
else
    pb_view.enabled = false
end if

if il_available_selected_row > 0 then
    if keydown(keyshift!) then
        This.TriggerEvent ("Shiftclicked")
        return
    else
        if keydown(keycontrol!) then
            this.Triggerevent ("CtrlClicked")
            return
        end if
    end if
end if

il_available_selected_row = il_available_rownum
dw_available.SetRow(il_available_rownum)
dw_available.SetColumn(1)
il_available_lowest_row  = il_available_selected_row

if il_available_selectedrows + il_selected_selectedrows = 1 then
    pb_view.enabled = true
else
    pb_view.enabled = false
end if

This.I_Mouse_Down = True
This.I_Mouse_Down_X = PointerX()
This.I_Mouse_Down_Y = PointerY()



End of Script
```

```
Window: [illegible]
Library: d:\projects\nwire\admin\v1-0b1\aiconadm.pbl          Page: [illegible]
Date: [illegible]     Time: 11:25:01

Script for: constructor  event
call uo_adw_base::constructor;this.I_Drag_Enabled = True

End of Script

Script for: doubleclicked  event
call uo_adw_base::doubleclicked;parent.triggerevent("ueb_select")

End of Script

Script for: dragdrop  event
call uo_adw_base::dragdrop;
if il_selected_rownum = 0 then
    This.Drag(End!)
    return
end if

//IF DraggedObject() = This THEN
    w_mdi_frame.uo_selection.triggerevent('ueb_deselect')
    end if

End of Script

Script for: shiftclicked  event
call uo_adw_base::shiftclicked;//ShiftClicked Event

// This script is triggered by the Clicked event when
// the shift key is pressed at the same time as a mouseclick

il_available_oldrow = il_available_selected_row

il_available_newrow = il_available_rownum

il_available_selectedrows = il_available_selectedrows - 1

if il_available_oldrow > il_available_newrow then
    il_available_startrow = il_available_newrow
    il_available_endrow = il_available_oldrow
else
    il_available_startrow = il_available_oldrow
    il_available_endrow = il_available_newrow
end if

for il_available_i = il_available_startrow to il_available_endrow
    dw_available.SelectRow(il_available_i,true)
    il_available_selectedrows = il_available_selectedrows + 1
next
```

Window: uo_select_items Page: 21
Library: d:\projects\nwire\admin\v1-0b1\aiconadm.pbl
Date: /6/96 Time: 11:25:02

```
dw_available.SetRow(il_available_newrow)
dw_available.SetColumn(1)

if il_available_lowest_row  > il_available_startrow then
    il_available_lowest_row  = il_available_startrow
end if

if il_available_selectedrows + il_selected_selectedrows = 1 then
    pb_view.enabled = true
else
    pb_view.enabled - false
end if
```

End of Script

```
Script for: ctrlclicked  event
call uo_adw_base::ctrlclicked;//CtrlClicked Event

// This script is triggered by the Clicked event when
// the control key is pressed at the same time as a mouse click

if ib_available_result then
    dw_available.SelectRow(il_available_rownum,false)
    il_available_selectedrows = il_available_selectedrows - 1
else
    dw_available.SelectRow(il_available_rownum,true)
    il_available_selectedrows = il_available_selectedrows + 1
    if il_available_lowest_row  > il_available_rownum then
        il_available_lowest_row  = il_available_rownum
    end if
end if

dw_available.SetRow(il_available_rownum)
dw_available.SetColumn(1)

if il_available_selectedrows + il_selected_selectedrows = 1 then
    pb_view.enabled = true
else
    pb_view.enabled = false
end if
```

End of Script

```
Script for: ueb_dwbuttonup  event
call uo_adw_base::ueb_dwbuttonup;//************************************************************
***********
   This script resets the mouse down boolean to false since we're letting
```

```
// it go.  If we're in drag mode, reset the boolean and end drag mode
// since we've released the mouse.  If we're not in drag mode, check to
// see if we need to deselect any rows.  This will be determined by the
// selection method...see the clicked event for more information.
// *****************************************************************
This.I_Mouse_Down = False
IF This.I_Mouse_Drag THEN
    This.I_Mouse_Drag = False
    This.Drag(End!)
ELSE
    IF This.I_Wait_Until_Mouse_Up THEN
                IF KeyDown(keyControl!) THEN
                    This.SelectRow(This.I_Row, False)
                ELSE
                    This.SelectRow(0, False)
                    This.SelectRow(This.I_Row, True)
                END IF
    END IF
END IF


End of Script


Script for: ueb_dwmousemove  event
//   uo_adw_base::ueb_dwmousemove;// ***********************************************************
*    ********
// This script initiates drag mode if we move the mouse more than 50
// pixels while holding down the left mouse button and we have drag and
// drop enabled.
// *****************************************************************
IF This.I_Drag_Enabled THEN
    IF This.I_Mouse_Down THEN
IF (Abs(PointerX() - This.I_Mouse_Down_X) > 50) OR (Abs(PointerY() - This.I_Mouse_Down_Y)
 > 50) OR (PointerX() = 0) OR (PointerY() = 0) THEN
            This.I_Mouse_Drag = True
            This.Drag(Begin!)
        END IF
    END IF
END IF


End of Script
```

User Object: uo_selected_documents Page: 1
Library: d:\projects\nwire\admin\v1-0b1\aiconadm.pbl
Date: 7/6/95 Time: 11:25:02

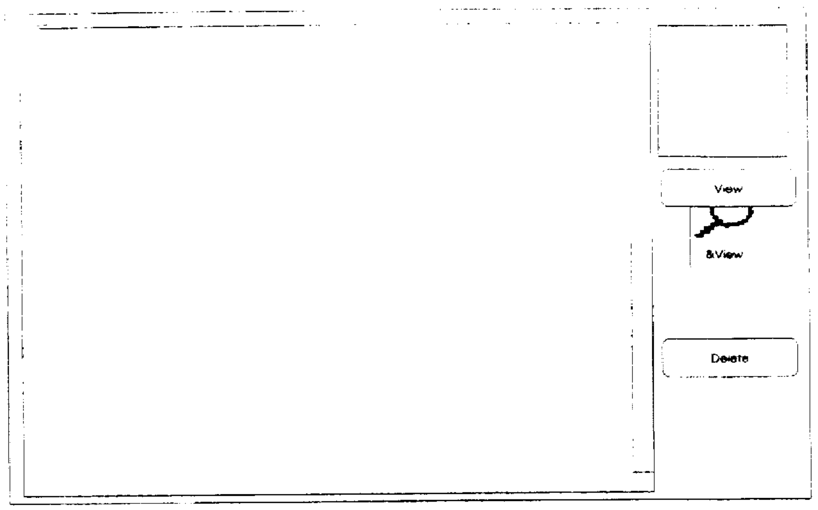

```
User Object: uo_selected_documents
X = 0                   Y = 0                 Width = 2487        Height = 1349
  Border = 0            Visible = true        Enabled = true      Border = true
  Color = 12632256      ObjectType = customvisual!

Instance Variables
long l

End of Instance Variables


public subroutine uf_clear ()
long l
long ll

l = dw_selected.rowcount()

ll = 1

do until ll > l
   dw_selected.deleterow(0)
   ll = ll + 1
loop

end subroutine


public subroutine uf_view_file ()
//function to move selected items to available datawindow
setpointer(hourglass!)
long l
long ls
```

```
User Object: uo_selected_documents                                      Page: 1
Library: d:\projects\nwire\admin\v1-0b1\aiconadm.pbl
Date: 7 6 95     Time: 11:25:02

boolean selected
string str
string run_str

//Look for selected and process until the end of the data or
//until all selected rows have been processed
//Total rows in dw_available
ls = dw_selected.RowCount()
l = 1
DO UNTIL l > ls
//Was this row selected
    selected = dw_selected.Isselected(l)
//if not then bump i up by 1 and continue the process
    if not selected then
        l = l + 1
    continue
    end if
//Get the item string from the selected side
    str = getitemstring(dw_selected,l,1)

    str = upper( str )

    if pos( str, ".PDF" ) > 0 then
        run_str = gs_acrobat_reader + ' ' + str
    else
        run_str = 'notepad ' + ' ' + str
    end if
    run(run_str, maximized!)

    exit
loop

setpointer(arrow!)

return


end subroutine


public subroutine uf_prepare_zipfile ()
////
////
////
//
//int       li_tot_files, li_x
//string    ls_zip_sourcefiles, ls_exec_command, ls_zipfilename
//string    ls_dw_data
//boolean   lb_ret
//string    ls_exec_command2, ls_aicon_phone
//string    li_ret

//ls_zip_sourcefiles = ""
//
//li_tot_files = dw_selected.rowcount()
```

```
User Object: uf_selected_document                                          Page: 1
Library: d:\projects\nwire\admin\v1-0b1\aiconadm.pbl
Date:           Time:

// messagebox(" li_tot_files ", string( li_tot_files ))

   li_tot_files > 0 then

   FOR li_x = 1 TO li_tot_files
//
      ls_zip_sourcefiles = ls_zip_sourcefiles + " " + &
                            dw_selected.getitemstring &
//                          ( li_x, "directory_detail_line" )
//
   NEXT
//
// ls_zipfilename = string(w_mdi_frame.uo_page_01.dw_wo_page_1. &
//                   getitemnumber(1,"number") )
//
// ls_zipfilename = "NR" + ls_zipfilename + ".ZIP"
//
// lb_ret = filedelete( ls_zipfilename  )
////   messagebox( "FileDelete", lb_ret )
// ls_dw_data = uf_save_dwsyntax( ls_zipfilename )
//
// ls_exec_command = "AICONZIP -a " + ls_zipfilename + " " + &
//                    ls_zip_sourcefiles + " " + ls_dw_data + &
//                    " docs.txt"
//
//
//
   li_ret = run( ls_exec_command, minimized! )
//    li_ret = run( ls_exec_command )
//
// open( w_select_transfer )
//
// gs_zipfilename = ls_zipfilename
//
// CHOOSE CASE UPPER(gs_transfer_method)
//    CASE "MODEM"
//
//       ls_aicon_phone = f_get_phonenum()
//       f_sendfile( gs_zipfilename , ls_aicon_phone )
//       beep(1)
//
//    CASE "SYQUEST"
//       open(w_syquest_transfer )
//    CASE "TAPE"
//       open(w_tape_transfer)
//    CASE "DISKETTE"
//       open(w_diskette_transfer)
// END CHOOSE
//
//end if
//
// filedelete( ls_dw_data )

   main.r_file.m_cancel.enabled = false

 triggerevent( w_mdi_frame , "ueo_close" )  /* save & close tabs */

 w_mdi_frame.windowstate = minimized!
```

// the subroutine

DataWindow: dw_wo_printout

```
X = 2026                Y = 49                Width = 403                   Height = 361
TabOrder = 20           Enabled = true        DataObject = "d_work_order_rpt"
Border = true           LiveScroll = true     BorderStyle = stylebox!
```

PictureButton: pb_view

```
X = 2122                Y = 485               Width = 211                   Height = 229
TabOrder = 30           Visible = true        Enabled = true
PictureName = "view.bmp"                      Text = "&View"                HTextAlign = center!
VTextAlign = bottom!

Script for: clicked  event
uf_view_file()


End of Script


Script for: dragdrop  event
triggerevent( this, clicked!)

End of Script
```

CommandButton: cb_delete

```
X = 2030                Y = 905               Width = 421                   Height = 105
TabOrder = 50           Visible = true        Enabled = true                Text = "Delete"

Script for: clicked  event
//Function to move selected items to available datawindow
setpointer(hourglass!)
long l
long ls

boolean selected
string str

//Look for selected and process until the end of the data or
//until all selected rows have been processed
//Total rows in dw_available
ls = dw_selected.RowCount()
l = 1
DO UNTIL l > ls
//  if this row selected
    selected = dw_selected.Isselected(l)
  //if not then bump l up by 1 and continue the process
    if not selected then
        l = l + 1
```

```
    continue
    end if
    // the item string from the selected side
    str = getitemstring(dw_selected,1,1)
    if f_delete_file( lower(str) ) = true then
        dw_selected.deleterow(1)
        ls = dw_selected.RowCount()
        parent.pb_view.enabled = false
        parent.cb_delete.enabled = false
    end if
    exit
loop
w_mdi_frame.uo_selection.uf_delete(str)
setpointer(arrow!)

return



End of Script



Script for: dragdrop  event
triggerevent(clicked!)

End of Script
```

CommandButton: cb_v

```
X = 2030            Y = 441           Width = 421          Height = 105
TabOrder = 40       Enabled = true    Text = "View"

Script for: clicked  event
uf_view_file()


////Function to move selected items to available datawindow
//setpointer(hourglass!)
//long l
//long ls
//
//boolean selected
//string str
//string run_str
//
////Look for selected and process until the end of the data or
////until all selected rows have been processed
////Total rows in dw_available
//ls = dw_selected.RowCount()
   = 1
    UNTIL l > ls
////Was this row selected
//  selected = dw_selected.Isselected(l)
////if not then bump l up by 1 and continue the process
//  if not selected then
```

```
Window: uo_selected_documents                                          Page: 6
Library: d:\projects\nwire\admin\v1 0pl\aiconadm.pbl
Date: 7 6/95     Time: 11:28:02

//      l = l + 1
/       continue
//   end if
     'Get the item string from the selected side
     str = getitemstring(dw_selected,l,1)

//   str = upper( str )
//
//   if pos( str, ".PDF" ) > 0 then
//       run_str = gs_acrobat_reader + ' ' + str
//   else
//       run_str = 'notepad ' + ' ' + str
//   end if
//   run(run_str, maximized!)
//
//   exit
//loop
//
//setpointer(arrow!)
//
//return
//
//

End of Script

Script for: dragdrop  event
triggerevent(clicked!)

End of Script
```

User Object: dw_selected

```
X = 46                    Y = 41               Width = 1957          Height = 1289
TabOrder = 10             Visible = true       Enabled = true
DataObject = "d_wo_documents"                  DragIcon = "DRAG2PG.ICO"
VScrollBar = true         Border = true        LiveScroll = true     BorderStyle = stylebox!

Script for: clicked  event
call uo_adw_base::clicked;
dw_selected.selectrow(0,false)
l = dw_selected.getclickedrow()
if l = 0 then
   return
end if

dw_selected.IsSelected(l)

dw_selected.setrow(l)

dw_selected.selectrow(l,true)

parent.pb_view.enabled = true
parent.cb_delete.enabled = true
```

```
Window: uo_selected_documents                                        Page: 7
Library: d:\projects\nwire\admin\v1-0bI\aiconadm.pbl
Date: 7/6/95    Time: 11:25:02

This.I_Mouse_Down = True
This.I_Mouse_Down_X = PointerX()
This.I_Mouse_Down_Y = PointerY()

End of Script


Script for: constructor  event
call uo_adw_base::constructor;this.I_Drag_Enabled = True

End of Script


Script for: dragdrop  event
call uo_adw_base::dragdrop;////IF DraggedObject() <> This THEN
//if il_available_rownum = 0 then
//  This.Drag(End!)
//  return
//end if
//  w_mdi_frame.uo_selection.triggerevent('ueb_select')
////end if

End of Script


Script for: ue_dwbuttonup  event
call uo_adw_base::ue_dwbuttonup;// *************************************************************
**********
// This script resets the mouse down boolean to false since we're letting
// it go.  If we're in drag mode, reset the boolean and end drag mode
// since we've released the mouse.  If we're not in drag mode, check to
// see if we need to deselect any rows.  This will be determined by the
// selection method...see the clicked event for more information.
// *********************************************************************
This.I_Mouse_Down = False
IF This.I_Mouse_Drag THEN
   This.I_Mouse_Drag = False
   This.Drag(End!)
ELSE
   IF This.I_Wait_Until_Mouse_Up THEN
            IF KeyDown(keyControl!) THEN
               This.SelectRow(This.I_Row, False)
            ELSE
               This.SelectRow(0, False)
               This.SelectRow(This.I_Row, True)
            END IF
   END IF
END IF


End of Script


Script for: ue_dwnmousemove  event
call uo_adw_base::ue_dwnmousemove;// ***************************************************************
```

```
************
// This script initiates drag mode if we move the mouse more than 50
// pixels while holding down the left mouse button and we have drag and
// drop enabled.
// *****************************************************************
IF This.I_Drag_Enabled THEN
    IF This.I_Mouse_Down THEN
IF (Abs(PointerX() - This.I_Mouse_Down_X) > 50) OR (Abs(PointerY() - This.I_Mouse_Down_Y)
 > 50) OR (PointerX() < 0) OR (PointerY() < 0) THEN
            This.I_Mouse_Drag = True
            This.Drag(Begin!)
        END IF
    END IF
END IF

End of Script
```

Window: w_about_admin Page: 1
Library: d:\projects\nwire\admin\v1-0b1\aiconadm.pbl
Date: [illegible] Time: [illegible]

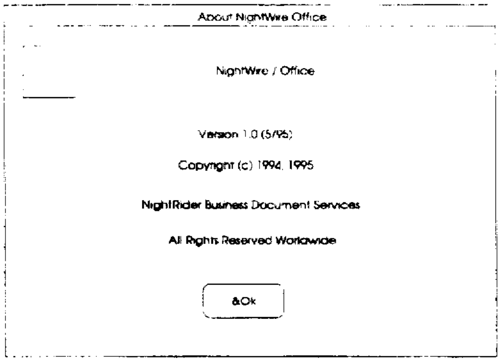

Window: w_about_admin

| | | | |
|---|---|---|---|
| X = 682 | Y = 481 | Width = 1537 | Height = 969 |
| Visible = true | Enabled = true | TitleBar = true | |
| Title = "About NightWire Office" | | ControlMenu = true | Border = true |
| WindowType = response! | WindowState = normal! | BackColor = 12632256 | |

User Object: st_1

| | | | |
|---|---|---|---|
| X = 398 | Y = 73 | Width = 823 | Height = 105 |
| TabOrder = 0 | Visible = true | Text = "NightWire / Office" | |
| TextColor = 33554432 | BackColor = 12632256 | Alignment = center! | FillPattern = solid! |

StaticText: st_5

| | | | |
|---|---|---|---|
| X = 375 | Y = 549 | Width = 782 | Height = 77 |
| TabOrder = 0 | Visible = true | Text = "All Rights Reserved Worldwide" | |
| TextColor = 33554432 | BackColor = 12632256 | Alignment = center! | FillPattern = solid! |

StaticText: st_4

| | | | |
|---|---|---|---|
| X = 229 | Y = 449 | Width = 1070 | Height = 85 |
| TabOrder = 0 | Visible = true | Text = "NightRider Business Document Services" | |
| TextColor = 33554432 | BackColor = 12632256 | Alignment = center! | FillPattern = solid! |

StaticText: st_3

| | | | |
|---|---|---|---|
| X = 467 | Y = 349 | Width = 563 | Height = 73 |
| TabOrder = 0 | Visible = true | Text = "Copyright (c) 1994, 1995" | |
| TextColor = 33554432 | BackColor = 12632256 | Alignment = center! | FillPattern = solid! |

StaticText: st_2

| | | | |
|---|---|---|---|
| X = 476 | Y = 241 | Width = 545 | Height = [illegible] |
| TabOrder = [illegible] | Visible = true | Text = "Version 1.0 (5/95)" | |
| TextColor = 33554432 | BackColor = 12632256 | Alignment = center! | FillPattern = solid! |

Picture: p_1

| | | | |
|---|---|---|---|
| X = 6[illegible] | Y = 5[illegible] | Width = 165 | Height = [illegible]45 |
| TabOrder = 0 | Visible = true | Enabled = true | |

121

```
PictureName = "c:\projects\[illegible].bmp"                    BorderStyle = StyleBox!

CommandButton. cb_1
X = 609              Y = 709              Width = 261          Height = 97
TabOrder = 1         Visible = true       Enabled = true       Text = "&Ok"

Script for: clicked event
close( parent )

End of Script
```

```
Window: w_aicon_nrider_admin                                    Page: 1
Library: d:\projects\nwire\admin\v1 0b1\aiconadm.pbl
Date: 7/6/95     Time: 11:25:02
```

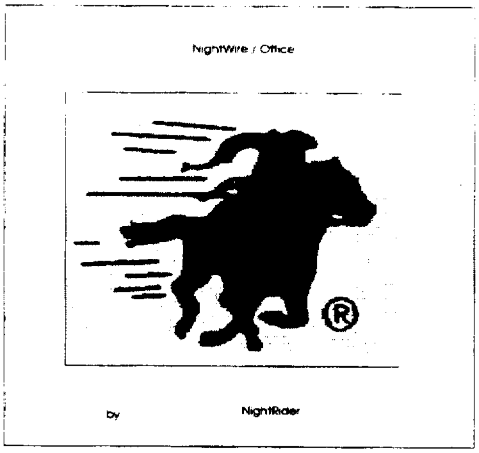

w: w_aicon_nrider_admin

```
X = 727                Y = 353                Width = 1463           Height = 1217
Visible = true         Enabled = true         WindowType = popup!    WindowState = normal!
BackColor = 8421504

Script for: clicked  event
triggerevent( this, close! )


End of Script
```

User Object: st_1

```
X = 92                 Y = 33                 Width = 1294           Height = 169
TabOrder = 0           Visible = true         Text = "NightWire / Office"
TextColor = 33554432   BackColor = 8421504    Alignment = center!    FillPattern = solid!
```

PictureButton: pb_1

```
X = 188                Y = 241                Width = 1047           Height = 753
TabOrder = 1           Visible = true         Enabled = true
PictureName = "nrhorseg.bmp"                  DisabledName = "nrhorseg.bmp"
OriginalSize = true    HTextAlign = center!   VTextAlign = bottom!

Script for: clicked  event
Close( parent )


End of Script
```

Window: w_about_nightrider_admin
Library: d:\projects\nwire\admin\v1-0p1\aiconadm.pbl
Date: 7-6-95 Time: 11:25:02

Page:

Static

| | | | |
|---|---|---|---|
| **StaticText: st_4** | | | |
| X = 229 | Y = 1073 | Width = 211 | Height = 105 |
| TabOrder = 0 | Visible = true | Text = "by" | TextColor = 33554432 |
| BackColor = 8421504 | Alignment = center! | FillPattern = solid! | |
| **StaticText: st_3** | | | |
| X = 421 | Y = 1033 | Width = 805 | Height = 161 |
| TabOrder = 0 | Visible = true | Text = "NightRider" | TextColor = 33554432 |
| BackColor = 8421504 | Alignment = center! | FillPattern = solid! | |

```
Window: w_import_wo                                        Page: 1
Library: d:\projects\nwire admin\v1-0b1\aiconadm.pbl
Date: 7/6/95     Time: 11:??:02
```

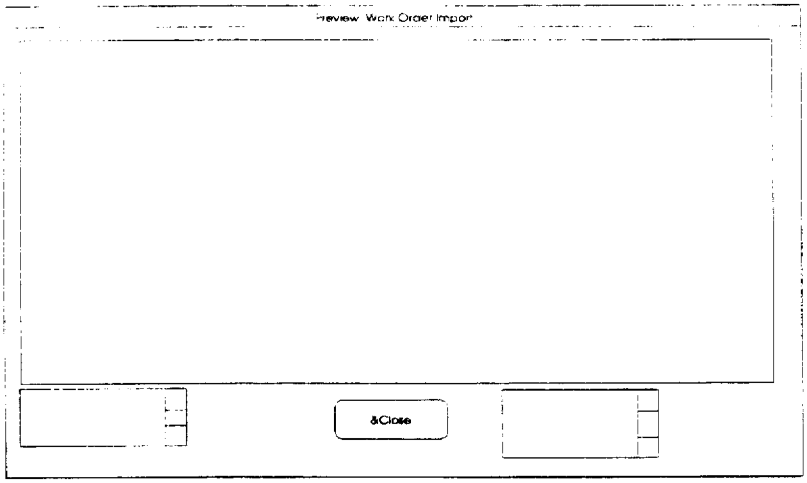

w_import_wo

```
X = 220               Y = 265               Width = 2483          Height = 1301
Visible = true        Enabled = true        TitleBar = true
Title = "Preview: Work Order Import"        ControlMenu = true    MinBox = true
MaxBox = true         Resizable = true      WindowType = main!    WindowState = normal!
BackColor = 12632256

Script for: open  event
////
////
////
//
//wf_import_wo()
//
//

End of Script


public subroutine wf_import_wo (string dwx_file)

long        ll_ret, wo_num , ll_row, ll_cnt, ll_X
string ls_import, ls_filename, ls_temp_path, opened_dir
string ls_sourcefile, ls_targetfile
       ll_ret
boolean lb_ret

ls_temp_path = gs_temp
```

```
window: w_import_wo
Library: d:\projects\nwire\admin\v1-0b1\aiconadm.pbl
Date: 7-6-95    Time: 11:25:01

ls_import = ls_temp_path + "\DW.TXT"

ls_import.settransobject( sqlca )
dw_documents.settransobject( sqlca )

ll_ret = dw_import.IMPORTFILE( ls_import )

w_mdi_frame.dw_get_max_wo_number.settransobject(sqlca)
w_mdi_frame.dw_get_max_wo_number.retrieve()

wo_num = w_mdi_frame.dw_get_max_wo_number.getitemnumber( &
                1,"job_number") + 1
//messagebox("wo_num",string(wo_num))

if isnull( wo_num ) then
    wo_num = 1
end if

dw_import.setitem(1,"job_number", wo_num )
dw_import.dwsharedata ( dw_wo )

li_ret = MakeDir ( gs_opened + "\wo" + string( wo_num ) )

//messagebox( "li_ret", string(li_ret) )

opened_dir = gs_opened + "\wo" + string( wo_num )
li_ret = MakeDir ( opened_dir + "\temp" )

//  messagebox("opened_dir", opened_dir )

ls_sourcefile = gs_unread  + "\" + dwx_file
ls_targetfile = opened_dir + "\" + dwx_file
ll_ret = CopyFile( ls_sourcefile , ls_targetfile )

if FileExists( ls_targetfile ) then FileDelete( ls_sourcefile )

lb_files.dirlist( ls_temp_path + "\*.*", 0, st_path )
ll_cnt = lb_files.totalitems()

FOR ll_x = 1 to ll_cnt
    lb_files.selectitem( ll_x )
    ls_filename = upper( lb_files.selecteditem() )
    if upper( ls_filename ) <> "DW.TXT" AND  &
                    upper( ls_filename ) <> "DOCS.TXT" then

        ls_sourcefile = st_path.text + "\" + ls_filename
        ls_targetfile = opened_dir + "\temp\" + ls_filename
        ll_ret = CopyFile( ls_sourcefile , ls_targetfile )

        ll_row = dw_documents.insertrow(0)
        dw_documents.setitem(ll_row , "number", wo_num )
        dw_documents.setitem(ll_row , "seq_no", ll_x  )
        dw_documents.setitem(ll_row, "document", ls_targetfile  )
    end if

    lb_ret = FileDelete ( ls_temp_path + "\" + ls_filename )

    ll_ret = 1
```

Page: 1

```
Window: w_import_wo                                                          Page: 2
Library: d:\projects\nwire\admin\v1 0b1\aiconadm.pbl
Date: 7 8 96     Time: 11:25:0?

End subroutine


DataWindow: dw_documents
X = 1137                Y = 1001                Width = 494             Height = 189
TabOrder = 40           Enabled = true          DataObject = "d_documents"
VScrollBar = true       Border = true           LiveScroll = true       BorderStyle = stylebox!

StaticText: st_path
X = 586                 Y = 1005                Width = 247             Height = 73
TabOrder = 0            TextColor = 33554432    BackColor = 12632256    Alignment = center!
FillPattern = solid!

ListBox: lb_files
X = 60                  Y = 1005                Width = 503             Height = 137
TabOrder = 30           Enabled = true          VScrollBar = true       Border = true
Sorted = true           TabStop = true          TextColor = 33554432    BackColor = 1073741824
BorderStyle = stylelowered!

DataWindow: dw_import
X = 46                  Y = 997                 Width = 517             Height = 161
TabOrder = 20           Enabled = true          DataObject = "d_export_wo"
VScrollBar = true       Resizable = true        LiveScroll = true       BorderStyle = stylebox!

CommandButton: cb_1
X = 1020                Y = 1029                Width = 348             Height = 109
TabOrder = 50           Visible = true          Enabled = true          Text = "&Close"

Script for: clicked  event

dw_import.update()
dw_documents.update()

commit;

close( parent )


End of Script


DataWindow: dw_wo
X = 51                  Y = 37                  Width = 2346            Height = 949
TabOrder = 10           Visible = true          DataObject = "d_job_ticket_general"
Border = true           LiveScroll = true       BorderStyle = styleraised!
```

```
Window: w_mdi_frame                                              Page: 1
Library: d:\projects\nwire\admin\v1-0b1\aiconadm.pbl
Date: 1-6/95     Time: 11:25:02
```

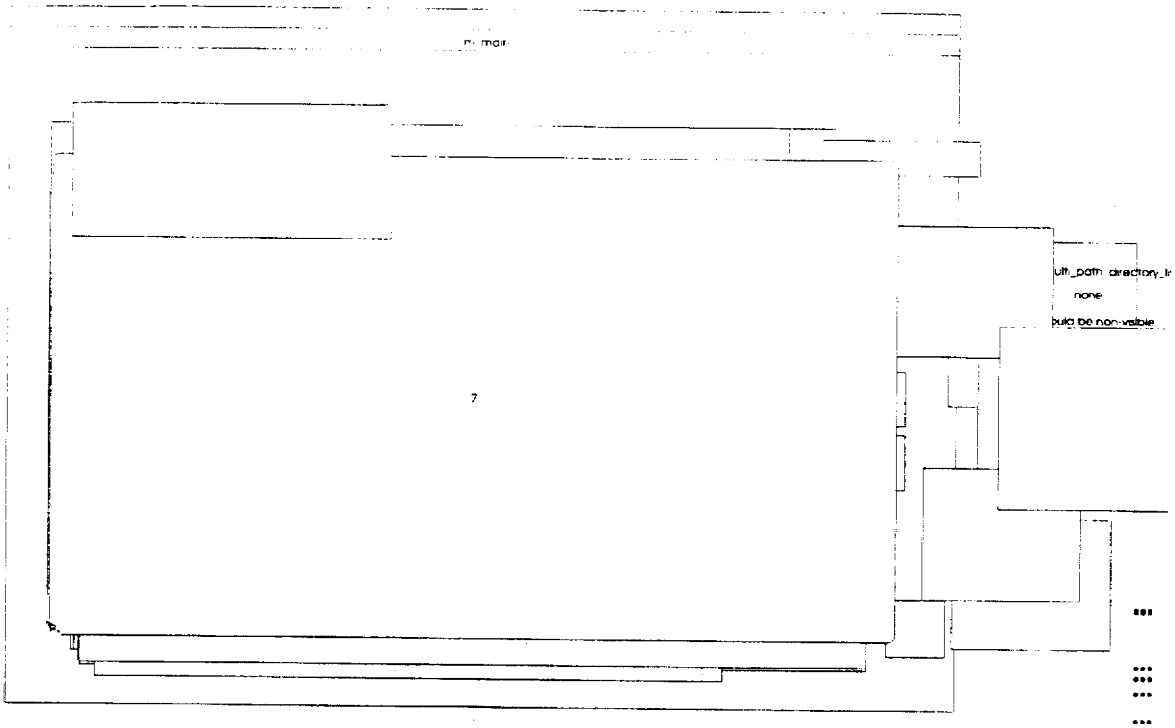

Window: w_mdi_frame inherited from aw_base

```
X = 1                     Y = 1                      Width = 2958            Height = 1917
Visible = true            Enabled = true             TitleBar = true         MenuName = "m_main"
ControlMenu = true        MinBox = true              MaxBox = true           Resizable = true
WindowType = mdihelp!     WindowState = maximized!                           BackColor = 12632256

Instance Variables
String iCurrentSize = "u_tab4"
String iLabelText[]
int cnt

string is_tab1, is_tab2, is_tab3, is_tab4
string is_tab5, is_tab6, is_tab7

long    il_job_number


End of Instance Variables

Script for: open  event
call aw_base::open;
title = app_title + " Office"

setpointer( hourglass! )
```

```
Window: w_mdi_frame                                                    Page: 3
Library: d:\projects\nwire\admin\v1-0b1\aiconadm.pbl
Date: 7/6/95     Time: 11:25:01

if Current
   ItemSize = "u_tab2"
w     iidtabs()

wf_awsharedata()

cb_tabs.hide()
uo_page_01.hide()
uo_page_02.hide()
uo_page_03.hide()
uo_page_04.hide()
uo_page_05.hide()
uo_selected.hide()
uo_selection.hide()

transaction    sqlca_uo_page_01

sqlca_uo_page_01 = sqlca

w_mdi_frame.uo_page_01.dw_wo_page_1.settransobject(sqlca_uo_page_01)

//w_mdi_frame.uo_page_01.dw_wo_page_1.insertrow(0)

setpointer( arrow! )

close( w_aicon_nrider_admin )

   event( this, "we_open" )


End of Script



Script for: timer  event
call aw_base::timer;int phase_cnt
cnt += rand(10)
if cnt >= 100 then
    close(w_progress)
    timer(0,this)
end if
phase_cnt = cnt /10 + 1

// have to check to see if the window is open here since the user
// could have cancelled and closed the progress window

if isvalid(w_progress) then w_progress. &
            wf_progress(cnt/100,"Transfer in progress")


End of Script



Script for: ueb_new  event
call aw_base::ueb_new;string ls_due_day
int     ls_day
```

Window: w_mdi_frame
Library: d:\projects\nwire\admin\v1-0b1\aiconadm.pbl
Date: 7/6/91 Time: 11:25:02

Page: 3

```
Cur
if fontSize = "u_tab2"
    .setredraw(false)

cb_tabs.hide()
uo_page_01.hide()
uo_page_02.hide()
uo_page_03.hide()
uo_page_04.hide()
uo_page_05.hide()
uo_selected.hide()
uo_selection.hide()

buildtabs()
cb_tabs.show()
uo_page_01.show()

this.title = app_title + " - New Work Order"

uo_page_01.dw_wo_page_1.insertrow(0)

dw_get_max_wo_number.settransobject(sqlca)
dw_get_max_wo_number.retrieve()
long l
l = dw_get_max_wo_number.getitemnumber(1,1)

if isnull(l) then
   l = 0
end if
w_mdi_frame.uo_page_01.dw_wo_page_1.setitem(1,"number",l + 1)
w_mdi_frame.uo_page_01.dw_wo_page_1.setitem(1,"wo_date",today())
w_mdi_frame.uo_page_01.dw_wo_page_1.setitem(1,"time_in",now())


ls_due_day = mid( dayname( f_get_tomorrow() ), 1, 3)
w_mdi_frame.uo_page_01.dw_wo_page_1.setitem(1,"due_cust_day",ls_due_day)
w_mdi_frame.uo_page_01.dw_wo_page_1.setitem(1,"due_cust_date", f_get_tomorrow() )
w_mdi_frame.uo_page_01.dw_wo_page_1.setitem(1,"due_cust_time",16:00:00)

//dw_order.SetItem(3, "hire_date", 1993-06-07)
uo_selected.uf_clear()
uo_selection.uf_clear()
uo_selection.uf_new()


this.setredraw(true)

End of Script


Script for: ueb_open event
    aw_base::ueb_open;

m_main.m_file.m_new.disable()
m_main.m_file.m_open.disable()
m_main.m_file.m_close.enable()
```

```
Window: w_mdi_frame                                                    Page: 4
Library: d:\projects\nwire\admin\v1-0b1\aiconadm.pbl
Date: 7/6/95    Time: 11:25:02

m_main.m_file.m_cancel.enable()
m_main.m_file.m_save.enable()
m_main.m_file.m_saveas.enable()
//m_main.m_file.m_delete.disable()
m_main.m_file.m_delete.enable()

m_main.m_file.m_exit.toolbaritemvisible = false
m_main.m_file.m_close.toolbaritemvisible = true


m_main.m_file.m_print.enable()
m_main.m_file.m_transmit.enable()

//opensheet(w_open_wo, this,0 , Original! )

open( w_open_wo )


End of Script



Script for: ueb_close  event
call aw_base::ueb_close;
w_mdi_frame.triggerevent("ueb_save_wo")

this.setredraw(false)
cb_tabs.destroytabs()
cb_tabs.hide()
uo_page_01.hide()
uo_page_02.hide()
uo_page_03.hide()
uo_page_04.hide()
uo_page_05.hide()
uo_selected.hide()
uo_selection.hide()

m_main.m_file.m_new.enable()
m_main.m_file.m_open.enable()
m_main.m_file.m_close.disable()

m_main.m_file.m_close.toolbaritemvisible = false
m_main.m_file.m_exit.toolbaritemvisible = true

m_main.m_file.m_cancel.disable()
m_main.m_file.m_save.disable()
m_main.m_file.m_saveas.disable()
m_main.m_file.m_delete.disable()
m_main.m_file.m_print.disable()
m_main.m_file.m_transmit.disable()

w_mdi_frame.uo_selection.enabled = true
w_mdi_frame.uo_selection.cb_reset.enabled = true
w_mdi_frame.uo_selection.cb_a_select_others.enabled = true
w_mdi_frame.uo_selection.cb_a_select_all.enabled = true
w_mdi_frame.uo_selection.cb_a_desect_all.enabled = true
w_mdi_frame.uo_selection.cb_ok.enabled = true
w_mdi_frame.uo_selection.cb_s_select_all.enabled = true
```

```
w_mdi_frame.uo_selection.pb_view.enabled = true
w_mdi_frame.uo_selection.cb_s_deselect_all.enabled = true
w_mdi_frame.uo_selection.pb_deselect.enabled = true
w_mdi_frame.uo_selection.pb_select.enabled = true
w_mdi_frame.uo_selected.cb_delete.enabled = true


w_mdi_frame.title = app_title + " Office"
this.setredraw(true)

m_main.m_tabs.visible = false
m_main.m_tabs.disable()

End of Script



Script for: ueb_update_selected  event
call aw_base::ueb_update_selected;long      ll_job_number

setpointer(hourglass!)
ll_job_number = uo_page_01.dw_wo_page_1.getitemnumber(1,"job_number")

//messagebox( "job_number", string( ll_job_number ))

uo_selected.dw_selected.settransobject(sqlca)
uo_selected.dw_selected.retrieve( ll_job_number )

uo_selected.pb_view.enabled = false
uo_selected.cb_delete.enabled = false

setpointer(arrow!)

//long l
//long l1
//long l3
//string docname
//
//messagebox("ueb_update_selected","")
//
//l = uo_selected.dw_selected.rowcount()
//l1 = 1
//do until l1 > l
//  uo_selected.dw_selected.deleterow(0)
//  l1 = l1 + 1
//loop
//
//l = uo_selection.dw_selected.rowcount()
//l1 = 1
//
//do until l1 > l
//  docname = uo_selection.dw_selected.getitemstring(l1,1)
//  l3 = uo_selected.dw_selected.insertrow(0)
//  uo_selected.dw_selected.setitem(l3,1,docname)
//  l1 = l1 + 1
//loop
//
```

```
End of Script

Script for: ueb_save_wo  event
call aw_base::ueb_save_wo;
setpointer( hourglass! )

uo_page_01.dw_wo_page_1.accepttext()
uo_page_01.dw_wo_page_1.update()

COMMIT;

uo_selection.triggerevent("ueb_save_docs")

setpointer( arrow! )


End of Script

Script for: ueb_cancel  event
call aw_base::ueb_cancel;
this.setredraw(false)
cb_tabs.destroytabs()
cb_tabs.hide()
uo_page_01.hide()
uo_page_02.hide()
uo_page_03.hide()
uo_page_04.hide()
uo_page_05.hide()
uo_selected.hide()
uo_selection.hide()

m_main.m_file.m_new.enable()
m_main.m_file.m_open.enable()
m_main.m_file.m_close.disable()
m_main.m_file.m_cancel.disable()
m_main.m_file.m_save.disable()
m_main.m_file.m_saveas.disable()
m_main.m_file.m_delete.disable()
m_main.m_file.m_print.disable()
m_main.m_file.m_transmit.disable()

w_mdi_frame.uo_selection.enabled = true
w_mdi_frame.uo_selection.cb_reset.enabled = true
w_mdi_frame.uo_selection.cb_a_select_others.enabled = true
w_mdi_frame.uo_selection.cb_a_select_all.enabled = true
w_mdi_frame.uo_selection.cb_a_desect_all.enabled = true
w_mdi_frame.uo_selection.cb_ok.enabled = true
w_mdi_frame.uo_selection.cb_s_select_all.enabled = true
w_mdi_frame.uo_selection.pb_view.enabled = true
```

```
Window: w_mdi_frame                                                    Page:
Library: d:\projects\nwire\admin\v1-Cbl\aiconadm.pbl
Date: 7/6/95     Time: 11:25:02

w_mdi_frame.uo_selection.cb_s_deselect_all.enabled = true
w_mdi_frame.uo_selection.pb_deselect.enabled = true
w_mdi_frame.uo_selection.pb_select.enabled = true
w_mdi_frame.uo_selected.cb_delete.enabled = true
w_mdi_frame.title = "AICON"

this.setredraw(true)

m_main.m_tabs.visible = false
m_main.m_tabs.disable()

End of Script



Script for: ueb_open_wo  event
call aw_base::ueb_open_wo;
iCurrentSize = "u_tab2"

m_main.m_file.m_cancel.enabled = true
m_main.m_file.m_exit.toolbaritemvisible = false
m_main.m_file.m_close.toolbaritemvisible = true


this.setredraw(false)

buildtabs()
uo_page_01.show()

uo_selected.uf_clear()
uo_selection.uf_clear()
uo_selection.uf_new()
uo_selection.uf_open()

this.setredraw(true)

End of Script



Script for: we_transmit  event
call aw_base::we_transmit;
wf_transmit()


End of Script



Script for: we_open  event
call aw_base::we_open;open( w_aicon_nrider_admin )
End
  of Script



Script for: we_transmit_setup  event
call aw_base::we_transmit_setup;//
```

```
Window: w_mdi_frame                                                    Page: 9
Library: d:\projects\nwire\admin\v1 0b1\aiconadm.pbl
Date: 1/6/95      Time: 11:25:02

//
//

    setpointer( hourglass! )
    wf_transfer_setup()

End of Script


Script for: we_transmit_v1  event
call aw_base::we_transmit_v1;//
//
//

    setpointer( hourglass! )
    wf_transfer_v1()

End of Script


Script for: we_transmit_dl  event
call aw_base::we_transmit_dl;//
//
//

    setpointer( hourglass! )
    wf_transfer_dl()

End of Script


Script for: ueb_saveas  event
call aw_base::ueb_saveas;datawindow    ldw_saved


this.title = app_title + " - New (Copied) Work Order"


ldw_saved = uo_page_01.dw_wo_page_1
uo_page_01.dw_wo_page_1.reset()
uo_page_01.dw_wo_page_1.insertrow(0)
uo_page_01.dw_wo_page_1 = ldw_saved

dw_get_max_wo_number.settransobject(sqlca)
dw_get_max_wo_number.retrieve()
     l
    dw_get_max_wo_number.getitemnumber(1,1)

if isnull(l) then
    l = 0
end if
```

Window: w_mdi_frame
Library: d:\projects\nwire\admin\v1-0b1\aiconadm.pbl
Date: 7/6/95 Time: 11:28:02

Page: 5

```
w_mdi_frame.uo_page_01.dw_wo_page_1.setitem(1,"number",1 + 1)

//uo_selected.uf_clear()
//uo_selection.uf_clear()
//uo_selection.uf_new()

this.setredraw(true)



End of Script



Script for: ueb_delete  event
call aw_base::ueb_delete;
long   ll_rows, ll_cnt


setpointer( hourglass! )
SetMicroHelp("Deleting Work Order ...")
this.setredraw(false)

uo_page_01.dw_wo_page_1.deleterow(0)
uo_page_01.dw_wo_page_1.update()
COMMIT;

//ll_rows = rowcount( w_mdi_frame.uo_selection.dw_selected )
//for ll_cnt = 1 to ll_rows
//  w_mdi_frame.uo_selection.dw_selected.deleterow( ll_cnt )
//next
//w_mdi_frame.uo_selection.dw_selected.update()
//
//COMMIT;

cb_tabs.destroytabs()
cb_tabs.hide()
uo_page_01.hide()
uo_page_02.hide()
uo_page_03.hide()
uo_page_04.hide()
uo_page_05.hide()
uo_selected.hide()
uo_selection.hide()

m_main.m_file.m_new.enable()
m_main.m_file.m_open.enable()
m_main.m_file.m_close.disable()
m_main.m_file.m_cancel.disable()
m_main.m_file.m_save.disable()
m_main.m_file.m_saveas.disable()
m_main.m_file.m_delete.disable()
m_main.m_file.m_print.disable()
m_main.m_file.m_transmit.disable()

w_mdi_frame.uo_selection.enabled = true
```

```
Window: w_mdi_frame                                                    Page: 10
Library: d:\projects\nwire\admin\v1-0b1\aiconadm.pbl
Date: 7 6 95     Time: 11:03:02

w_mdi_frame.uo_selection.cb_reset.enabled = true
   i_frame.uo_selection.cb_a_select_others.enabled = true
   i_frame.uo_selection.cb_a_select_all.enabled = true
w_mdi_frame.uo_selection.cb_a_desect_all.enabled = true
w_mdi_frame.uo_selection.cb_ok.enabled = true
w_mdi_frame.uo_selection.cb_s_select_all.enabled = true
w_mdi_frame.uo_selection.pb_view.enabled = true
w_mdi_frame.uo_selection.cb_s_deselect_all.enabled = true
w_mdi_frame.uo_selection.pb_deselect.enabled = true
w_mdi_frame.uo_selection.pb_select.enabled = true
w_mdi_frame.uo_selected.cb_delete.enabled = true

w_mdi_frame.title = "AICON"
this.setredraw(true)

m_main.m_tabs.visible = false
m_main.m_tabs.disable()

SetMicroHelp(tag)

setpointer( arrow! )

End of Script


Script for: we_poll_received  event
    aw_base::we_poll_received;//
//
//
    open( w_received_unread )


End of Script



Script for: we_print_wo  event
call aw_base::we_print_wo;
long    ll_job_number

setpointer( hourglass! )

ll_job_number = uo_page_01.dw_wo_page_1.getitemnumber(1,"job_number")
if ll_job_number > 0 then
    uo_selected.dw_wo_printout.settransobject( sqlca )
    uo_selected.dw_wo_printout.retrieve( ll_job_number )
//  uo_selected.dw_wo_printout.Print(true)

    uo_page_01.dw_wo_page_1.Print(true)
    uo_page_02.dw_wo_page_1.Print(true)
    uo_page_03.dw_wo_page_1.Print(true)
     o_page_04.dw_wo_page_1.Print(true)
     o_page_05.dw_wo_page_1.Print(true)

end if
setpointer( arrow! )
```

Window: w_mdi_frame
Library: c:\projects\nwire\admin\v1-0b1\aiconadm.pbl
Date: 7/6/95 Time: 11:25:12

Page: 11

End of Script

```
public subroutine buildtabs ()
Integer ArrayInoex, TotalTabs
String TabLabel

This.SetRedraw(False)
cb_tabs.DestroyTabs()
This.SetRedraw(True)

is_tab1 = "&General"
is_tab2 = "&Account"
is_tab3 = "&Page"
is_tab4 = "Stoc&k"
is_tab5 = "No&tes"
is_tab6 = "&Documents"
//is_tab7 = "Se&lect Docs"


//IF Right(iCurrentSize,1) = "1" THEN

    iLabelText[1] = is_tab1
    iLabelText[2] = is_tab2
    iLabelText[3] = is_tab3
    iLabelText[4] = is_tab4
    iLabelText[5] = is_tab5
    iLabelText[6] = is_tab6
//  iLabelText[7] = is_tab7

//END IF

TotalTabs = Integer(sle_TotalTabs.Text)
IF TotalTabs > UpperBound(iLabelText) THEN
    FOR ArrayIndex = UpperBound(iLabelText) + 1 TO TotalTabs
        iLabelText[ArrayIndex] = "Label" + String(ArrayIndex)
    END FOR
END IF

FOR ArrayIndex = 1 to TotalTabs
    cb_tabs.DefineTab(iLabelText[ArrayIndex])
END FOR

This.SetRedraw(False)
cb_tabs.CreateTabs(Integer(sle_TabsAcross.Text),iCurrentSize)
This.SetRedraw(True)

wf_size_uo()
cb_tabs.show()


end subroutine
```

```
public
    subroutine wf_enable_controls ()
w_mdi_frame.uo_selection.enabled = true
w_mdi_frame.uo_selection.cb_reset.enabled = true
w_mdi_frame.uo_selection.cb_a_select_others.enabled = true
w_mdi_frame.uo_selection.cb_a_select_all.enabled = true
w_mdi_frame.uo_selection.cb_a_desect_all.enabled = true
w_mdi_frame.uo_selection.cb_ok.enabled = true
w_mdi_frame.uo_selection.cb_s_select_all.enabled = true
w_mdi_frame.uo_selection.pb_view.enabled = false
w_mdi_frame.uo_selection.cb_s_deselect_all.enabled = true
w_mdi_frame.uo_selection.pb_deselect.enabled = true
w_mdi_frame.uo_selection.pb_select.enabled = true
w_mdi_frame.uo_selected.cb_delete.enabled = true

if uo_selection.il_available_selectedrows + uo_selection.il_selected_selectedrows = 1 then
    uo_selection.pb_view.enabled = true
else
    uo_selection.pb_view.enabled = false
end if
end subroutine


public subroutine wf_disable_controls ()
w_mdi_frame.uo_selection.enabled = false
w_mdi_frame.uo_selection.cb_reset.enabled = false
w_mdi_frame.uo_selection.cb_a_select_others.enabled = false
w_mdi_frame.uo_selection.cb_a_select_all.enabled = false
w_mdi_frame.uo_selection.cb_a_desect_all.enabled = false
w_mdi_frame.uo_selection.cb_ok.enabled = false
w_mdi_frame.uo_selection.cb_s_select_all.enabled = false
w_mdi_frame.uo_selection.pb_view.enabled = false
w_mdi_frame.uo_selection.cb_s_deselect_all.enabled = false
w_mdi_frame.uo_selection.pb_deselect.enabled = false
w_mdi_frame.uo_selection.pb_select.enabled = false
w_mdi_frame.uo_selected.cb_delete.enabled = false


end subroutine



public subroutine wf_transmit ()
str_progress parm

//m_main.m_file.m_exit.toolbaritemvisible = true
//m_main.m_file.m_close.toolbaritemvisible = false

this.triggerevent("ueb_update_selected")

parm.cancel_window = this
parm.cancel_event = ""
parm.title = "Transfering Documents"
this.wf_disable_controls()
cnt = 0
gs_transmit_status = 'Y'
```

```
Window: w_mdi_frame                                                    Page: 11
Library: d:\projects\nwire\admin\v1-0b1\aiconadm.pbl
Date: 7/6/95    Time: 11:25:02

uo_page_01.dw_wo_page_1.setitem(1, "transmitted", gs_transmit_status )

uo_selected.uf_prepare_zipfile ( )
m_main.m_file.m_cancel.enabled = false

end subroutine



public subroutine wf_close ()
this.triggerevent("ueb_close")
w_mdi_frame.title = "AICON"


end subroutine



public subroutine wf_cancel ()
this.triggerevent("ueb_cancel")
w_mdi_frame.title = "AICON"


end subroutine

public subroutine wf_size_uo ()

wf_tabfit( uo_page_01 )
//wf_dw_tabfit( uo_page_01.dw_wo_page_1 )

uo_page_01.dw_wo_page_1.resize ( uo_page_01.width , uo_page_01.height )

wf_tabfit( uo_page_02 )
wf_tabfit( uo_page_03 )
wf_tabfit( uo_page_04 )
wf_tabfit( uo_page_05 )
wf_tabfit( uo_selected )
wf_tabfit( uo_selection )



end subroutine


public function string wf_get_uo_size (userobject uo_arg)

return ( "H = " + string( uo_arg.height ) + "~n~r" + &
        "W = " + string( uo_arg.width ) )
```

```
end function


public subroutine wf_tabfit (ref userobject uo_arg)

uo_arg.move ( cb_tabs.x + 50, cb_tabs.y + 50 )
uo_arg.resize ( cb_tabs.width - 100 , cb_tabs.height - 100 )


end subroutine


public subroutine wf_dwtabfit (ref datawindow uo_arg)

uo_arg.move ( cb_tabs.x + 50, cb_tabs.y + 50 )
uo_arg.resize ( cb_tabs.width - 100 , cb_tabs.height - 100 )


end subroutine

public subroutine wf_center_dw (ref userobject base, ref datawindow obj)
int     li_x, li_y

// Center the object on it's base

li_x =  base.x + ( (base.width - obj.width) / 2 ) / 2
if li_x < 10 then li_x = 10  // make sure it's on the base object
li_y = base.y + (( (base.height -  obj.height + 200) / 2 ) - 200)
if li_y < 10 then li_y = 10     // make sure it's on the base object

move(obj, li_x, li_y)

end subroutine


public subroutine wf_center_uo (ref userobject base, ref datawindow obj)
int     li_x, li_y

// Center the object on it's base

li_x =  base.x + ( (base.width - obj.width) / 2 ) / 2
if li_x < 10 then li_x = 10  // make sure it's on the base object
li_y = base.y + (( (base.height -  obj.height + 200) / 2 ) - 200)
if li_y < 10 then li_y = 10     // make sure it's on the base object

move(obj, li_x, li_y)
```

```
Window: w_mdi_frame
Library: c:\projects\nwire\admin\v1-0b1\aiconadm.pbl
Date: 7/6/95     Time: 11:25:02                                   Page: 15

end subroutine


public subroutine wf_center_st (ref userobject base, ref statictext obj)
int     li_x, li_y

// Center the object on it's base

li_x =  base.x + ( (base.width - obj.width) / 2 ) / 2
if li_x < 10 then li_x = 10  // make sure it's on the base object
li_y = base.y + (( (base.height -  obj.height - 200) / 2 ) - 200)
if li_y < 10 then li_y = 10      // make sure it's on the base object

move(obj, li_x, li_y)


end subroutine


public subroutine wf_dwsharedata ()

uo_page_01.dw_wo_page_1.dwsharedata ( uo_page_02.dw_wo_page_1)
uo_page_01.dw_wo_page_1.dwsharedata ( uo_page_03.dw_wo_page_1)
uo_page_01.dw_wo_page_1.dwsharedata ( uo_page_04.dw_wo_page_1)
uo_page_01.dw_wo_page_1.dwsharedata ( uo_page_05.dw_wo_page_1)

end subroutine


public subroutine wf_transfer_setup ()
string      ls_exec_command

ls_exec_command  = "c:\projects\aicon\client\aicont.exe /s"

//ls_exec_command  = "c:\projects\aicont\dialxfer.exe /s"


run (ls_exec_command)

end subroutine


public subroutine wf_transfer_v1 ()
string      ls_exec_command

ls_exec_command  = "aicont.exe /v1"

run (ls_exec_command)

end subroutine
```

```
public subroutine wf_transfer_dl ()
string ls_exec_command

ls_exec_command = "aicont.exe /dl"

run (ls_exec_command)

end subroutine


public subroutine wf_import_dwx (string dwx_wo_file, string dwx_doc_file)
int     nRet, nFile

string ls_str1, sSyntax

/****************************************************************
   Read the attachment file containing the DataWindow syntax,
   then close and delete the temporary attachment file
 ****************************************************************/
   nFile = FileOpen ( dwx_wo_file )

   nRet = FileRead ( nFile, sSyntax )
   if nRet < 0 then
      MessageBox ( "Work Order Import", &
             "Unable to  read Import File", &
              StopSign! )
      return
   end if

   FileClose ( nFile )

/****************************************************************
   Now, create the received DataWindow in the
                                          uo_page_01.dw_wo_page_1
 ****************************************************************/

   uo_page_01.dw_wo_page_1.dwCreate ( sSyntax )

/****************************************************************/
/* Now read for the attached documents  ************************
   Read the attachment file containing the DataWindow syntax,
   then close and delete the temporary attachment file
 ****************************************************************/
   nFile = FileOpen ( dwx_doc_file )

   nRet = FileRead ( nFile, sSyntax )
   if nRet < 0 then
      MessageBox ( "Work Order Import", &
             "Unable to  read Import File (Documents) ", &
              StopSign! )
      return
   end if

   FileClose ( nFile )

/****************************************************************
   Now, create the received DataWindow in the
```

```
Window: w_mdi_frame
Library: d:\projects\nwire\admin\v1-0b1\aiconadm.pbl                Page: 17
Date: 7/6/95    Time: 11:29:02

                                                   uc_selected.dw_selected
*************************************************************************/

   uc_selected.dw_selected.dwCreate ( sSyntax )

/*************************************************************************/

end subroutine


SingleLineEdit: sle_totaltabs
X = 2497              Y = 349               Width = 110             Height = 97
TabOrder = 70         Limit = 0             Enabled = true          Border = true
Text = "6"            TextColor = 33554432  BackColor = 1073741824  TextCase = anycase!
BorderStyle = stylelowered!

SingleLineEdit: sle_tabsacross
X = 2497              Y = 461               Width = 110             Height = 97
TabOrder = 90         Limit = 0             Enabled = true          Border = true
Text = "7"            TextColor = 33554432  BackColor = 1073741824  TextCase = anycase!
BorderStyle = stylelowered!

RadioButton: rb_1
X = 2387              Y = 573               Width = 252             Height = 73
TabOrder = 0          Enabled = true        Text = "Small"          Automatic = true
TextColor = 33554432  BackColor = 12632256  BorderStyle = stylelowered!

  ipt for: clicked  event
iCurrentSize = "u_tab1"

End of Script


RadioButton: rb_2
X = 2387              Y = 669               Width = 311             Height = 65
TabOrder = 0          Enabled = true        Text = "Medium"         Automatic = true
Checked = true        TextColor = 33554432  BackColor = 12632256
BorderStyle = stylelowered!

Script for: clicked  event
iCurrentSize = "u_tab2"

End of Script


RadioButton: rb_3
X = 2387              Y = 749               Width = 252             Height = 73
TabOrder = 0          Enabled = true        Text = "Large"          Automatic = true
TextColor = 33554432  BackColor = 12632256  BorderStyle = stylelowered!

Script for: clicked  event
    rentSize = "u_tab3"

End of Script
```

```
Window: w_mdi_frame                                                              Page: 18
Library: d:\projects\nwire\admin\v1-0b1\aiconadm.pbl
Date: 7/6/95     Time: 11:25:02
```

Korho

```
RadioButton: rb_4
X = 2387                Y = 829                 Width = 275             Height = 65
TabOrder = 0            Enabled = true          Text = "Xlarge"         Automatic = true
TextColor = 33554432    BackColor = 12632256    BorderStyle = stylelowered!

Script for: clicked  event
iCurrentSize = "u_tab4"

End of Script


CommandButton: cb_1
X = 2423                Y = 901                 Width = 247             Height = 109
TabOrder = 80           Enabled = true          Text = "none"

Script for: clicked  event
buildtabs()

End of Script


User Object: uo_selection
X = 202                 Y = 357                 Width = 2455            Height = 1297
TabOrder = 0            Enabled = true          BackColor = 12632256
ObjectType = customvisual!

User Object: uo_page_01
X = 179                 Y = 357                 Width = 1642            Height = 633
TabOrder = 60           Enabled = true          BackColor = 12632256
ObjectType = customvisual!

User Object: uo_page_03
X = 211                 Y = 357                 Width = 2455            Height = 1297
TabOrder = 40           Enabled = true          BackColor = 12632256
ObjectType = customvisual!

User Object: uo_page_04
X = 225                 Y = 385                 Width = 2455            Height = 1297
TabOrder = 30           Enabled = true          BackColor = 12632256
ObjectType = customvisual!

User Object: uo_selected
X = 229                 Y = 397                 Width = 2455            Height = 1297
TabOrder = 0            Enabled = true          BackColor = 12632256
ObjectType = customvisual!

User Object: uo_page_05
X = 229                 Y = 389                 Width = 2455            Height = 1297
TabOrder = 0            Enabled = true          BackColor = 12632256
ObjectType = customvisual!

User Object: uo_page_02
X = 129                 Y = 205                 Width = 2455            Height = 1297
TabOrder = 50           Visible = true          Enabled = true          BackColor = 12632256
ObjectType = customvisual!
```

Window: w_mdi_frame
Library: d:\projects\nwire\admin\v1 0b1\aiconadm.pbl
Date: 7 6 97 Time: 11:25:02

Page: 13

User

Object: dw_get_max_wo_number

| | | | |
|---|---|---|---|
| 2533 | Y = 937 | Width = 494 | Height = 97 |
| TabOrder = 20 | Enabled = true | DataObject = "d_get_max_wo_number" | |
| Border = true | LiveScroll = true | BorderStyle = stylebox! | |

User Object: cb tabs

| | | | |
|---|---|---|---|
| X = 133 | Y = 293 | Width = 2638 | Height = 1321 |
| TabOrder = 0 | Text = "7" | | |

```
Script for: uoe_tabselected event
call u_tabbase::uoe_tabselected;// This event is called when a tab is selected.  It should be co
ded in the
// descendant to invoke the proper actions for the new tab.  This script
// should also perform any deselecting/hiding/disabling of the previous
// tab's related object(s).

String strLabelText
u_tab aTab

// Get a reference to the active tab and then get the label text
// for that tab.
aTab = This.GetActiveTab()
strLabelText = aTab.GetLabel()

// The instance variable "iLastLabelText" contains the text of
// the tab that was just deselected.  Use this variable to
// turnoff any objects associated with this label.
//
// Use this CHOOSE CASE statement to perform the necessary
// processing.
cb_tabs.show()
CHOOSE CASE strLabelText
    CASE is_tab1
        uo_page_01.Show()
    CASE is_tab2
        uo_page_02.Show()
    CASE is_tab3
        uo_page_03.Show()
    CASE is_tab4
        uo_page_04.Show()
    CASE is_tab5
        uo_page_05.Show()
    CASE is_tab6
        parent.triggerevent("ueb_update_selected")
        uo_selected.Show()
    CASE is_tab7
        uo_selection.uf_save()
        uo_selection.Show()
END CHOOSE
IF iLastLabelText = strLabelText THEN
    eturn
END IF

CHOOSE CASE iLastLabelText
    CASE is_tab1
```

```
        uo_page_01.hide()
    CASE is_tab2
        uo_page_02.hide()
    CASE is_tab3
        uo_page_03.hide()
    CASE is_tab4
        uo_page_04.hide()
    CASE is_tab5
        uo_page_05.hide()
    CASE is_tab6
        uo_selected.hide()
    CASE is_tab7
        uo_selection.hide()
END CHOOSE

this.setposition(tobottom!)

End of Script
```

DataWindow: dw_export_wo

| | | | |
|---|---|---|---|
| X = 197 | Y = 153 | Width = 997 | Height = 369 |
| TabOrder = 10 | Enabled = true | DataObject = "d_export_wo" | |
| Border = true | LiveScroll = true | BorderStyle = stylebox! | |

Window: w_open_wo
Library: d:\projects\nwire\admin\v1-0b1\aiconadm.pbl
Date: 7/6/95 Time: 11:[illegible]
Page: 1

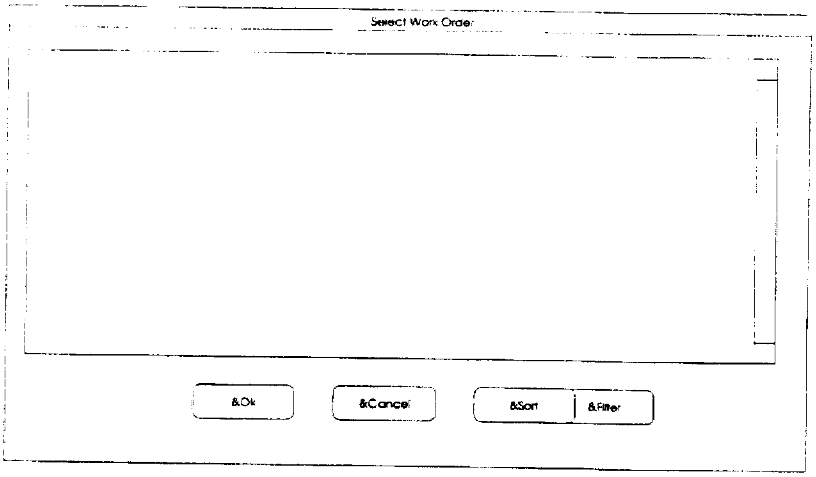

```
Window: w_open_wo
X = 206                  Y = 345                  Width = 2510          Height = 1249
Visible = true           Enabled = true           TitleBar = true
Title = "Select Work Order"                       ControlMenu = true    Border = true
WindowType = response!   WindowState = normal!    BackColor = 12632256

Instance Variables
long    i_wo_number


End of Instance Variables


Script for: close  event
setpointer( hourglass! )

if gb_cancelled = true then
   m_main.m_file.m_new.enable()
   m_main.m_file.m_open.enable()
   m_main.m_file.m_close.disable()
   m_main.m_file.m_close.toolbaritemvisible = false
   m_main.m_file.m_exit.toolbaritemvisible = true
   m_main.m_file.m_exit.enable()
   m_main.m_file.m_cancel.disable()
   m_main.m_file.m_save.disable()
   m_main.m_file.m_saveas.disable()
   m_main.m_file.m_delete.disable()
   m_main.m_file.m_print.disable()
   m_main.m_file.m_transmit.disable()
   m_main.m_tabs.visible = false
```

```
    m_main.m_tabs.disable()

end if
setpointer( arrow! )


End of Script


Script for: open  event
gb_cancelled = false

dw_work_order.settransobject(sqlca)
dw_work_order.retrieve()

dw_work_order.setcolumn(1)


End of Script


Script for: we_setfilter  event
   ing ls_filter_criteria

setpointer( hourglass! )

setnull( ls_filter_criteria )
dw_work_order.setfilter( ls_filter_criteria )
dw_work_order.Filter()

setpointer( arrow! )

setfocus()


End of Script


Script for: we_setsort  event
string ls_sort_criteria

setpointer( hourglass! )
setnull( ls_sort_criteria )
   ork_order.setsort( ls_sort_criteria )

dw_work_order.Sort()

setpointer( arrow! )
```

```
setfocus()

End of Script
```

CommandButton: cb_2

```
X = 1715            Y = 977            Width = 321          Height = 93
TabOrder = 40       Enabled = true     Text = "&Filter"     Default = true

Script for: clicked event
triggerevent( parent, "we_setfilter" )

End of Script
```

CommandButton: cb_1

```
X = 1463            Y = 977            Width = 321          Height = 93
TabOrder = 50       Visible = true     Enabled = true       Text = "&Sort"
Default = true

Script for: clicked event
triggerevent( parent, "we_setsort" )

End of Script
```

CommandButton: cb_cancel

```
X = 1025            Y = 977            Width = 321          Height = 93
TabOrder = 30       Visible = true     Enabled = true       Text = "&Cancel"

Script for: clicked event

gb_cancelled = true

close(parent)

End of Script
```

CommandButton: cb_ok

```
X = 586             Y = 977            Width = 321          Height = 93
TabOrder = 20       Visible = true     Enabled = true       Text = "&Ok"
Default = true

Script for: clicked event

//w_mdi_frame.uo_page_01.dw_wo_page_1.setitem(1,"number", i_wo_number)
  w_mdi_frame.uo_page_01.dw_wo_page_1.settaborder("number", 0)
```

```
setpointer( hourglass! )
  mdi_frame.uo_page_01.dw_wo_page_1.retrieve( i_wo_number )
  mdi_frame.postevent("ue_open_wo")
setpointer( arrow! )

close(parent)

End of Script


DataWindow: dw_work_order
X = 65                  Y = 65                  Width = 2346          Height = 837
TabOrder = 10           Visible = true          Enabled = true
DataObject = "d_wo_number_adm"                  VScrollBar = true     Border = true
LiveScroll = true       BorderStyle = stylebox!

Script for: clicked  event
long l

l = dw_work_order.getclickedrow()

if l = 0 then
   return
else
   cb_ok.enabled = true
   dw_work_order.selectrow( 0,false )
   dw_work_order.selectrow( l, true )
   i_wo_number = dw_work_order.getitemnumber( l, "job_number" )
   dw_work_order.setrow(l)
end if

End of Script


Script for: doubleclicked  event
cb_ok.triggerevent(clicked!)

End of Script
```

```
Window: w_received_unread                                        Page: 1
Library: d:\projects\nwire\admin\v1-0p1\aiconadm.pbl
Date: 7/6/96     Time: 11:25:02
```

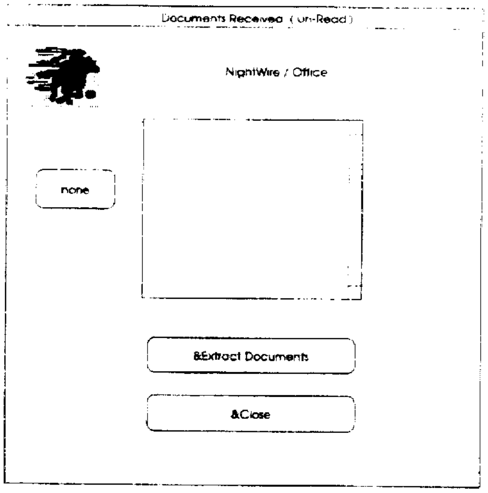

```
Window: w_received_unread
X = 718                   Y = 361                   Width = 1491              Height = 1309
Visible = true            Enabled = true            TitleBar = true
Title = "Documents Received  ( Un-Read )"           ControlMenu = true        Border = true
WindowType = popup!       WindowState = normal!     BackColor = 12632256

Script for: close  event


gs_nav_drive = nv_diskfile.fnv_get_drive()
gs_nav_directory = nv_diskfile.fnv_get_directory()
nv_diskfile.fnv_change_drive(gs_app_drive)
nv_diskfile.fnv_change_dir(gs_app_directory)
destroy nv_diskfile

End of Script


Script for: open  event
//
//


int l_value
string s_domname
string s_named
```

```
Window: w_received_unread                                        Page: 1
Library: d:\projects\nwire\admin\v1-0b1\aiconadm.pbl
Date: [illegible]    Time: [illegible]

nv_diskfile = create nv_diskfile
   diskfile.fnv_change_drive(gs_nav_drive)
   diskfile.fnv_change_dir(gs_nav_directory)

    setpointer( hourglass! )
    lb_received.DirList("c:\aicon\received\unread\*.*", &
                                0,st_received_path)
    setpointer( arrow! )

    timer(10, this)

End of Script

Script for: timer  event
//
//
//

    setpointer( hourglass! )
    lb_received.DirList("c:\aicon\received\unread\*.*", &
                                0,st_received_path)
    setpointer( arrow! )

End of Script

public subroutine wf_load_zipfile ()
//
//
//

string     ls_file, ls_path, ls_fullname, ls_temp_path
long           ll_ret

    f_get_sysparms()

    ls_temp_path = gs_temp

    if lb_received.totalitems() > 0 then

        ls_file = lb_received.selecteditem()
        ls_path = st_received_path.text
        ls_fullname = ls_path + "\" + ls_file

        ll_ret = run( "AICONU_2.EXE -o -s[illegible] " + ls_fullname + " " + ls_temp_path )

        MessageBox("Wait Until De-Compression Is Complete","Press OK to continue")
```

```
        wf_import_dwx( ls_file )

    end if
end subroutine


public subroutine wf_import_dwx (string dwx_wo_file)

    open( w_import_wo )

    w_import_wo.wf_import_wo( dwx_wo_file )


end subroutine
```

User Object: st_1

| | | | |
|---|---|---|---|
| X = 353 | Y = 57 | Width = 974 | Height = 133 |
| TabOrder = 0 | Visible = true | Text = "NightWire / Office" | |
| TextColor = 33554432 | BackColor = 12632256 | Alignment = center! | FillPattern = solid! |

CommandButton: cb_1

| | | | |
|---|---|---|---|
| X = 92 | Y = 393 | Width = 247 | Height = 109 |
| TabOrder = 20 | Enabled = true | Text = "none" | |

```
Script for: clicked  event

f_get_sysparms()

messagebox("paths", gs_temp + " " + gs_opened + " " + gs_unread )


End of Script
```

CommandButton: cb_load

| | | | |
|---|---|---|---|
| X = 444 | Y = 853 | Width = 650 | Height = 97 |
| TabOrder = 40 | Visible = true | Enabled = true | |
| Text = "&Extract Documents" | | Default = true | |

```
Script for: clicked  event
//
//
//

    setpointer( hourglass! )
    w_mdi_frame.setmicrohelp("Extracting Document Into Suspended Queue")
    wf_load_zipfile()
    w_mdi_frame.setmicrohelp(this.tag)

    setpointer( arrow! )
```

End of Script

```
StaticText: st_received_path
X = 161                 Y = 777                Width = 1381            Height = 73
TabOrder = 0            Visible = true         TextColor = 33554432    BackColor = 12632256
Alignment = center!     FillPattern = solid!

ListBox: lb_received
X = 426                 Y = 253                Width = 686             Height = 493
TabOrder = 10           Visible = true         Enabled = true          VScrollBar = true
Border = true           Sorted = true          TabStop = true          TextColor = 33554432
BackColor = 1073741824  BorderStyle = stylelowered!

Script for: doubleclicked event
triggerevent( cb_load, clicked! )

End of Script

Picture: p_1
X = 51                  Y = 41                 Width = 252             Height = 185
TabOrder = 0            Visible = true         Enabled = true
PictureName = "nrhorse2.bmp"                   OriginalSize = true     BorderStyle = stylebox!

CommandButton: cb_ok
X = 444                 Y = 1009               Width = 650             Height = 97
TabOrder = 30           Visible = true         Enabled = true          Text = "&Close"
Default = true

Script for: clicked event

    close( parent )

End of Script
```

Window: w_system_update
Library: d:\projects\nwire\admin\v1-0b1\aiconadm.pbl
Date: 7/6/95    Time: 11:25:02

Page: 1

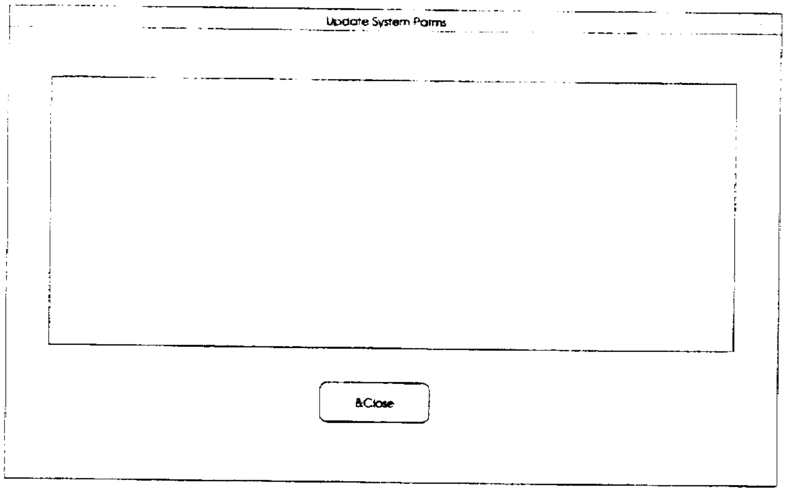

w: w_system_update

```
X   220              Y = 265              Width = 2428           Height = 1297
Visible = true       Enabled = true       TitleBar = true
Title = "Update System Parms"             ControlMenu = true     MinBox = true
MaxBox = true        Resizable = true     WindowType = main!     WindowState = normal!
BackColor = 12632256

Script for: close  event
//
//
//

   f_get_sysparms()

End of Script


Script for: open  event

dw_system.settransobject( sqlca )
dw_system.retrieve()




End of Script
```

Window: w_system_update Page: 2
Library: d:\projects\nwire\admin\v1-0b1\aiconadm.pbl
Date: 7/6/95 Time: 11:25:02

Command

CommandButton: cb_1

```
 983                Y = 965              Width = 348          Height = 109
TabOrder = 20       Visible = true       Enabled = true       Text = "&Close"
```

Script for: clicked event

```
dw_system.update()

commit;

close( parent )
```

End of Script

DataWindow: dw_system

```
X = 133             Y = 137              Width = 2158         Height = 737
TabOrder = 10       Visible = true       DataObject = "d_system_update"
Border = true       LiveScroll = true    BorderStyle = styleraised!
```

MAIL ROOM DEC 28 1995

APPLICATION OF WILLIE A. JACKSON, JR.

DOCUMENT PRINTING MANAGEMENT SYSTEM

FILED: DECEMBER 28, 1995

APPENDIX B

```
[illegible]                                              Page: 1
Library: d:\projects\nwire\client\v1 0b1\aiconc.pbl
Date: [illegible]      Time: [illegible]

APP
Application: aiconc

Global Variables
String App_Title = "NightWire"
str_setup_parameters gstr_setup_parameters
string s_work_order_status
string gs_app_drive
string gs_app_directory
string gs_nav_drive
string gs_nav_directory
string gs_transmit_status
booleangb_saveas
string gs_acrobat_reader = "c:\acroexch\acroexch.exe"
string gs_bds_phone  = "9,587-4189"
string gs_bds_phone2 = "9,315-8099"
string gs_transfer_method
string gs_target_drive, gs_zipfilename
string gs_aicon_phone, gs_dialprefix, gs_init_string
string gs_tape_command, gs_tape_suffix
booleangs_new_wo, gb_cancelled




End of Global Variables



Script for: open  event
String ODBC_DB = "aiconc.ini"

Open( w_aicon_nrider )

If UPPER(ProfileString(ODBC_DB, "Switches", "Firstrun", "YES")) = "YES" then
//  messagebox("","run setup2")
    Run( "SETUP2.PIF", minimized! )
    SetProfileString(ODBC_DB, "Switches", "Firstrun", "NO")
end if


// Establish database values from INI file
SQLCA.DBMS        =ProfileString(ODBC_DB,"database","DBMS",                " ")
SQLCA.database    =ProfileString(ODBC_DB,"database","Database",            " ")
SQLCA.LogID       =ProfileString(ODBC_DB,"database","LogID",               " ")
SQLCA.LogPass     =ProfileString(ODBC_DB,"database","LogPassword",         " ")
SQLCA.ServerName  =ProfileString(ODBC_DB,"database","ServerName",          " ")
SQLCA.UserID      =ProfileString(ODBC_DB,"database","UserID",              " ")
SQLCA.DBPass      =ProfileString(ODBC_DB,"database","DatabasetPassword",  " ")
SQLCA.Lock        =ProfileString(ODBC_DB,"database","Lock",                " ")
SQLCA.DBParm      =ProfileString(ODBC_DB,"database","DBParm",              " ")
     CONNECT
//   using sqlca;

nv_diskfile nv_diskfile
nv_diskfile = create nv_diskfile
gs_app_drive   nv_diskfile.fnv_get_drive()
```

```
Application: aiconc
Library: d:\projects\nwire\client\v1-0b1\aiconc.pbl
Date: 7/6/95     Time: 11:03:11
```

```
gs_app_directory = nv_diskfile.fnv_get_directory()
   nav_drive = gs_app_drive
   nav_directory = gs_app_directory
destroy nv_diskfile

toolbartext = true

Open(w_mdi_frame)

Open(w_mdi_clock)

SetFocus(w_mdi_frame)


End of Script
```

```
Application References

                          str_setup_parameters
                          d:\projects\nwire\client\v1-0b1\aiconc.pbl

Window                    w_aicon_nrider
                          d:\projects\nwire\client\v1-0b1\aiconcw.pbl
                                 uo_nightwire24
                                 d:\projects\nwire\client\v1-0b1\aiconcu.pbl

                          nv_diskfile
                          d:\projects\nwire\client\v1-0b1\aiconcu.pbl

Window                    w_mdi_frame
                          d:\projects\nwire\client\v1-0b1\aiconcw.pbl

Window                    w_mdi_clock
                          d:\projects\nwire\client\v1-0b1\aiconcw.pbl

End of Application References
```

```
Menu: m_main                                                    Page: 1
Library: d:\projects\nwire\client\v1-0b1\aiconn.pbl
Date: [illegible]      Time: 11:03:11

Menu.

      = m_main
MenuItem = m_file     "&File"
Visible = true     Enabled = true
MicroHelp = "Work Order, print, and setup options"

MenuItem = m_tabs     "&Tabs"
     Enabled = true
MicroHelp = "Text manipulation"

MenuItem = m_help     "&Help"
Visible = true     Enabled = true
MicroHelp = "Help and About"

MenuItems for m_file
MenuItem = m_new     "&New Work Order    Alt+N"
Visible = true     Enabled = true
MicroHelp = "Open new work order"
ToolBarItemName = "ScriptNo!"     ToolBarItemVisible = true
ToolBarItemText = "&New"     ToolBarItemOrder = 1     Shortcut = 590

Script for: clicked  event
m_main.m_file.m_new.disable()
m_main.m_file.m_open.disable()
m_main.m_file.m_close.enable()
m_main.m_file.m_cancel.enable()
m_main.m_file.m_save.enable()
m_main.m_file.m_saveas.disable()
m_main.m_file.m_delete.enable()
m_main.m_file.m_print.enable()
m_main.m_file.m_transmit.enable()

//m_main.m_tabs.visible = true
//m_main.m_tabs.enable()

w_mdi_frame.triggerevent("ueb_new")
m_main.m_file.m_exit.toolbaritemvisible = false
m_main.m_file.m_close.toolbaritemvisible = true



End of Script



MenuItem = m_open     "&Open Work Order...   Alt+O"
Visible = true     Enabled = true
MicroHelp = "Open existing work order"
ToolBarItemName = "Custom050!"     ToolBarItemVisible = true
ToolBarItemText = "&Open"     ToolBarItemOrder = 2     Shortcut = 591
Script for: clicked  event

w_mdi_frame.triggerevent("ueb_open")

m_main.m_file.m_exit.toolbaritemvisible = false
m_main.m_file.m_close.toolbaritemvisible = true
```

```
End of Script


MenuItem = m_close    "Close Work Order Ctrl+F4"
Visible = true
MicroHelp = "Close the current work order"
ToolBarItemName = "Custom038!"
ToolBarItemText = "Close"    ToolBarItemOrder = 98    ToolBarItemSpace = 20    Shortcut = 371

Script for: clicked  event

m_main.m_file.m_exit.toolbaritemvisible = true
m_main.m_file.m_close.toolbaritemvisible = false
w_mdi_frame.triggerevent("ueb_close")

End of Script


MenuItem = m_cancel    "&Cancel Work Order"
Visible = true
MicroHelp = "Cancel current work order"
ToolBarItemName = "Custom021!"    ToolBarItemVisible = true
ToolBarItemText = "Cancel"    ToolBarItemOrder = 3

Script for: clicked  event

m_main.m_file.m_exit.toolbaritemvisible = true
m_main.m_file.m_close.toolbaritemvisible = false

w_mdi_frame.triggerevent("ueb_cancel")

End of Script


MenuItem = m_save    "&Save Work Order"
Visible = true
MicroHelp = "Save work order"
ToolBarItemName = "Custom008!"    ToolBarItemVisible = true
ToolBarItemText = "Save"    ToolBarItemOrder = 3

Script for: clicked  event

w_mdi_frame.triggerevent("ueb_save_wo")

End of Script


MenuItem = m_saveas    "Copy Work Order"

Script for: clicked  event
```

```
Menu: m_saveas                                                    Page: 
Library: d:\projects\nwire\client\v1-0b1\aiconc.pbl
Date: 7/6/95    Time: 11:03:11

gb_saveas = true


w_mdi_frame.triggerevent("ueb_saveas")

End of Script



MenuItem = m_delete    "&Delete Work Order"
Visible = true     Enabled = true
MicroHelp = "Delete work order"
ToolBarItemName = "Clear!"    ToolBarItemVisible = true
ToolBarItemText = "Delete"    ToolBarItemOrder = 4    ToolBarItemSpace = 5

Script for: clicked  event
//if isvalid(w_work_order) then
//  return
////   w_work_order.cb_save_and_exit.triggerevent(clicked!)
//else
//  beep(1)
//end if

w_mdi_frame.triggerevent("ueb_delete")

m_main.m_file.m_exit.toolbaritemvisible = true
m_main.m_file.m_close.toolbaritemvisible = false

End of Script



MenuItem = m_-2    "-"
Visible = true     Enabled = true

MenuItem = m_print    "&Print Work Order   Ctrl+P"

MicroHelp = "Print work order"
ToolBarItemName = "Print!"
ToolBarItemText = "Print"    ToolBarItemOrder = 5    ToolBarItemSpace = 5    Shortcut = 336

Script for: clicked  event
//Script clicked for m_print of m_menu

w_mdi_frame.uo_selection.dw_selected.Print(true)
```

```
End of Script
```

```
Menu: m_main
Library: d:\projects\nwire\client\v1-0b1\aiconc.pbl                Page: 4
Date: 7/6/95    Time: 11:00:11

     Item - m_printsetup    "P&rint Setup"
     Enabled = true
MicroHelp = "Printer selection and printer setup"

Script for: clicked  event
PrintSetup()

End of Script


MenuItem = m_-3    "-"
     Enabled = true

MenuItem = m_setup    "System S&etup"
Visible = true     Enabled = true
MicroHelp = "Setup user preferences"

MenuItem = m_-    "-"
Visible = true     Enabled = true

MenuItem = m_transmit    "&Transmit Work Order"
Visible = true
MicroHelp = "Transfer work order to Nightrider"
ToolBarItemName = "Custom020!"    ToolBarItemVisible = true
ToolBarItemText = "Send"    ToolBarItemOrder = 6    ToolBarItemSpace = 5

Script for: clicked  event

triggerevent(parentwindow, "we_transmit")


End of Script


MenuItem = m_-4    "-"
Visible = true     Enabled = true

MenuItem = m_exit    "E&xit  Alt+F4"
Visible = true     Enabled = true
MicroHelp = "Exit application"
ToolBarItemName = "Exit!"    ToolBarItemVisible = true
ToolBarItemText = "Exit"    ToolBarItemOrder = 98    ToolBarItemSpace = 20    Shortcut = 627

Script for: clicked  event
Close(parentwindow)
End of Script
```

```
[illegible]                                                                    Page: [illegible]
Library: d:\projects\nwire\client\v1-0b[illegible].pbl
Date: [illegible]     Time: [illegible]

MenuItems for m_setup
[illegible] = m_transferparameters     "&Modem Port Setup ..."
[illegible] = true     Enabled = true

Script for: clicked  event

triggerevent(parentwindow, "wc_transmit_setup")



End of Script



MenuItem = m_modeminitstring     "Modem &Init String"
Visible = true     Enabled = true

Script for: clicked  event
//
//
//
    open( w_modem_setup )


End of Script


MenuItem = m_-1     "-"
Visible = true     Enabled = true

MenuItem = m_tapecommand     "Tape &Transfer Command"
    Enabled = true

Script for: clicked  event
//
//
//
    open( w_set_tapeparms )


End of Script



MenuItem = m_-6     "-"
    Enabled = true

MenuItem = m_searchpathmask     "File Search &Path && Mask"
Visible = true     Enabled = true

[illegible] for: clicked  event
[illegible] w_user_preferences)

End of Script
```

```
Menu: m_main
Library: d:\projects\nwire\client\v1-0b1\aiconc.pbl
Date: 1/6/95    Time: 11:03:11                                  Page:

Menuitems for m_tabs
MenuItem = m_generalinfo    "&General Info Alt+G"
Visible = true    Enabled = true
MicroHelp = "Undo previous cut, copy, paste, or clear"    Shortcut = 583

Script for: clicked event
w_mdi_frame.cb_tabs.ActivateTab &
                (w_mdi_frame.cb_tabs.iTabs[1].TabGraphic)

End of Script

MenuItem = m_account    "&Account   Alt+A"
Visible = true    Enabled = true
MicroHelp = "Cut selected item"    Shortcut = 577

Script for: clicked event
w_mdi_frame.cb_tabs.ActivateTab &
                (w_mdi_frame.cb_tabs.iTabs[2].TabGraphic)

End of Script

MenuItem = m_page    "&Page  Alt+P"
Visible = true    Enabled = true    Shortcut = 592

Script for: clicked event
w_mdi_frame.cb_tabs.ActivateTab &
                (w_mdi_frame.cb_tabs.iTabs[3].TabGraphic)

End of Script

MenuItem = m_stock    "Stoc&k   Alt+K"
Visible = true    Enabled = true
MicroHelp = "Copy selected item"    Shortcut = 587

Script for: clicked event
w_mdi_frame.cb_tabs.ActivateTab &
                (w_mdi_frame.cb_tabs.iTabs[4].TabGraphic)

End of Script

MenuItem = m_notes    "No&tes   Alt+T"
Visible = true    Enabled = true
MicroHelp = "Paste selected item"    Shortcut = 596

Script for: clicked event
w_mdi_frame.cb_tabs.ActivateTab &
```

```
                    (w_mdi_frame.cb_tabs.iTabs[5].TabGraphic)


End of Script



MenuItem = m_documents    "&Documents   Alt+D"
Visible = true     Enabled = true
MicroHelp = "Clear selected item"    Shortcut = 580

Script for: clicked  event
w_mdi_frame.cb_tabs.ActivateTab &
                    (w_mdi_frame.cb_tabs.iTabs[6].TabGraphic)


End of Script



MenuItem = m_selectdocuments    "Se&lect Documents Alt+L"
Visible = true     Enabled = true     Shortcut = 588

Script for: clicked  event
w_mdi_frame.cb_tabs.ActivateTab &
            (w_mdi_frame.cb_tabs.iTabs[7].TabGraphic)


End of Script



MenuItems for m_help
MenuItem = m_help1    "&Help"
Visible = true     Enabled = true
MicroHelp = "Application Help"
ToolBarItemName = "Help!"    ToolBarItemVisible = true
ToolBarItemText = "Help"    ToolBarItemOrder = 90

MenuItem = m_helponhelp    "H&ow to Use Help"
Visible = true     Enabled = true
MicroHelp = "Help on How to Use Help"

Script for: clicked  event
ShowHelp("winhelp.HLP", index!)

End of Script



MenuItem = m_-5    "-"
Visible = true     Enabled = true

MenuItem = m_about    "&About"
Visible = true     Enabled = true

Script for: clicked  event
open( w_about )
```

```
Menu: m_about
Library: c:\projects\nwirc\client\v1 0b1\aiconc.pbl          Page: 5
Date: 7/6/95     Time: 11:0?:??

End of Script
```

```
Structure: str_parms                                            Page: 1
Library: d:\projects\nwire\client\v1 0b1\aiconc.pbl
Date: 7 6/96    Time: 11:13:11

$PBExportHeader$str_parms.srs
global type str_parms from structure
    string string_arg[]
    char char_arg[]
    int integer_arg[]
    long long_arg[]
    date date_arg[]
    datetime datetime_arg[]
    time time_arg[]
    boolean boolean_arg[]
    real real_arg[]
    decimal {2} decimal_arg[]
    boolean canceled
    double double_arg[]
end type
```

```
Structure:  str_progress                                          Page:
Library: d:\projects\nwire\client\v1-0b1\aiconc.pbl
Date: 7/6/95     Time: 11:03:11

global type str_progress from structure
    window cancel_window
    string cancel_event
    string title
end type
```

```
Structure: str_setup_parameters                                              Page: 1
Library: d:\projects\nwire\client\v1-0b1\aiconc.pbl
Date: 7/6,95     Time: 1_:0?:1]

global type str_setup_parameters from structure
    string s_path[]
    string s_mask[]
end type
```

DataWindow: d_documents
Library: d:\projects\nwire\client\v1-0b1\a:concd.pbl
Date: 7/6/95  Time: 11:03:26
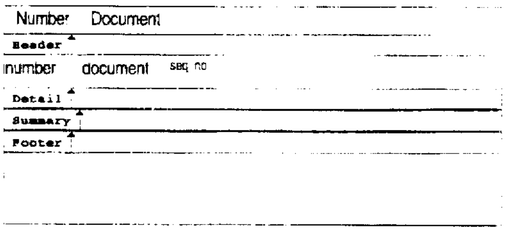

```
DataWindow: d_documents                                                    Page: 2
Library: d:\projects\nwire\client\v1-0b1\aiconcd.pbl
Date: 7 6 95   Time: 11:03:20

Retrieve: PBSELECT(TABLE(NAME="work_order_documents" )
    UMN(NAME="work_order_documents.number") COLUMN(NAME="work_order_documents.document")
    UMN(NAME "work_order_documents.seq_no")WHERE( EXP1 ="( (
  ~"work_order_documents~".~"number~"" OP ="=" EXP2 ":wo_number ) )" ) ) ARG(NAME   "wo_number"
  TYPE   number)
Arguments: wo_number
Update Table: work_order_documents
Filter: None
Sort: None
Sparse: None
Column: number
    Updateable:  Yes
    Key:  Yes
    Format: "[general]"
    Border style: None
    Validation: None
    Validation Message: None
    Tab Sequence: 10
    Initial Value: None
    Edit Style: Edit
    Edit limit: 10
Column: document
    Updateable:  Yes
    Key:  Yes
    Format: "[general]"
    Border style: None
    Validation: None
    Validation Message: None
    Tab Sequence: 20
    Initial Value: None
    Edit Style: Edit
    Edit limit: 10
Column: seq_no
    Updateable:  Yes
    Key:  Yes
    Format: "[general]"
    Border style: None
    Validation: None
    Validation Message: None
    Tab Sequence: 0
    Initial Value: None
    Edit Style: Edit
    Edit limit: 0
```

DataWindow: d_export_w Page: [illegible]
Library: d:\projects\nwire\client\v1 0b1\aiconcd.pbl
Date: [illegible] Time: [illegible]

Header

| | |
|---|---|
| Number: | number |
| Customer id: | customer_id |
| Job Number: | job_number |
| Wo Date: | wo_date |
| Time In: | time_in |
| Due Cust Day: | due_ |
| Due Cust Date: | due_cust_date |
| Due Cust Time: | due_cust_tir |
| Due Vend Day: | due_ |
| Due Vend Date: | due_vend_date |
| Due Vend Time: | due_vend_tir |
| Production Approval: | production_approval |
| Pager Phone: | pager_phone |
| Media Format: | media_format |
| Proof Required: | pr |
| Ordered By: | ordered_by |
| Job Type: | job_type |
| Transmitted: | tra |
| Wo Type: | wo_type |
| Job Name: | job_name |
| Account: | account |
| Telephone: | telephone |
| Message: | message |
| Instructions: | instructions |
| Deliver To: | deliver_to |
| Originals: | originals |
| Sets: | sets |
| Impressions: | impressions |

| | |
|---|---|
| Page Numbering: | pa |
| Num Font Size: | num_font_size |
| Tabs Numbered: | tal |
| Num Location: | nun |
| Mirror: | mi |
| Pg Num Orientation: | pg_num_orient |
| Start Page: | start_page |
| Start Number: | start_number |
| Covers: | co |
| Provided: | prc |
| Front Back Same: | fro |
| Front Text Side1: | fro |
| Front Text Side2: | fro |
| Back Text Side1: | ba |
| Back Text Side2: | ba |
| Page Level Color: | page_level_col |
| Page Level Weight: | page_level_wei |
| Page Level Size: | page_level_size |
| Page Level Brand: | page_level_bra |
| Front Color: | front_color |
| Front Weight: | front_weight |
| Front Size: | front_size |
| Front Brand: | front_brand |
| Back Color: | back_color |
| Back Weight: | back_weight |
| Back Size: | back_size |
| Back Brand: | back_brand |
| Tabs Color: | tabs_color |

| | |
|---|---|
| Tabs Provided: | tat |
| Inserts: | ins |
| Inserts Instructions: | ins |
| Input Orientation: | input_orientatio |
| Output Orientation: | output_orientati |
| Orientation Instr: | ori |
| Scalable: | sca |
| Reduction Percent: | reduction_perce |
| Enlarge Percent: | enlarge_percen |
| Scale Instructions: | sc |
| Crop: | cro |
| Window: | wi |
| Image Shift: | im |
| Merge: | me |
| Finishing: | finishing |
| Inhouse: | inhouse |
| Color Specifications: | color_specifications |
| Explanations: | explanations |
| Image Shifhtx: | image_shifhtx |
| Image Shifty: | image_shifty |
| Center Image: | ce |
| Primary Software: | primary_software |

Datawindow: d_output_w? Page: 1
Library: d:\projects\nwire\client\v1-0b1\arconcd.pbl
Date: 7 ? 95 Time: ? :??:22

[redacted]

```
COLUMN(NAME="work_order.scale_instructions") COLUMN(NAME="work_order.crop")
COLUMN(NAME="work_order.window") COLUMN(NAME="work_order.image_shift")
COLUMN(NAME="work_order.merge") COLUMN(NAME="work_order.finishing")
COLUMN(NAME="work_order.inhouse") COLUMN(NAME="work_order.color_specifications")
COLUMN(NAME="work_order.explanations") COLUMN(NAME="work_order.image_shifhtx")
COLUMN(NAME="work_order.image_shifty") COLUMN(NAME="work_order.center_image")
COLUMN(NAME="work_order.primary_software"))
Arguments: None
Update Table: work_order
Filter: None
Sort: None
Sparse: None
Column: number
    Updateable: Yes
    Key: Yes
    Format: "[general]"
    Border style: Shadow Box
    Validation: None
    Validation Message: None
    Tab Sequence: 10
    Initial Value: None
    Edit Style: Edit
    Edit limit: 0
Column: customer_id
    Updateable: Yes
    Key: Yes
    Format: "[general]"
    Border style: Shadow Box
    Validation: None
    Validation Message: None
    Tab Sequence: 20
    Initial Value: None
    Edit Style: Edit
    Edit limit: 15
Column: job_number
    Updateable: Yes
    Key: No
    Format: "[general]"
    Border style: Shadow Box
    Validation: None
    Validation Message: None
    Tab Sequence: 30
    Initial Value: None
    Edit Style: Edit
    Edit limit: 0
Column: wo_date
    Updateable: Yes
    Key: No
    Format: "[general]"
    Border style: Shadow Box
    Validation: None
    Validation Message: None
```

176

```
DataWindow: d_export_wo                                                      Page: 3
Library: d:\projects\nwire\client\v1-0b1\atconcd.pbl
Date: 7-6-95    Time: 11:03:22

    Tab Sequence: 40
    Initial Value: None
    Edit Style: Edit
    Edit limit: 0
Column: time_in
    Updateable:  Yes
    Key:  No
    Format: "[time]"
    Border style: Shadow Box
    Validation: None
    Validation Message: None
    Tab Sequence: 50
    Initial Value: None
    Edit Style: Edit
    Edit limit: 0
Column: due_cust_day
    Updateable:  Yes
    Key:  No
    Format: "[general]"
    Border style: Shadow Box
    Validation: None
    Validation Message: None
    Tab Sequence: 60
    Initial Value: None
    Edit Style: Edit
    Edit limit: 3
Column: due_cust_date
    Updateable:  Yes
    Key:  No
    Format: "[general]"
    Border style: Shadow Box
    Validation: None
    Validation Message: None
    Tab Sequence: 70
    Initial Value: None
    Edit Style: Edit
    Edit limit: 0
Column: due_cust_time
    Updateable:  Yes
    Key:  No
    Format: "[time]"
    Border style: Shadow Box
    Validation: None
    Validation Message: None
    Tab Sequence: 80
    Initial Value: None
    Edit Style: Edit
    Edit limit: 0
Column: due_vend_day
    Updateable:  Yes
    Key:  No
    Format: "[general]"
    Border style: Shadow Box
```

```
    Validation: None
    Validation Message: None
    Tab Sequence: 90
    Initial Value: None
    Edit Style: Edit
    Edit limit: 3
Column: due_vend_date
    Updateable: Yes
    Key: No
    Format: "[general]"
    Border style: Shadow Box
    Validation: None
    Validation Message: None
    Tab Sequence: 100
    Initial Value: None
    Edit Style: Edit
    Edit limit: 0
Column: due_vend_time
    Updateable: Yes
    Key: No
    Format: "[time]"
    Border style: Shadow Box
    Validation: None
    Validation Message: None
    Tab Sequence: 110
    Initial Value: None
    Edit Style: Edit
    Edit limit: 0
Column: production_approval
    Updateable: Yes
    Key: No
    Format: "[general]"
    Border style: Shadow Box
    Validation: None
    Validation Message: None
    Tab Sequence: 120
    Initial Value: None
    Edit Style: Edit
    Edit limit: 25
Column: pager_phone
    Updateable: Yes
    Key: No
    Format: "[general]"
    Border style: Shadow Box
    Validation: None
    Validation Message: None
    Tab Sequence: 130
    Initial Value: None
    Edit Style: Edit
    Edit limit: 20
Column: media_format
    Updateable: Yes
    Key: No
```

```
DataWindow: d_export_wo                                              Page: 1
Library: d:\projects\nwire\client\v1.0b1\aiconcd.pbl
Date: 7/6/95   Time: 11:03:22

    Format: "[general]"
    Border style: Shadow Box
    Validation: None
    Validation Message: None
    Tab Sequence: 140
    Initial Value: None
    Edit Style: Edit
    Edit limit: 0
Column: proof_required
    Updateable:  Yes
    Key:  No
    Format: "[general]"
    Border style: Shadow Box
    Validation: None
    Validation Message: None
    Tab Sequence: 150
    Initial Value: None
    Edit Style: Edit
    Edit limit: 1
Column: ordered_by
    Updateable:  Yes
    Key:  No
    Format: "[general]"
    Border style: Shadow Box
    Validation: None
    Validation Message: None
    Tab Sequence: 160
    Initial Value: None
    Edit Style: Edit
    Edit limit: 128
Column: job_type
    Updateable:  Yes
    Key:  No
    Format: "[general]"
    Border style: Shadow Box
    Validation: None
    Validation Message: None
    Tab Sequence: 170
    Initial Value: None
    Edit Style: Edit
    Edit limit: 0
Column: transmitted
    Updateable:  Yes
    Key:  No
    Format: "[general]"
    Border style: Shadow Box
    Validation: None
    Validation Message: None
    Tab Sequence: 180
    Initial Value: None
    Edit Style: Edit
    Edit limit: 1
Column: wo_type
```

```
DataWindow: d_export_wc                                              Page: 4
Library: d:\projects\nwire\client\v1-0b1\aiconcd.pbl
Date: 7/6/96    Time: 11:03:22

    Updateable:  Yes
    Key:  No
    Format: "[general]"
    Border style: Shadow Box
    Validation: None
    Validation Message: None
    Tab Sequence: 190
    Initial Value: None
    Edit Style: Edit
    Edit limit: 0
Column: job_name
    Updateable:  Yes
    Key:  No
    Format: "[general]"
    Border style: Shadow Box
    Validation: None
    Validation Message: None
    Tab Sequence: 200
    Initial Value: None
    Edit Style: Edit
    Edit limit: 128
Column: account
    Updateable:  Yes
    Key:  No
    Format: "[general]"
    Border style: Shadow Box
    Validation: None
    Validation Message: None
    Tab Sequence: 210
    Initial Value: None
    Edit Style: Edit
    Edit limit: 30
Column: telephone
    Updateable:  Yes
    Key:  No
    Format: "[general]"
    Border style: Shadow Box
    Validation: None
    Validation Message: None
    Tab Sequence: 220
    Initial Value: None
    Edit Style: Edit
    Edit limit: 20
Column: message
    Updateable:  Yes
    Key:  No
    Format: "[general]"
    Border style: Shadow Box
    Validation: None
    Validation Message: None
    Tab Sequence: 230
    Initial Value: None
    Edit Style: Edit
```

```
DataWindow: d_export_wc                                         Page: 7
Library: d:\projects\nwire\client\v1 0b1\aiconcd.pbl
Date: 7/6/95    Time: 11:03:22

    Edit limit: 128
    Tag: instructions
    Updateable:  Yes
    Key:  No
    Format: "[general]"
    Border style: Shadow Box
    Validation: None
    Validation Message: None
    Tab Sequence: 240
    Initial Value: None
    Edit Style: Edit
    Edit limit: 250
Column: deliver_to
    Updateable:  Yes
    Key:  No
    Format: "[general]"
    Border style: Shadow Box
    Validation: None
    Validation Message: None
    Tab Sequence: 250
    Initial Value: None
    Edit Style: Edit
    Edit limit: 128
Column: originals
    Updateable:  Yes
    Key:  No
    Format: "[general]"
    Border style: Shadow Box
    Validation: None
    Validation Message: None
    Tab Sequence: 260
    Initial Value: None
    Edit Style: Edit
    Edit limit: 0
Column: sets
    Updateable:  Yes
    Key:  No
    Format: "[general]"
    Border style: Shadow Box
    Validation: None
    Validation Message: None
    Tab Sequence: 270
    Initial Value: None
    Edit Style: Edit
    Edit limit: 0
Column: impressions
    Updateable:  Yes
    Key:  No
    Format: "[general]"
    Border style: Shadow Box
    Validation: None
    Validation Message: None
    Tab Sequence: 280
```

```
DataWindow: d_export_wc                                        Page: 8
Library: d:\projects\nwire\client\v1-0b1\aiconcd.pbl
Date: 7/6/95   Time: 11:03:22

    Initial Value: None
    Edit Style: Edit
    Edit limit: 0
Column: input_output
    Updateable:  Yes
    Key:  No
    Format: "[general]"
    Border style: Shadow Box
    Validation: None
    Validation Message: None
    Tab Sequence: 290
    Initial Value: None
    Edit Style: Edit
    Edit limit: 0
Column: collated
    Updateable:  Yes
    Key:  No
    Format: "[general]"
    Border style: Shadow Box
    Validation: None
    Validation Message: None
    Tab Sequence: 300
    Initial Value: None
    Edit Style: Edit
    Edit limit: 0
Column: page_numbering
    Updateable:  Yes
    Key:  No
    Format: "[general]"
    Border style: Shadow Box
    Validation: None
    Validation Message: None
    Tab Sequence: 310
    Initial Value: None
    Edit Style: Edit
    Edit limit: 1
Column: num_font_size
    Updateable:  Yes
    Key:  No
    Format: "[general]"
    Border style: Shadow Box
    Validation: None
    Validation Message: None
    Tab Sequence: 320
    Initial Value: None
    Edit Style: Edit
    Edit limit: 0
    mn: tabs_numbered
    Updateable:  Yes
    Key:  No
    Format: "[general]"
    Border style: Shadow Box
    Validation: None
```

182

```
DataWindow: d_export_wo                                        Page 9
Library: d:\projects\nwire\client\v1-0bl\aiconcd.pbl
Date: 7/6/95   Time: 11:03:22

    Validation Message: None
    Tab Sequence: 330
    Initial Value: None
    Edit Style: Edit
    Edit limit: 1
Column: num_location
    Updateable:  Yes
    Key:  No
    Format: "[general]"
    Border style: Shadow Box
    Validation: None
    Validation Message: None
    Tab Sequence: 340
    Initial Value: None
    Edit Style: Edit
    Edit limit: 2
Column: mirror
    Updateable:  Yes
    Key:  No
    Format: "[general]"
    Border style: Shadow Box
    Validation: None
    Validation Message: None
    Tab Sequence: 350
    Initial Value: None
    Edit Style: Edit
    Edit limit: 1
Column: pg_num_orientation
    Updateable:  Yes
    Key:  No
    Format: "[general]"
    Border style: Shadow Box
    Validation: None
    Validation Message: None
    Tab Sequence: 360
    Initial Value: None
    Edit Style: Edit
    Edit limit: 0
Column: start_page
    Updateable:  Yes
    Key:  No
    Format: "[general]"
    Border style: Shadow Box
    Validation: None
    Validation Message: None
    Tab Sequence: 370
    Initial Value: None
    Edit Style: Edit
    Edit limit: 0
Column: start_number
    Updateable:  Yes
    Key:  No
    Format: "[general]"
```

```
    Border style: Shadow Box
    Validation: None
    Validation Message: None
    Tab Sequence: 380
    Initial Value: None
    Edit Style: Edit
    Edit limit: 0
Column: covers
    Updateable:  Yes
    Key:  No
    Format: "[general]"
    Border style: Shadow Box
    Validation: None
    Validation Message: None
    Tab Sequence: 390
    Initial Value: None
    Edit Style: Edit
    Edit limit: 1
Column: provided
    Updateable:  Yes
    Key:  No
    Format: "[general]"
    Border style: Shadow Box
    Validation: None
    Validation Message: None
    Tab Sequence: 400
    Initial Value: None
    Edit Style: Edit
    Edit limit: 1
Column: front_back_same
    Updateable:  Yes
    Key:  No
    Format: "[general]"
    Border style: Shadow Box
    Validation: None
    Validation Message: None
    Tab Sequence: 410
    Initial Value: None
    Edit Style: Edit
    Edit limit: 1
Column: front_text_side1
    Updateable:  Yes
    Key:  No
    Format: "[general]"
    Border style: Shadow Box
    Validation: None
    Validation Message: None
    Tab Sequence: 420
    Initial Value: None
    Edit Style: Edit
    Edit limit: 1
Column: front_text_side2
    Updateable:  Yes
```

```
DataWindow: d_export_wo                                                    Page: 11
Library: d:\projects\nwire\client\v1-0b1\aiconcd.pbl
Date: 7/6/95    Time: 11:07:22

    Key:  No
    Format: "[general]"
    Border style: Shadow Box
    Validation: None
    Validation Message: None
    Tab Sequence: 430
    Initial Value: None
    Edit Style: Edit
    Edit limit: 1
Column: back_text_side1
    Updateable:  Yes
    Key:  No
    Format: "[general]"
    Border style: Shadow Box
    Validation: None
    Validation Message: None
    Tab Sequence: 440
    Initial Value: None
    Edit Style: Edit
    Edit limit: 1
Column: back_text_side2
    Updateable:  Yes
    Key:  No
    Format: "[general]"
    Border style: Shadow Box
    Validation: None
    Validation Message: None
    Tab Sequence: 450
    Initial Value: None
    Edit Style: Edit
    Edit limit: 1
Column: page_level_color
    Updateable:  Yes
    Key:  No
    Format: "[general]"
    Border style: Shadow Box
    Validation: None
    Validation Message: None
    Tab Sequence: 460
    Initial Value: None
    Edit Style: Edit
    Edit limit: 0
Column: page_level_weight
    Updateable:  Yes
    Key:  No
    Format: "[general]"
    Border style: Shadow Box
    Validation: None
    Validation Message: None
    Tab Sequence: 470
    Initial Value: None
    Edit Style: Edit
    Edit limit: 0
```

```
DataWindow: d_export_wo                                         Page: 12
Library: d:\projects\nwire\client\v1-0b1\aiconcd.pbl
Date: ?/6/95    Time: 11:0?:??

Column: page_level_size
    Updateable:  Yes
    Key:  No
    Format: "[general]"
    Border style: Shadow Box
    Validation: None
    Validation Message: None
    Tab Sequence: 480
    Initial Value: None
    Edit Style: Edit
    Edit limit: 0
Column: page_level_brand
    Updateable:  Yes
    Key:  No
    Format: "[general]"
    Border style: Shadow Box
    Validation: None
    Validation Message: None
    Tab Sequence: 490
    Initial Value: None
    Edit Style: Edit
    Edit limit: 0
Column: front_color
    Updateable:  Yes
    Key:  No
    Format: "[general]"
    Border style: Shadow Box
    Validation: None
    Validation Message: None
    Tab Sequence: 500
    Initial Value: None
    Edit Style: Edit
    Edit limit: 0
Column: front_weight
    Updateable:  Yes
    Key:  No
    Format: "[general]"
    Border style: Shadow Box
    Validation: None
    Validation Message: None
    Tab Sequence: 510
    Initial Value: None
    Edit Style: Edit
    Edit limit: 0
Column: front_size
    Updateable:  Yes
    Key:  No
    Format: "[general]"
    Border style: Shadow Box
    Validation: None
    Validation Message: None
    Tab Sequence: 520
    Initial Value: None
```

```
DataWindow: d_export_wc                                                Page: 17
Library: d:\projects\nw\...\client\v1-0b1\aironed.pbl
Date:          Time: 11:03:11

    Edit Style: Edit
    Edit limit: 0
Column: front_brand
    Updateable:  Yes
    Key:  No
    Format: "[general]"
    Border style: Shadow Box
    Validation: None
    Validation Message: None
    Tab Sequence: 530
    Initial Value: None
    Edit Style: Edit
    Edit limit: 0
Column: back_color
    Updateable:  Yes
    Key:  No
    Format: "[general]"
    Border style: Shadow Box
    Validation: None
    Validation Message: None
    Tab Sequence: 540
    Initial Value: None
    Edit Style: Edit
    Edit limit: 0
Column: back_weight
    Updateable:  Yes
    Key:  No
    Format: "[general]"
    Border style: Shadow Box
    Validation: None
    Validation Message: None
    Tab Sequence: 550
    Initial Value: None
    Edit Style: Edit
    Edit limit: 0
Column: back_size
    Updateable:  Yes
    Key:  No
    Format: "[general]"
    Border style: Shadow Box
    Validation: None
    Validation Message: None
    Tab Sequence: 560
    Initial Value: None
    Edit Style: Edit
    Edit limit: 0
Column: back_brand
    Updateable:  Yes
    Key:  No
    Format: "[general]"
    Border style: Shadow Box
    Validation: None
    Validation Message: None
```

187

```
    Tab Sequence: 570
    Initial Value: None
    Edit Style: Edit
    Edit limit: 0
Column: tabs_color
    Updateable:  Yes
    Key:  No
    Format: "[general]"
    Border style: Shadow Box
    Validation: None
    Validation Message: None
    Tab Sequence: 580
    Initial Value: None
    Edit Style: Edit
    Edit limit: 0
Column: tabs_bank_num
    Updateable:  Yes
    Key:  No
    Format: "[general]"
    Border style: Shadow Box
    Validation: None
    Validation Message: None
    Tab Sequence: 590
    Initial Value: None
    Edit Style: Edit
    Edit limit: 0
Column: tabs_printed
    Updateable:  Yes
    Key:  No
    Format: "[general]"
    Border style: Shadow Box
    Validation: None
    Validation Message: None
    Tab Sequence: 600
    Initial Value: None
    Edit Style: Edit
    Edit limit: 1
Column: tabs_provided
    Updateable:  Yes
    Key:  No
    Format: "[general]"
    Border style: Shadow Box
    Validation: None
    Validation Message: None
    Tab Sequence: 610
    Initial Value: None
    Edit Style: Edit
    Edit limit: 1
Column: inserts
    Updateable:  Yes
    Key:  No
    Format: "[general]"
    Border style: Shadow Box
```

```
    Validation: None
    Validation Message: None
    Tab Sequence: 620
    Initial Value: None
    Edit Style: Edit
    Edit limit: 1
Column: inserts_instructions
    Updateable:  Yes
    Key:  No
    Format: "[general]"
    Border style: Shadow Box
    Validation: None
    Validation Message: None
    Tab Sequence: 630
    Initial Value: None
    Edit Style: Edit
    Edit limit: 1
Column: input_orientation
    Updateable:  Yes
    Key:  No
    Format: "[general]"
    Border style: Shadow Box
    Validation: None
    Validation Message: None
    Tab Sequence: 640
    Initial Value: None
    Edit Style: Edit
    Edit limit: 0
Column: output_orientation
    Updateable:  Yes
    Key:  No
    Format: "[general]"
    Border style: Shadow Box
    Validation: None
    Validation Message: None
    Tab Sequence: 650
    Initial Value: None
    Edit Style: Edit
    Edit limit: 0
Column: orientation_instr
    Updateable:  Yes
    Key:  No
    Format: "[general]"
    Border style: Shadow Box
    Validation: None
    Validation Message: None
    Tab Sequence: 660
    Initial Value: None
    Edit Style: Edit
    Edit limit: 1
Column: scalable
    Updateable:  Yes
    Key:  No
```

```
DataWindow: d_expert_wt                                                    Page: 16
Library: d:\projects\rwfire\client v1-0b1\aiconcd.pbl
Date: 7-6-95    Time: 11:03:11

    Format: "[general]"
    Border style: Shadow Box
    Validation: None
    Validation Message: None
    Tab Sequence: 670
    Initial Value: None
    Edit Style: Edit
    Edit limit: 1
Column: reduction_percent
    Updateable:  Yes
    Key:  No
    Format: "[general]"
    Border style: Shadow Box
    Validation: None
    Validation Message: None
    Tab Sequence: 680
    Initial Value: None
    Edit Style: Edit
    Edit limit: 0
Column: enlarge_percent
    Updateable:  Yes
    Key:  No
    Format: "[general]"
    Border style: Shadow Box
    Validation: None
    Validation Message: None
    Tab Sequence: 690
    Initial Value: None
    Edit Style: Edit
    Edit limit: 0
Column: scale_instructions
    Updateable:  Yes
    Key:  No
    Format: "[general]"
    Border style: Shadow Box
    Validation: None
    Validation Message: None
    Tab Sequence: 700
    Initial Value: None
    Edit Style: Edit
    Edit limit: 1
Column: crop
    Updateable:  Yes
    Key:  No
    Format: "[general]"
    Border style: Shadow Box
    Validation: None
    Validation Message: None
    Tab Sequence: 710
    Initial Value: None
    Edit Style: Edit
    Edit limit: 1
Column: window
```

```
DataWindow: d_export_w                                                    Page: 17
Library: d:\projects\nwire\client\v1-0b1\a.concd.pbl
Date: 7/6/95   Time: 11:03:22

    Updateable:  Yes
    Key:  No
    Format: "[general]"
    Border style: Shadow Box
    Validation: None
    Validation Message: None
    Tab Sequence: 720
    Initial Value: None
    Edit Style: Edit
    Edit limit: 1
Column: image_shift
    Updateable:  Yes
    Key:  No
    Format: "[general]"
    Border style: Shadow Box
    Validation: None
    Validation Message: None
    Tab Sequence: 730
    Initial Value: None
    Edit Style: Edit
    Edit limit: 1
Column: merge
    Updateable:  Yes
    Key:  No
    Format: "[general]"
    Border style: Shadow Box
    Validation: None
    Validation Message: None
    Tab Sequence: 740
    Initial Value: None
    Edit Style: Edit
    Edit limit: 1
Column: finishing
    Updateable:  Yes
    Key:  No
    Format: "[general]"
    Border style: Shadow Box
    Validation: None
    Validation Message: None
    Tab Sequence: 750
    Initial Value: None
    Edit Style: Edit
    Edit limit: 0
Column: inhouse
    Updateable:  Yes
    Key:  No
    Format: "[general]"
    Border style: Shadow Box
    Validation: None
    Validation Message: None
    Tab Sequence: 760
    Initial Value: None
    Edit Style: Edit
```

DataWindow: d_export_wr
Library: d:\projects\nwire\client\v1-0b1\aiconcd.pbl
Date: 7/8/95 Time: 11:0?:??

Page: 16

```
    Edit limit: 0
Column: color_specifications
    Updateable:  Yes
    Key:  No
    Format: "[general]"
    Border style: Shadow Box
    Validation: None
    Validation Message: None
    Tab Sequence: 770
    Initial Value: None
    Edit Style: Edit
    Edit limit: 40
Column: explanations
    Updateable:  Yes
    Key:  No
    Format: "[general]"
    Border style: Shadow Box
    Validation: None
    Validation Message: None
    Tab Sequence: 780
    Initial Value: None
    Edit Style: Edit
    Edit limit: 128
Column: image_shifhtx
    Updateable:  Yes
    Key:  No
    Format: "[general]"
    Border style: Shadow Box
    Validation: None
    Validation Message: None
    Tab Sequence: 790
    Initial Value: None
    Edit Style: Edit
    Edit limit: 0
Column: image_shifty
    Updateable:  Yes
    Key:  No
    Format: "[general]"
    Border style: Shadow Box
    Validation: None
    Validation Message: None
    Tab Sequence: 800
    Initial Value: None
    Edit Style: Edit
    Edit limit: 0
Column: center_image
    Updateable:  Yes
    Key:  No
    Format: "[general]"
    Border style: Shadow Box
    Validation: None
    Validation Message: None
    Tab Sequence: 810
```

```
DataWindow: d_export_wo                                                  Page: [illegible]
Library: d:\projects\nwire\client\v1-0b7\aiconcd.pbl
Date: 7/6/95   Time: 11:03:22

    Initial Value: None
    Edit Style: Edit
    Edit limit: 1
Column: primary_software
    Updateable: Yes
    Key: No
    Format: "[general]"
    Border style: Shadow Box
    Validation: None
    Validation Message: None
    Tab Sequence: 820
    Initial Value: None
    Edit Style: DropDownList
    Edit limit: 0
    Coded Values:
        "MS Word for Windows" to "MS Word for Windows"
        "MS Word for MAC" to "MS Word for MAC"
        "Quark / MAC" to "Quark / MAC"
        "MS Excel Windows" to "MS Excel Windows"
        "MS Excel MAC" to "MS Excel MAC"
        "Word Perfect" to "Word Perfect"
        "AMI Pro" to "AMI Pro"
        "PageMaker Windows" to "PageMaker Windows"
        "PageMaker MAC" to "PageMaker MAC"
```

DataWindow: d_grt_max_wo_number [illegible] Page [illegible]

Library: d:\projects\nwire client v1-0b1\alconcd.pbl

Date: [illegible] Time: [illegible]

Number

Header compute_0001 job_number

Detail

Summary

Footer

```
DataWindow: d_get_max_wo_number                                        Page: 1
Library: d:\projects\nwire\client\v1-0b1\aicond.pbl
Date: 7/6/95   Time: 11:03:36

Retrieve: PBSELECT(TABLE(NAME="work_order" ) COMPUTE(NAME="max(~"work_order~".~"number~")" )
COMPUTE(NAME="max(~"work_order~".~"job_number~")" ))
Arguments: None
Update Table: Not Allowed
Filter: None
Sort: None
Sparse: None
Column: compute_0001
    Format: "[general]"
    Border style: None
    Validation: None
    Validation Message: None
    Tab Sequence: 0
    Initial Value: None
    Edit Style: Edit
    Edit limit: 0
Column: job_number
    Format: "[general]"
    Border style: None
    Validation: None
    Validation Message: None
    Tab Sequence: 0
    Initial Value: None
    Edit Style: Edit
    Edit limit: 0
```

DataWindow: d_iter Page: 1
Library: d:\projects\nwire\client\v1-0b1\aiconcd.pbl
Date: [illegible]/6/95 Time: 11:03:36
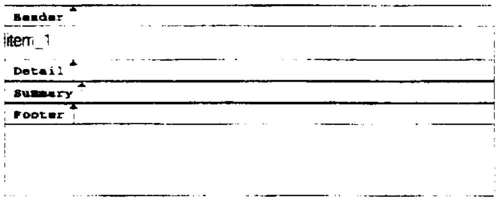

```
Datawindow: d_item
Library: d:\projects\nwire\client\v1.0b1\aiconcd.pbl
Date: 7/6/95   Time: 11:03:36
                                                         Page: 1

Retrieve: Script
   Arguments: None
Update Table: Not Allowed
Filter: None
Sort: None
Sparse: None
Column: item_1
    Format: "[general]"
    Border style: None
    Validation: None
    Validation Message: None
    Tab Sequence: 0
    Initial Value: None
    Edit Style: Edit
    Edit limit: 0
```

DataWindow: d_job_ticket_ Page: 1
Library: d:\projects\nwire\client\v1 0b2\aiconcd.pbl
Date: [illegible]/6/95 Time: 11:03:37
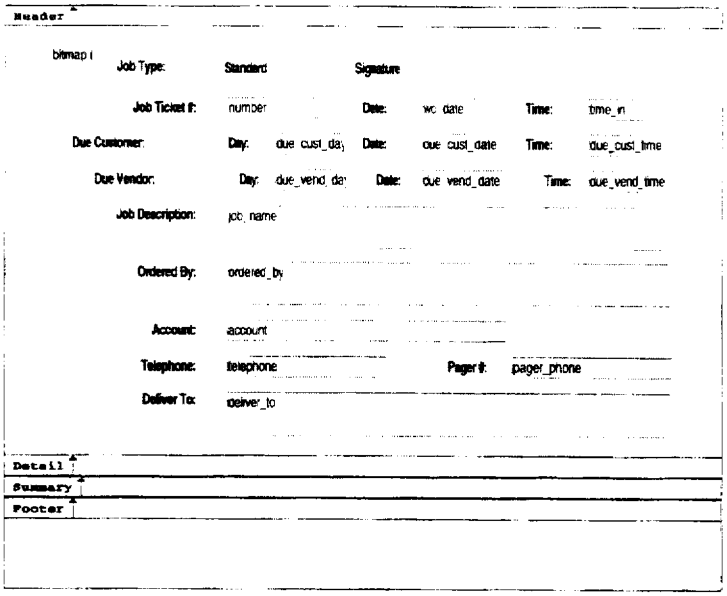

```
DataWindow: d_wo_ticket_                                                Page: 1
Library: c:\projects\nwire\...\v1-0\...\aiconce.pbl
Date: ...    Time: ...

[redacted]
   UMN(NAME "work_order.scale_instructions") COLUMN(NAME="work_order.crop")
   UMN(NAME="work_order.window") COLUMN(NAME="work_order.image_shift")
 COLUMN(NAME="work_order.merge") COLUMN(NAME="work_order.finishing")
 COLUMN(NAME="work_order.inhouse") COLUMN(NAME="work_order.color_specifications")
 COLUMN(NAME="work_order.explanations") COLUMN(NAME="work_order.image_shiftx")
 COLUMN(NAME="work_order.image_shifty") COLUMN(NAME="work_order.center_image")
 COLUMN(NAME="work_order.primary_software")WHERE( EXP1 ="~"work_order~".~"number~"" OP ="="
 EXP2 =":number" ) ) ARG(NAME = "number" TYPE = number)
Arguments: number
Update Table: work_order
Filter: None
Sort: None
Sparse: None
Column: wo_type
    Updateable:  Yes
    Key:  No
    Format: "[general]"
    Border style: None
    Validation: None
    Validation Message: None
    Tab Sequence: 90
    Initial Value: None
    Edit Style: Radio Buttons
    Coded Values:
        "Standard" to "1"
        "Signature" to "2"
Column: number
    Updateable:  Yes
    Key:  Yes
    Format: "[general]"
    Border style: Shadow Box
    Validation: None
    Validation Message: None
    Tab Sequence: 0
    Initial Value: None
    Edit Style: Edit
    Edit limit: 0
Column: wo_date
    Updateable:  Yes
    Key:  No
    Format: "[general]"
    Border style: Shadow Box
    Validation: None
    Validation Message: None
    Tab Sequence: 10
    Initial Value: None
    Edit Style: Edit
    Edit limit: 0
Column: time_in
    Updateable:  Yes
    Key:  No
    Format: "[time]"
```

```
DataWindow: d_jor_ticket_                                          Page: 3
Library: d:\projects\nwire\client v1-0b1\a_concd.pbl
Date: 7-6-95    Time: 11:03:07

    Border style: Shadow Box
    Validation: None
    Validation Message: None
    Tab Sequence: 20
    Initial Value: None
    Edit Style: Edit
    Edit limit: 0
Column: due_cust_day
    Updateable:  Yes
    Key:  No
    Format: "[general]"
    Border style: Shadow Box
    Validation: None
    Validation Message: None
    Tab Sequence: 30
    Initial Value: None
    Edit Style: DropDownList
    Coded Values:
        "Mon" to "MON"
        "Tue" to "TUE"
        "Wed" to "WED"
        "Thur" to "THU"
        "Fri" to "FRI"
        "Sat" to "SAT"
        "Sun" to "SUN"
Column: due_cust_date
    Updateable:  Yes
    Key:  No
    Format: "[general]"
    Border style: Shadow Box
    Validation: None
    Validation Message: None
    Tab Sequence: 40
    Initial Value: None
    Edit Style: Edit
    Edit limit: 0
Column: due_cust_time
    Updateable:  Yes
    Key:  No
    Format: "[time]"
    Border style: Shadow Box
    Validation: None
    Validation Message: None
    Tab Sequence: 50
    Initial Value: None
    Edit Style: DropDownList
    Coded Values:
        "6:00 AM" to "06:00:00"
        "6:30 AM" to "06:30:00"
        "7:00 AM" to "07:00:00"
        "7:30 AM" to "07:30:00"
        "8:00 AM" to "08:00:00"
        "8:30 AM" to "08:30:00"
```

200

```
DataWindow: d_pol_ticket_
Library: d:\projects\nwire\client\v1-0b1\aiconcd.pbl
Date: 7/5/95   Time: 1:03:37
```

```
        "9:00 AM" to "09:00:00"
        "9:30 AM" to "09:30:00"
        "10:00 AM" to "10:00:00"
        "11:00 AM" to "11:00:00"
        "12:00 Noon" to "12:00:00"
        "1:00 PM" to "13:00:00"
        "2:00 PM" to "14:00:00"
        "3:00 PM" to "15:00:00"
        "4:00 PM" to "16:00:00"
        "5:00 PM" to "17:00:00"
        "6:00 PM" to "18:00:00"
        "7:00 PM" to "19:00:00"
        "8:00 PM" to "20:00:00"
        "9:00 PM" to "21:00:00"
        "10:00 PM" to "22:00:00"
        "11:00 PM" to "23:00:00"
        "12:00 Midnight" to "24:00:00"
Column: due_vend_day
    Updateable:  Yes
    Key:  No
    Format: "[general]"
    Border style: Shadow Box
    Validation: None
    Validation Message: None
    Tab Sequence: 60
    Initial Value: None
    Edit Style: DropDownList
    Coded Values:
        "Mon" to "MON"
        "Tue" to "TUE"
        "Wed" to "WED"
        "Thur" to "THU"
        "Fri" to "FRI"
        "Sat" to "SAT"
        "Sun" to "SUN"
Column: due_vend_date
    Updateable:  Yes
    Key:  No
    Format: "[general]"
    Border style: Shadow Box
    Validation: None
    Validation Message: None
    Tab Sequence: 70
    Initial Value: None
    Edit Style: Edit
    Edit limit: 0
Column: due_vend_time
    Updateable:  Yes
    Key:  No
    Format: "[time]"
    Border style: Shadow Box
    Validation: None
    Validation Message: None
```

```
[illegible]                                                    Page: [illegible]
Library: d:\projects\nwire\client\v1-0b1\aicontd.pbl
Date: [illegible]  Time: 11:0[illegible]:37

    Tab Sequence: 80
    Initial Value: None
    Edit Style: DropDownList
    Coded Values:
        "6:00 AM" to "06:00:00"
        "6:30 AM" to "06:30:00"
        "7:00 AM" to "07:00:00"
        "7:30 AM" to "07:30:00"
        "8:00 AM" to "08:00:00"
        "8:30 AM" to "08:30:00"
        "9:00 AM" to "09:00:00"
        "9:30 AM" to "09:30:00"
        "10:00 AM" to "10:00:00"
        "11:00 AM" to "11:00:00"
        "12:00 Noon" to "12:00:00"
        "1:00 PM" to "13:00:00"
        "2:00 PM" to "14:00:00"
        "3:00 PM" to "15:00:00"
        "4:00 PM" to "16:00:00"
        "5:00 PM" to "17:00:00"
        "6:00 PM" to "18:00:00"
        "7:00 PM" to "19:00:00"
        "8:00 PM" to "20:00:00"
        "9:00 PM" to "21:00:00"
        "10:00 PM" to "22:00:00"
        "11:00 PM" to "23:00:00"
        "12:00 Midnight" to "24:00:00"
Column: job_name
    Updateable:  Yes
    Key:  No
    Format: "[general]"
    Border style: Shadow Box
    Validation: None
    Validation Message: None
    Tab Sequence: 100
    Initial Value: None
    Edit Style: Edit
    Edit limit: 0
Column: ordered_by
    Updateable:  Yes
    Key:  No
    Format: "[general]"
    Border style: Shadow Box
    Validation: None
    Validation Message: None
    Tab Sequence: 110
    Initial Value: None
    Edit Style: Edit
    Edit limit: 0
Column: account
    Updateable:  Yes
    Key:  No
    Format: "[general]"
```

202

```
DataWindow: d_job_ticket_
Library: d:\projects\nwire\client\v1-0b\aiconcd.pbl
Date: 7/6/95   Time: 11:03:37
```

```
    Border style: Shadow Box
    Validation: None
    Validation Message: None
    Tab Sequence: 120
    Initial Value: None
    Edit Style: Edit
    Edit limit: 0
Column: telephone
    Updateable:  Yes
    Key:  No
    Format: "[general]"
    Border style: Shadow Box
    Validation: None
    Validation Message: None
    Tab Sequence: 130
    Initial Value: None
    Edit Style: Edit
    Edit limit: 0
Column: pager_phone
    Updateable:  Yes
    Key:  No
    Format: "[general]"
    Border style: Shadow Box
    Validation: None
    Validation Message: None
    Tab Sequence: 140
    Initial Value: None
    Edit Style: Edit
    Edit limit: 0
Column: deliver_to
    Updateable:  Yes
    Key:  No
    Format: "[general]"
    Border style: Shadow Box
    Validation: None
    Validation Message: None
    Tab Sequence: 150
    Initial Value: None
    Edit Style: Edit
    Edit limit: 0
Computed Field: bitmap (if(  wo_type  = 1, 'standard.bmp','signatur.bmp'))
    Format: "[GENERAL]"
    Border style: None
```

DataWindow: d_[illegible]_general Page: 1
Library: d:\projects\nwire\client\v1-0b1\a[illegible].pbl
Date: [illegible] Time: 11:0[illegible]:4[illegible]
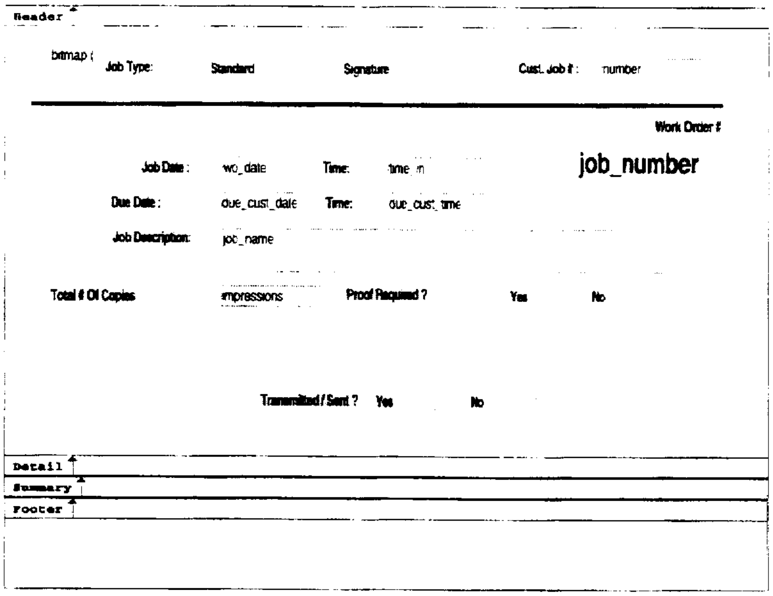

```
DataWindow: d_job_ticket_general                                        Page: 1
Library: d:\projects\nwire\client\v1-0b1\aiconcd.pbl
Date: 7/6/95   Time: 11:03:45

  UMN(NAME="work_order.scale_instructions") COLUMN(NAME="work_order.crop")
  UMN(NAME="work_order.window") COLUMN(NAME="work_order.image_shift")
 COLUMN(NAME="work_order.merge") COLUMN(NAME="work_order.finishing")
 COLUMN(NAME="work_order.inhouse") COLUMN(NAME="work_order.color_specifications")
 COLUMN(NAME="work_order.explanations") COLUMN(NAME="work_order.image_shifhtx")
 COLUMN(NAME="work_order.image_shifty") COLUMN(NAME="work_order.center_image")
 COLUMN(NAME="work_order.primary_software")WHERE( EXP1 ="~"work_order~".~"job_number~"" OP ="="
 EXP2 =":job_number" ) ) ARG(NAME = "job_number" TYPE = number)
Arguments: job_number
Update Table: work_order
Filter: None
Sort: None
Sparse: None
Column: wo_type
    Updateable:  Yes
    Key:  No
    Format: "[general]"
    Border style: None
    Validation: None
    Validation Message: None
    Tab Sequence: 30
    Initial Value: None
    Edit Style: Radio Buttons
    Coded Values:
        "Standard" to "1"
        "Signature" to "2"
Column: impressions
    Updateable:  Yes
    Key:  No
    Format: "[general]"
    Border style: Shadow Box
    Validation: None
    Validation Message: None
    Tab Sequence: 50
    Initial Value: None
    Edit Style: Edit Mask
Column: proof_required
    Updateable:  Yes
    Key:  No
    Format: "[general]"
    Border style: None
    Validation: None
    Validation Message: None
    Tab Sequence: 60
    Initial Value: None
    Edit Style: Radio Buttons
    Coded Values:
        "Yes" to "Y"
        "No" to "N"
Column: transmitted
    Updateable:  Yes
    Key:  No
```

```
    Format: "[general]"
    Border style: None
    Validation: None
    Validation Message: None
    Tab Sequence: 70
    Initial Value: None
    Edit Style: Radio Buttons
    Coded Values:
        "Yes" to "Y"
        "No" to "N"
Column: job_name
    Updateable:  Yes
    Key:  No
    Format: "[general]"
    Border style: Shadow Box
    Validation: None
    Validation Message: None
    Tab Sequence: 40
    Initial Value: None
    Edit Style: Edit
    Edit limit: 0
Column: wo_date
    Updateable:  Yes
    Key:  No
    Format: "[general]"
    Border style: Shadow Box
    Validation: None
    Validation Message: None
    Tab Sequence: 0
    Initial Value: None
    Edit Style: Edit
    Edit limit: 0
Column: time_in
    Updateable:  Yes
    Key:  No
    Format: "h:mm AM/PM"
    Border style: Shadow Box
    Validation: None
    Validation Message: None
    Tab Sequence: 0
    Initial Value: None
    Edit Style: Edit
    Edit limit: 0
Column: due_cust_date
    Updateable:  Yes
    Key:  No
    Format: "[general]"
    Border style: Shadow Box
    Validation: None
    Validation Message: None
    Tab Sequence: 10
    Initial Value: None
    Edit Style: Edit
```

DataWindow: d_job_ticket_general
Library: d:\projects\nwire\client\v1-0b1\aiconcd.pbl
Date: 7/6/95 Time: 11:03:45

Page: 4

```
    Edit limit: 0
    mn: due_cust_time
    Updateable: Yes
    Key: No
    Format: "[time]"
    Border style: Shadow Box
    Validation: None
    Validation Message: None
    Tab Sequence: 20
    Initial Value: None
    Edit Style: DropDownList
    Coded Values:
        "6:00 AM" to "06:00:00"
        "6:30 AM" to "06:30:00"
        "7:00 AM" to "07:00:00"
        "7:30 AM" to "07:30:00"
        "8:00 AM" to "08:00:00"
        "8:30 AM" to "08:30:00"
        "9:00 AM" to "09:00:00"
        "9:30 AM" to "09:30:00"
        "10:00 AM" to "10:00:00"
        "10:30 AM" to "10:00:00"
        "11:00 AM" to "11:00:00"
        "11:30 AM" to "11:30:00"
        "12:00 PM" to "12:00:00"
        "12:30 PM" to "12:30:00"
        "1:00 PM" to "13:00:00"
        "1:30 PM" to "13:30:00"
        "2:00 PM" to "14:00:00"
        "2:30 PM" to "14:30:00"
        "3:00 PM" to "15:00:00"
        "3:30 PM" to "15:30:00"
        "4:00 PM" to "16:00:00"
        "4:30 PM" to "16:30:00"
        "5:00 PM" to "17:00:00"
        "5:30 PM" to "17:30:00"
        "6:00 PM" to "18:00:00"
        "6:30 PM" to "18:30:00"
        "7:00 PM" to "19:00:00"
        "7:30 PM" to "19:30:00"
        "8:00 PM" to "20:00:00"
        "8:30 PM" to "20:30:00"
        "9:00 PM" to "21:00:00"
        "9:30 PM" to "21:30:00"
        "10:00 PM" to "22:00:00"
        "11:00 PM" to "23:00:00"
        "11:30 PM" to "23:30:00"
        "12:00 AM" to "00:00:00"
Column: number
    Updateable: Yes
    Key: No
    Format: "[general]"
    Border style: Shadow Box
```

DataWindow: d_job_ticket_general Page: 5
Library: d:\projects\nwire\client\v1-0b1\aiconcd.pbl
Date: 7/6/95 Time: 11:03:45

```
    Validation: None
    Validation Message: None
    Tab Sequence: 0
    Initial Value: None
    Edit Style: Edit
    Edit limit: 0
Column: job_number
    Updateable:  Yes
    Key:  Yes
    Format: "[general]"
    Border style: None
    Validation: None
    Validation Message: None
    Tab Sequence: 0
    Initial Value: None
    Edit Style: Edit
    Edit limit: 0
Computed Field: bitmap (if(  wo_type  = 1, 'standard.bmp','signatur.bmp'))
    Format: "[GENERAL]"
    Border style: None
```

DataWindow: d_job_ticket_notes
Page: 1
Library: d:\projects\nwire\client\v1-0b1\aiconcd.pbl
Date: 7/6/95 Time: 11:05:52
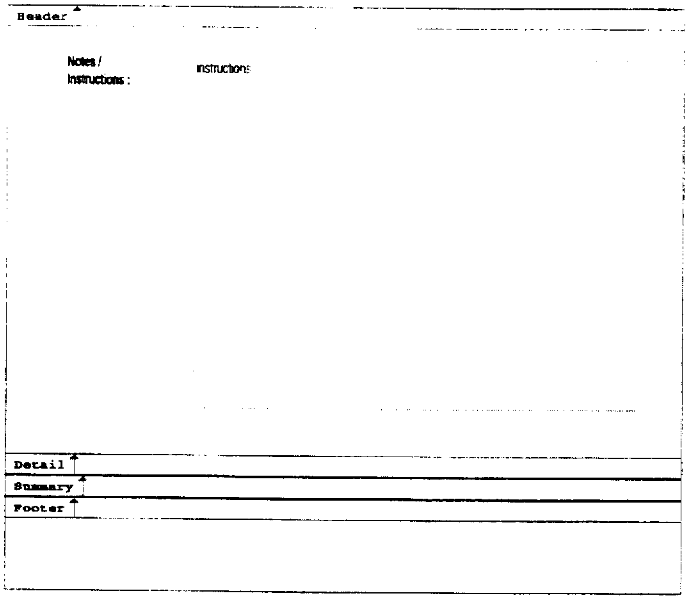

```
DataWindow: d_job_ticket_notes                                           Page: 1
Library: d:\projects\nwire\client\v1-0b1\aiconcd.pbl
Date: [illegible]   Time: 11:0[illegible]:51
```

[redacted]

```
 UMN(NAME="work_order.scale_instructions") COLUMN(NAME="work_order.crop")
 UMN(NAME="work_order.window") COLUMN(NAME="work_order.image_shift")
COLUMN(NAME="work_order.merge") COLUMN(NAME="work_order.finishing")
COLUMN(NAME="work_order.inhouse") COLUMN(NAME="work_order.color_specifications")
COLUMN(NAME="work_order.explanations") COLUMN(NAME "work_order.image_shifhtx")
COLUMN(NAME="work_order.image_shifty") COLUMN(NAME="work_order.center_image")
COLUMN(NAME="work_order.primary_software")WHERE( EXP1 ="~"work_order~".~"number~"" OP ="="
EXP2 =":number" ) ) ARG(NAME = "number" TYPE = number)
Arguments: number
Update Table: work_order
Filter: None
Sort: None
Sparse: None
Column: instructions
    Updateable:  Yes
    Key:  No
    Format: "[general]"
    Border style: Shadow Box
    Validation: None
    Validation Message: None
    Tab Sequence: 60
    Initial Value: None
    Edit Style: Edit
    Edit limit: 0
```

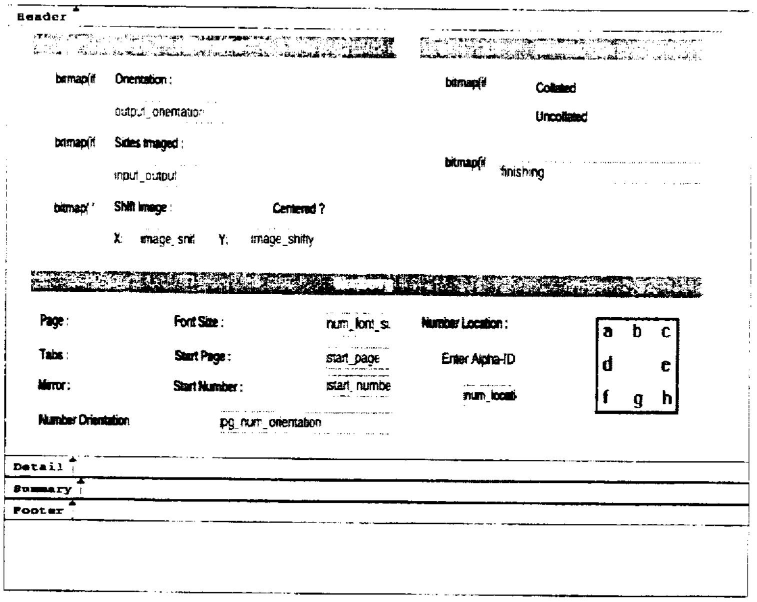
Header
Orientation :
output_orientation
Sides imaged :
input_output
Shift image :
Centered ?
X:
Y:
image_shifty
Collated
Uncollated
finishing
Page :
Font Size :
Number Location :
Tabs :
Start Page :
start_page
Enter Alpha-ID
Mirror :
Start Number :
Number Orientation
pg_num_orientation
a b c
d e
f g h
Detail
Summary
Footer

```
[illegible] c_[illegible]_page                                    Page: 1
Library: d:\projects\nwire\client\v1-0b1\aiconcd.pbl
Date: [illegible]   Time: 11:05:57
```

[redacted]

```
   [illegible]MN(NAME="work_order.scale_instructions") COLUMN(NAME="work_order.crop")
   [illegible]UMN(NAME="work_order.window") COLUMN(NAME="work_order.image_shift")
  COLUMN(NAME="work_order.merge") COLUMN(NAME="work_order.finishing")
  COLUMN(NAME="work_order.innouse") COLUMN(NAME="work_order.color_specifications")
  COLUMN(NAME="work_order.explanations") COLUMN(NAME="work_order.image_shifhtx")
  COLUMN(NAME="work_order.image_shifty") COLUMN(NAME="work_order.center_image")
  COLUMN(NAME="work_order.primary_software")WHERE( EXP1 ="~"work_order~".~"number~"" OP ="="
  EXP2 =":number" ) ) ARG(NAME = "number" TYPE = number)
Arguments: number
Update Table: work_order
Filter: None
Sort: None
Sparse: None
Column: output_orientation
    Updateable:  Yes
    Key:  No
    Format: "[general]"
    Border style: Shadow Box
    Validation: None
    Validation Message: None
    Tab Sequence: 10
    Initial Value: None
    Edit Style: DropDownList
    Coded Values:
        "Portrait" to "1"
        "Landscape" to "2"
Column: collated
    Updateable:  Yes
    Key:  No
    Format: "[general]"
    Border style: None
    Validation: None
    Validation Message: None
    Tab Sequence: 150
    Initial Value: None
    Edit Style: Radio Buttons
    Coded Values:
        "Collated" to "1"
        "Uncollated" to "0"
Column: input_output
    Updateable:  Yes
    Key:  No
    Format: "[general]"
    Border style: Shadow Box
    Validation: None
    Validation Message: None
    Tab Sequence: 20
    Initial Value: None
    Edit Style: DropDownList
    Coded Values:
        "1-Sided" to "1"
        "2 Sided" to "2"
```

212

```
DataWindow: d_job_ticket_page                                    Page: [illegible]
Library: d:\projects\nwire\client\v1-0b\aiconcd.pbl
Date: [illegible]/95   Time: [illegible]

            "Head-To-Toe" to "3"
    mn: image_shift
        Updateable:  Yes
        Key:  No
        Format: "[general]"
        Border style: None
        Validation: None
        Validation Message: None
        Tab Sequence: 30
        Initial Value: None
        Edit Style: Check Box
            Text: "Shift Image :"
            On value maps to "Y"
            Off value maps to "N"
Column: center_image
        Updateable:  Yes
        Key:  No
        Format: "[general]"
        Border style: None
        Validation: None
        Validation Message: None
        Tab Sequence: 40
        Initial Value: None
        Edit Style: Check Box
            Text: "Centered ?"
            On value maps to "Y"
            Off value maps to "N"
Column: finishing
        Updateable:  Yes
        Key:  No
        Format: "[general]"
        Border style: Shadow Box
        Validation: None
        Validation Message: None
        Tab Sequence: 160
        Initial Value: None
        Edit Style: DropDownList
        Coded Values:
            "No Finishing" to "1"
            "Portrait Staple" to "2"
            "Landscape Staple" to "3"
            "Dual Staple" to "4"
            "Bound" to "5"
            "Slip Sheets" to "6"
            "Velo" to "7"
            "GBC" to "8"
            "Perfect" to "9"
            "Thermal Bind" to "10"
            "Shrink Wrap" to "11"
            "Fold" to "12"
            "Wire Bound" to "13"
Column: image_shiftx
        Updateable:  Yes
```

```
[illegible]Window: d_pcr_[illegible]_page                              Page: [illegible]
Library: c:\projects\nwire\client\v1-0b1\aiconcd.pbl
Date: [illegible]   Time: [illegible]

    Key: No
    Format: "[general]"
    Border style: Shadow Box
    Validation: None
    Validation Message: None
    Tab Sequence: 50
    Initial Value: None
    Edit Style: Edit Mask
Column: image_shifty
    Updateable:  Yes
    Key:  No
    Format: "[general]"
    Border style: Shadow Box
    Validation: None
    Validation Message: None
    Tab Sequence: 60
    Initial Value: None
    Edit Style: Edit Mask
Column: page_numbering
    Updateable:  Yes
    Key:  No
    Format: "[general]"
    Border style: None
    Validation: None
    Validation Message: None
    Tab Sequence: 70
    Initial Value: None
    Edit Style: Check Box
        Text: "Page :"
        On value maps to "Y"
        Off value maps to "N"
Column: tabs_numbered
    Updateable:  Yes
    Key:  No
    Format: "[general]"
    Border style: None
    Validation: None
    Validation Message: None
    Tab Sequence: 90
    Initial Value: None
    Edit Style: Check Box
        Text: "Tabs :"
        On value maps to "Y"
        Off value maps to "N"
Column: mirror
    Updateable:  Yes
    Key:  No
    Format: "[general]"
    Border style: None
    Validation: None
    Validation Message: None
    Tab Sequence: 100
    Initial Value: None
```

```
DataWindow: d_job_ticket_page                                    Page: 1
Library: d:\projects\nwire\client\v1-0b1\aiconcd.pbl
Date: [illegible] '95    Time: 11:03:57

    Edit Style: Check Box
        Text: "Mirror :"
        On value maps to "Y"
        Off value maps to "N"
Column: start_number
    Updateable:  Yes
    Key:  No
    Format: "[general]"
    Border style: Shadow Box
    Validation: None
    Validation Message: None
    Tab Sequence: 120
    Initial Value: None
    Edit Style: Edit Mask
Column: pg_num_orientation
    Updateable:  Yes
    Key:  No
    Format: "[general]"
    Border style: Shadow Box
    Validation: None
    Validation Message: None
    Tab Sequence: 140
    Initial Value: None
    Edit Style: DropDownList
    Coded Values:
        "Portrait" to "1"
        "Landscape" to "2"
        "Mirrored Portrait" to "3"
        "Mirrored Landscape" to "4"
Column: start_page
    Updateable:  Yes
    Key:  No
    Format: "[general]"
    Border style: Shadow Box
    Validation: None
    Validation Message: None
    Tab Sequence: 110
    Initial Value: None
    Edit Style: Edit Mask
Column: num_location
    Updateable:  Yes
    Key:  No
    Format: "[general]"
    Border style: Shadow Box
    Validation: None
    Validation Message: None
    Tab Sequence: 130
    Initial Value: None
    Edit Style: DropDownList
    Coded Values:
        " a" to "a"
        " b" to "b"
        " c" to "c"
```

```
Datawindow: d_[illegible]_ticket_page                                    Page: [illegible]
Library: d:\projects\nwire\client\v1-0b1\aiconcd.pbl
Date: [illegible] 96   Time: 11:03:5[illegible]

        " d" to "d"
        " e" to "e"
        " f" to "f"
        " g" to "g"
        " h" to "h"
Column: num_font_size
    Updateable:  Yes
    Key:  No
    Format: "[general]"
    Border style: Shadow Box
    Validation: None
    Validation Message: None
    Tab Sequence: 80
    Initial Value: None
    Edit Style: Edit Mask
Computed Field: bitmap(if( output_orientation = 1, 'portrait.bmp','landscpe.bmp'))
    Format: "[GENERAL]"
    Border style: None
Computed Field: bitmap(if(  collated  = 1, 'collated.bmp','uncollat.bmp'))
    Format: "[GENERAL]"
    Border style: None
Computed Field: bitmap(if(  input_output  = 1, 'portrait.bmp', if(  input_output  = 2,
 '2sided.bmp','head_toe.bmp' )))
    Format: "[GENERAL]"
    Border style: None
Computed Field: bitmap( "ishift.bmp")
    Format: "[GENERAL]"
    Border style: None
Computed Field: bitmap(if( finishing = 1, 'nofinish.bmp', if( finishing = 2, 'port_stp.bmp',
 if( finishing = 3, 'land_stp.bmp',   if( finishing = 4, 'dual_stp.bmp',   if( finishing = 5,
 'bound.bmp', if( finishing = 6,  'slipshet.bmp',  'nofinish.bmp' )))))))
    Format: "[GENERAL]"
    Border style: None
```

DataWindow: d_job_ticket_special
Library: d:\projects\nwire\client\v1-0b1\aiconcd.pbl
Date: [illegible] Time: 11:04:05

Page: [illegible]

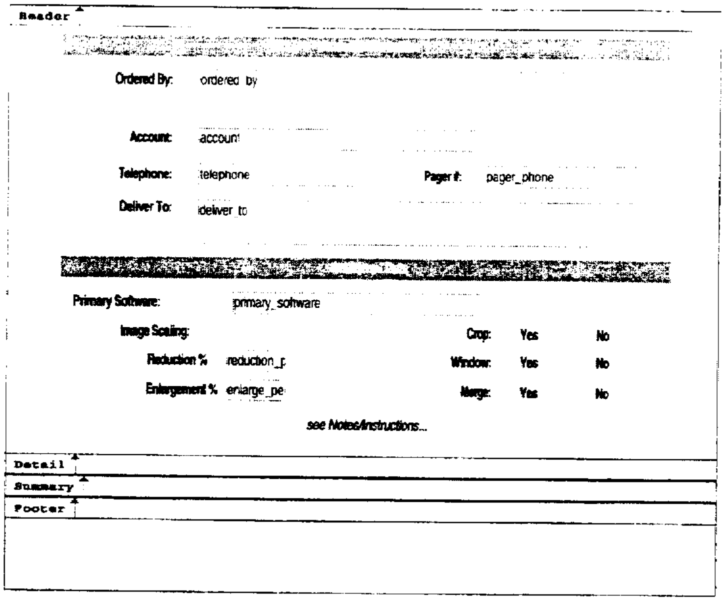

Header

Ordered By: ordered_by

Account: account

Telephone: telephone Pager #: pager_phone

Deliver To: deliver_to

Primary Software: primary_software

Image Scaling:

Reduction % reduction_p

Enlargement % enlarge_pe

Crop: Yes No

Window: Yes No

Merge: Yes No see Notes/Instructions...

Detail

Summary

Footer

```
DataWindow: d_job_ticket_special                                        Page: 2
Library: d:\projects\nwire\client\v1-0b1\aiconcd.pbl
Date: 7/6/95    Time: 11:04:05

[redacted]
    UMN(NAME="work_order.scale_instructions") COLUMN(NAME="work_order.crop")
    .UMN(NAME="work_order.window") COLUMN(NAME="work_order.image_shift")
 COLUMN(NAME="work_order.merge") COLUMN(NAME "work_order.finishing")
 COLUMN(NAME="work_order.inhouse") COLUMN(NAME="work_order.color_specifications")
 COLUMN(NAME="work_order.explanations") COLUMN(NAME="work_order.image_shifhtx")
 COLUMN(NAME="work_order.image_shifty") COLUMN(NAME="work_order.center_image")
 COLUMN(NAME="work_order.primary_software")WHERE( EXP1 ="~"work_order~".~"number~"" OP ="="
 EXP2 =":number" ) ) ARG(NAME = "number" TYPE = number)
Arguments: number
Update Table: work_order
Filter: None
Sort: None
Sparse: None
Column: ordered_by
    Updateable:  Yes
    Key:  No
    Format: "[general]"
    Border style: Shadow Box
    Validation: None
    Validation Message: None
    Tab Sequence: 10
    Initial Value: None
    Edit Style: Edit
    Edit limit: 0
Column: account
    Updateable:  Yes
    Key:  No
    Format: "[general]"
    Border style: Shadow Box
    Validation: None
    Validation Message: None
    Tab Sequence: 20
    Initial Value: None
    Edit Style: Edit
    Edit limit: 0
Column: telephone
    Updateable:  Yes
    Key:  No
    Format: "[general]"
    Border style: Shadow Box
    Validation: None
    Validation Message: None
    Tab Sequence: 30
    Initial Value: None
    Edit Style: Edit
    Edit limit: 0
    mn: pager_phone
    Updateable:  Yes
    Key:  No
    Format: "[general]"
    Border style: Shadow Box
    Validation: None
```

```
    Validation Message: None
    Tab Sequence: 40
    Initial Value: None
    Edit Style: Edit
    Edit limit: 0
Column: deliver_to
    Updateable:  Yes
    Key:  No
    Format: "[general]"
    Border style: Shadow Box
    Validation: None
    Validation Message: None
    Tab Sequence: 50
    Initial Value: None
    Edit Style: Edit
    Edit limit: 0
Column: primary_software
    Updateable:  Yes
    Key:  No
    Format: "[general]"
    Border style: Shadow Box
    Validation: None
    Validation Message: None
    Tab Sequence: 60
    Initial Value: None
    Edit Style: DropDownList
    Edit limit: 0
    Coded Values:
        "MS Word for Windows" to "MS Word for Windows"
        "MS Word for MAC" to "MS Word for MAC"
        "Quark / MAC" to "Quark / MAC"
        "MS Excel Windows" to "MS Excel Windows"
        "MS Excel MAC" to "MS Excel MAC"
        "Word Perfect" to "Word Perfect"
        "AMI Pro" to "AMI Pro"
        "PageMaker Windows" to "PageMaker Windows"
        "PageMaker MAC" to "PageMaker MAC"
Column: crop
    Updateable:  Yes
    Key:  No
    Format: "[general]"
    Border style: None
    Validation: None
    Validation Message: None
    Tab Sequence: 90
    Initial Value: None
    Edit Style: Radio Buttons
    Coded Values:
        "Yes" to "Y"
        "No" to "N"
Column: reduction_percent
    Updateable:  Yes
    Key:  No
```

```
    Format: "[general]"
    Border style: Shadow Box
    Validation: None
    Validation Message: None
    Tab Sequence: 70
    Initial Value: None
    Edit Style: Edit Mask
Column: window
    Updateable:  Yes
    Key:  No
    Format: "[general]"
    Border style: None
    Validation: None
    Validation Message: None
    Tab Sequence: 100
    Initial Value: None
    Edit Style: Radio Buttons
    Coded Values:
        "Yes" to "Y"
        "No" to "N"
Column: enlarge_percent
    Updateable:  Yes
    Key:  No
    Format: "[general]"
    Border style: Shadow Box
    Validation: None
    Validation Message: None
    Tab Sequence: 80
    Initial Value: None
    Edit Style: Edit Mask
Column: merge
    Updateable:  Yes
    Key:  No
    Format: "[general]"
    Border style: None
    Validation: None
    Validation Message: None
    Tab Sequence: 110
    Initial Value: None
    Edit Style: Radio Buttons
    Coded Values:
        "Yes" to "Y"
        "No" to "N"
```

DataWindow: d_job_ticket_stock
Library: d:\projects\nwire\client\v1-0b1\aiconcd.pbl
Date: 7/6/95 Time: 11:04:12
Page: 1
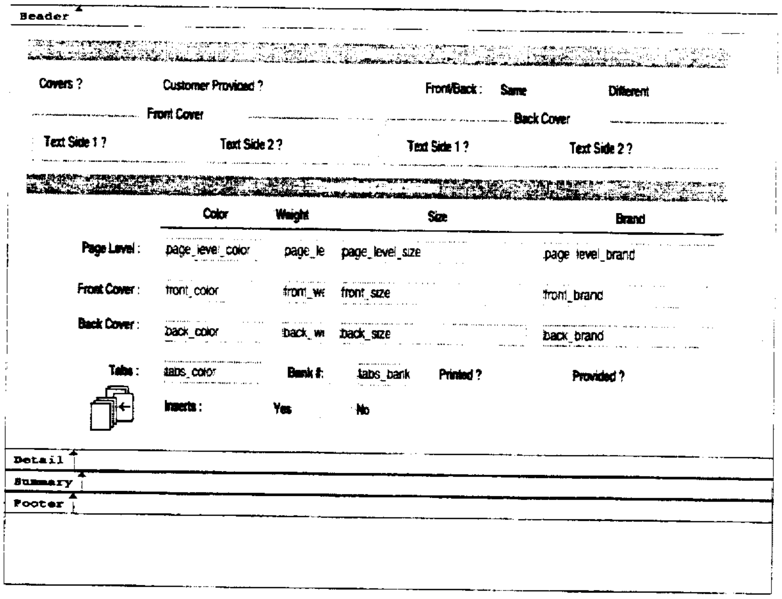

```
DataWindow: d_job_ticket_stock                                                    Page: 1
Library: d:\projects\nwire\client\v1-0b1\aiconcd.pbl
Date: 7/6/95   Time: 11:04:12
```

[redacted]

```
  UMN(NAME="work_order.scale_instructions") COLUMN(NAME="work_order.crop")
  LUMN(NAME="work_order.window") COLUMN(NAME="work_order.image_shift")
 COLUMN(NAME="work_order.merge") COLUMN(NAME="work_order.finishing")
 COLUMN(NAME="work_order.inhouse") COLUMN(NAME="work_order.color_specifications")
 COLUMN(NAME="work_order.explanations") COLUMN(NAME="work_order.image_shifhtx")
 COLUMN(NAME="work_order.image_shifty") COLUMN(NAME="work_order.center_image")
 COLUMN(NAME="work_order.primary_software")WHERE( EXP1 ="~"work_order~".~"number~"" OP ="="
 EXP2 =":number" ) ) ARG(NAME = "number" TYPE = number)
Arguments: number
Update Table: work_order
Filter: None
Sort: None
Sparse: None
Column: covers
    Updateable:  Yes
    Key:  No
    Format: "[general]"
    Border style: None
    Validation: None
    Validation Message: None
    Tab Sequence: 10
    Initial Value: None
    Edit Style: Check Box
        Text: "Covers ?"
        On value maps to "Y"
        Off value maps to "N"
Column: front_back_same
    Updateable:  Yes
    Key:  No
    Format: "[general]"
    Border style: None
    Validation: None
    Validation Message: None
    Tab Sequence: 30
    Initial Value: None
    Edit Style: Radio Buttons
    Coded Values:
        "Same" to "1"
        "Different" to "2"
Column: provided
    Updateable:  Yes
    Key:  No
    Format: "[general]"
    Border style: None
    Validation: None
    Validation Message: None
    Tab Sequence: 20
    Initial Value: None
    Edit Style: Check Box
        Text: "Customer Provided ?"
        On value maps to "Y"
        Off value maps to "N"
```

```
DataWindow: d_job_ticket_stock                                    Page: 1
Library: d:\projects\nwire\client\v1-0b1\aiconcd.pbl
Date: 7/6/95   Time: 11:04:12

Column: back_text_side1
    Updateable:  Yes
    Key:  No
    Format: "[general]"
    Border style: None
    Validation: None
    Validation Message: None
    Tab Sequence: 60
    Initial Value: None
    Edit Style: Check Box
        Text: "Text Side 1 ?"
        On value maps to "Y"
        Off value maps to "N"
Column: back_text_side2
    Updateable:  Yes
    Key:  No
    Format: "[general]"
    Border style: None
    Validation: None
    Validation Message: None
    Tab Sequence: 70
    Initial Value: None
    Edit Style: Check Box
        Text: "Text Side 2 ?"
        On value maps to "Y"
        Off value maps to "N"
Column: front_text_side1
    Updateable:  Yes
    Key:  No
    Format: "[general]"
    Border style: None
    Validation: None
    Validation Message: None
    Tab Sequence: 40
    Initial Value: None
    Edit Style: Check Box
        Text: "Text Side 1 ?"
        On value maps to "Y"
        Off value maps to "N"
Column: front_text_side2
    Updateable:  Yes
    Key:  No
    Format: "[general]"
    Border style: None
    Validation: None
    Validation Message: None
    Tab Sequence: 50
    Initial Value: None
    Edit Style: Check Box
        Text: "Text Side 2 ?"
        On value maps to "Y"
        Off value maps to "N"
Column: page_level_color
```

222

```
    Updateable:  Yes
    Key:  No
    Format: "[general]"
    Border style: Shadow Box
    Validation: None
    Validation Message: None
    Tab Sequence: 80
    Initial Value: None
    Edit Style: DropDownList
    Coded Values:
        "White" to "1"
        "Pink" to "2"
        "Yellow" to "3"
        "Green" to "4"
        "Blue" to "5"
        "Clear" to "6"
Column: page_level_weight
    Updateable:  Yes
    Key:  No
    Format: "[general]"
    Border style: Shadow Box
    Validation: None
    Validation Message: None
    Tab Sequence: 90
    Initial Value: None
    Edit Style: DropDownList
    Edit limit: 0
    Coded Values:
        "18" to "18"
        "20" to "20"
        "22" to "22"
Column: page_level_size
    Updateable:  Yes
    Key:  No
    Format: "[general]"
    Border style: Shadow Box
    Validation: None
    Validation Message: None
    Tab Sequence: 100
    Initial Value: None
    Edit Style: DropDownList
    Coded Values:
        "8.5 x 11.0 inches (US Letter)" to "1"
        "8.5 x 14.0 inches (US Legal)" to "2"
        "17.0 x 11.0 inches (Tabloid)" to "3"
        "9.0 x 11.0 inches" to "4"
        "8.5 x 13.0 inches" to "5"
        "223 x 297 mm" to "6"
        "210 x 297 mm (A4)" to "7"
        "420 x 297 mm (A3)" to "8"
Column: page_level_brand
    Updateable:  Yes
    Key:  No
```

```
DataWindow: d_job_ticket_stock                                    Page: 5
Library: d:\projects\nwire\client\v1-0b1\aiconcd.pbl
Date: 7/6/95   Time: 11:04:12

    Format: "[general]"
    Border style: Shadow Box
    Validation: None
    Validation Message: None
    Tab Sequence: 110
    Initial Value: None
    Edit Style: Edit
    Edit limit: 20
Column: front_color
    Updateable:  Yes
    Key:  No
    Format: "[general]"
    Border style: Shadow Box
    Validation: None
    Validation Message: None
    Tab Sequence: 120
    Initial Value: None
    Edit Style: DropDownList
    Coded Values:
        "White" to "1"
        "Pink" to "2"
        "Yellow" to "3"
        "Green" to "4"
        "Blue" to "5"
        "Clear" to "6"
Column: front_weight
    Updateable:  Yes
    Key:  No
    Format: "[general]"
    Border style: Shadow Box
    Validation: None
    Validation Message: None
    Tab Sequence: 130
    Initial Value: None
    Edit Style: DropDownList
    Edit limit: 0
    Coded Values:
        "18" to "18"
        "20" to "20"
        "22" to "22"
Column: front_size
    Updateable:  Yes
    Key:  No
    Format: "[general]"
    Border style: Shadow Box
    Validation: None
    Validation Message: None
    Tab Sequence: 140
    Initial Value: None
    Edit Style: DropDownList
    Coded Values:
        "8.5 x 11.0 inches (US Letter)" to "1"
        "8.5 x 14.0 inches (US Legal)" to "2"
```

```
        "17.0 x 11.0 inches (Tabloid)" to "3"
        "9.0 x 11.0 inches" to "4"
        "8.5 x 13.0 inches" to "5"
        "223 x 297 mm" to "6"
        "210 x 297 mm (A4)" to "7"
        "420 x 297 mm (A3)" to "8"
Column: front_brand
    Updateable:  Yes
    Key:  No
    Format: "[general]"
    Border style: Shadow Box
    Validation: None
    Validation Message: None
    Tab Sequence: 150
    Initial Value: None
    Edit Style: Edit
    Edit limit: 20
Column: back_color
    Updateable:  Yes
    Key:  No
    Format: "[general]"
    Border style: Shadow Box
    Validation: None
    Validation Message: None
    Tab Sequence: 160
    Initial Value: None
    Edit Style: DropDownList
    Coded Values:
        "White" to "1"
        "Pink" to "2"
        "Yellow" to "3"
        "Green" to "4"
        "Blue" to "5"
        "Clear" to "6"
Column: back_weight
    Updateable:  Yes
    Key:  No
    Format: "[general]"
    Border style: Shadow Box
    Validation: None
    Validation Message: None
    Tab Sequence: 170
    Initial Value: None
    Edit Style: DropDownList
    Edit limit: 0
    Coded Values:
        "18" to "18"
        "20" to "20"
        "22" to "22"
Column: back_size
    Updateable:  Yes
    Key:  No
    Format: "[general]"
```

```
    Border style: Shadow Box
    Validation: None
    Validation Message: None
    Tab Sequence: 180
    Initial Value: None
    Edit Style: DropDownList
    Coded Values:
        "8.5 x 11.0 inches (US Letter)" to "1"
        "8.5 x 14.0 inches (US Legal)" to "2"
        "17.0 x 11.0 inches (Tabloid)" to "3"
        "9.0 x 11.0 inches" to "4"
        "8.5 x 13.0 inches" to "5"
        "223 x 297 mm" to "6"
        "210 x 297 mm (A4)" to "7"
        "420 x 297 mm (A3)" to "8"
Column: back_brand
    Updateable:  Yes
    Key:  No
    Format: "[general]"
    Border style: Shadow Box
    Validation: None
    Validation Message: None
    Tab Sequence: 190
    Initial Value: None
    Edit Style: Edit
    Edit limit: 20
Column: tabs_color
    Updateable:  Yes
    Key:  No
    Format: "[general]"
    Border style: Shadow Box
    Validation: None
    Validation Message: None
    Tab Sequence: 200
    Initial Value: None
    Edit Style: DropDownList
    Coded Values:
        "White" to "1"
        "Pink" to "2"
        "Yellow" to "3"
        "Green" to "4"
        "Blue" to "5"
        "Clear" to "6"
Column: tabs_bank_num
    Updateable:  Yes
    Key:  No
    Format: "[general]"
    Border style: Shadow Box
    Validation: None
    Validation Message: None
    Tab Sequence: 210
    Initial Value: None
    Edit Style: Edit
```

```
DataWindow: d_job_ticket_stock                                    Page: 9
Library: d:\projects\nwire\client\v1-0b1\aiconcd.pbl
Date: 7/6/95   Time: 11:04:12

    Edit limit: 0
   umn: tabs_printed
    Updateable:  Yes
    Key:  No
    Format: "[general]"
    Border style: None
    Validation: None
    Validation Message: None
    Tab Sequence: 220
    Initial Value: None
    Edit Style: Check Box
        Text: "Printed ?"
        On value maps to "Y"
        Off value maps to "N"
Column: tabs_provided
    Updateable:  Yes
    Key:  No
    Format: "[general]"
    Border style: None
    Validation: None
    Validation Message: None
    Tab Sequence: 230
    Initial Value: None
    Edit Style: Check Box
        Text: "Provided ?"
        On value maps to "Y"
        Off value maps to "N"
Column: inserts
    Updateable:  Yes
    Key:  No
    Format: "[general]"
    Border style: None
    Validation: None
    Validation Message: None
    Tab Sequence: 240
    Initial Value: None
    Edit Style: Radio Buttons
    Coded Values:
        "Yes" to "Y"
        "No" to "N"
```

DataWindow: d_mask
Library: d:\projects\nwire\client\v1-0b1\aiconcd.pbl
Date: 7/6/95 Time: 11:04:21

Page: 1

Search Mask(s)

Header

'mask

Detail

Summary

Footer

```
DataWindow: d_mask                                                        Page: 1
Library: d:\projects\nwire\client\v1-0b1\aiconcd.pbl
Date: 7/6/95   Time: 11:04:21

Retrieve: PBSELECT(TABLE(NAME="masks") COLUMN(NAME="masks.mask") )
   ments: None
   ate Table: masks
Filter: None
Sort: None
Sparse: None
Column: mask
    Updateable:  Yes
    Key:  Yes
    Format: "[general]"
    Border style: None
    Validation: None
    Validation Message: None
    Tab Sequence: 0
    Initial Value: None
    Edit Style: Edit
    Edit limit: 12
```

DataWindow: [illegible]

Library: d:\projects\nwire\client\v1-0b1\aiconcd.pbl

Date: [illegible] Time: 11:04:[illegible]

Page: [illegible]

Header directory_detail_line

Detail

Summary

Footer

```
Datawindow: d_multi_path_directory_list                                    Page: 1
Library: d:\projects\nwire\client v1 0b1\aiconcd.pbl
Date: 7-6-95   Time: 11:04:2.

Retrieve: Script
    uments: None
  .ate Table: Not Allowed
Filter: None
Sort: None
Sparse: None
Column: directory_detail_line
    Format: "[general]"
    Border style: None
    Validation: None
    Validation Message: None
    Tab Sequence: 0
    Initial Value: None
    Edit Style: Edit
    Edit limit: 0
```

Datawindow: d_multi_pstr_directory_list_e Page: 1
Library: d:\projects\nwire\client\v1-0b1\aiconcd.pbl
Date: 7/6/95 Time: 11:04:12

Header
directory_detail_line
Detail
Summary
Footer

```
DataWindow: d_mul[illegible]_path_directory_list_e                                    Page: 1
Library: d:\projects\nwire\client\v1-0b1\aiconcd.pbl
Date: [illegible]   Time: 13:04:2[illegible]

Retrieve: Script
[illegible]uments: None
[illegible]ate Table: Not Allowed
Filter: None
Sort: None
Sparse: None
Column: directory_detail_line
    Format: "[general]"
    Border style: None
    Validation: None
    Validation Message: None
    Tab Sequence: 0
    Initial Value: None
    Edit Style: Edit
    Edit limit: 0
```

DataWindow: d_multi_path_directory_l[illegible] Page: 1
Library: d:\projects\nwire\client\v1-0b1\afconcd.pbl
Date: 7/6/95 Time: 11:04:0[illegible]

Header
directory_detail_line
Detail
Summary
Footer

```
... Window: d_multi_path_directory_list_s                                   Page: 2
Library: d:\projects\nwire\client\v1-0b1\alconfd.pbl
Date:    .. 95    Time: 11:04:22

Retrieve: Script
...ments: None
..date Table: Not Allowed
Filter: None
Sort: None
Sparse: None
Column: directory_detail_line
    Format: "[general]"
    Border style: None
    Validation: None
    Validation Message: None
    Tab Sequence: 0
    Initial Value: None
    Edit Style: Edit
    Edit limit: 0
```

DataWindow: d_multi_path_directory_list_x

Library: d:\projects\nwire\client\v1-0b1\aiconcd.pbl

Date: 7/6/95 Time: 11:04:22

Available Documents

Header directory_detail line

Detail

Summary

Footer

```
DataWindow: d_multi_part_directory_list_x                          Page: 1
Library: d:\projects\nwirc\client\v1.0b1\alconcs.pbl
Date:    Time: 1:09:22

Retrieve: Script
Arguments: None
Update Table: Not Allowed
Filter: None
Sort: None
Sparse: None
Column: directory_detail_line
    Format: "[general]"
    Border style: None
    Validation: None
    Validation Message: None
    Tab Sequence: 0
    Initial Value: None
    Edit Style: Edit
    Edit limit: 0
```

DataWindow: d_oper
Library: d:\projects\nwire\client\v1-0b1\aiconcd.pbl
Date: [illegible] Time: [illegible]
Page: 1
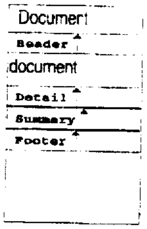

```
DataWindow: d_open                                                        Page: 1
Library: d:\projects\nwire\client\v1-0b1\aiconcd.pbl
Date: 7-6-95    Time: 11:04:23

Retrieve: SELECT "work_order_documents"."document" FROM "work_order_documents" WHERE
     "work_order_documents"."number" = :wo_number
Arguments: wo_number
Update Table: Not Allowed
Filter: None
Sort: None
Sparse: None
Column: document
    Format: "[general]"
    Border style: None
    Validation: None
    Validation Message: None
    Tab Sequence: 0
    Initial Value: None
    Edit Style: Edit
    Edit limit: 10
```

DataWindow: d_path
Library: d:\projects\nwire\client\v1-0b1\aiconcd.pbl
Date: 7/6/95 Time: 11:04:23

Page: 1

Search Path(s)

Header path

Detail

Summary

Footer

```
DataWindow: d_path                                                    Page: 3
Library: d:\projects\nwire\client\v1-0b1\aiconcd.pbl
Date: [illegible]    Time: 11:04:03

Retrieve: PBSELECT(TABLE(NAME="paths") COLUMN(NAME="paths.path") )
Arguments: None
Update Table: paths
Filter: None
Sort: None
Sparse: None
Column: path
    Updateable:  Yes
    Key:  Yes
    Format: "[general]"
    Border style: None
    Validation: None
    Validation Message: None
    Tab Sequence: 0
    Initial Value: None
    Edit Style: Edit
    Edit limit: 127
```

DataWindow: d_progress
Library: d:\projects\nwire\client\v1-0b1\aiconcd.pbl
Date: 7/6/95 Time: 11:04:23
Page: 1
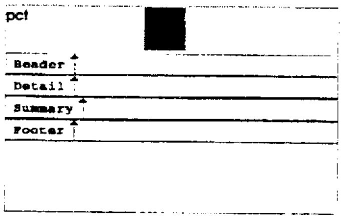

```
DataWindow: d_progress                                              Page: 2
Library: d:\projects\nwire\client\v1-0b1\aiconcd.pbl
Date: [illegible]   Time: 11:04:1[illegible]

Retrieve: Script
     Arguments: None
Update Table: Not Allowed
Filter: None
Sort: None
Sparse: None
Column: pct
     Format: "0%"
     Border style: Shadow Box
     Validation: None
     Validation Message: None
     Tab Sequence: 0
     Initial Value: "0"
     Edit Style: Edit
     Edit limit: 0
```

DataWindow: d_update_wo Page: 1
Library: d:\projects\nwire\client\v1-0b1\aiconcd.pbl
Date: 7/6/95 Time: 11:04:??

| Number | Customer Id | Job Number | Wo Date | Time In | Due Cust Day | Due Cust Date | Due Cust Time | Due Vend Day | Due Ver |
|---|---|---|---|---|---|---|---|---|---|
| number | customer_id | job_number | wo_date | time_in | due_ | due_cust_date | due_cust_tim | due_ | due_vend |

Detail
Summary
Footer

| End Date | Due Vend Time | Production Approval | Pager Phone | Media Format | Proof Required | |
|---|---|---|---|---|---|---|
| _date | due_vend_tr | production_approval | pager_phone | media_format | pr( | ordered_by |

| Ordered By | Job Type | Transmitted | Wo Type | | Job Na |
|---|---|---|---|---|---|
| | job_type | tra | wo_type | job_name | |

Account Telephone account telephone message

Message Instructions instructions deliv

| | Deliver To | Originals | Sets | Impressions | Input Output | |
|---|---|---|---|---|---|---|
| 'r_to | | originals | sets | impressions | input_output | coll |

| Collated | Page Numbering | Num Font Size | Tabs Numbered | Num Location | Mirror | Pg Num Orientation | Start Page | Start Number | Covers | F |
|---|---|---|---|---|---|---|---|---|---|---|
| collated | pa | num_font_size | tat | num | mi | pg_num_orienta | start_page | start_number | co | pr |

| [illegible] | Front Back Same | Front Text Side1 | Front Text Side2 | Back Text Side1 | Back Text Side2 | Page Level Color | Page Level Weight | Pac |
|---|---|---|---|---|---|---|---|---|
| | fro | fro | fro | ba | ba | page_level_colc | page_level_wei | page_ |

| ...el Size | Page Level Brand | Front Color | Front Weight | Front Size | Front Brand | Back Color | Back Weight | Back Size | Back Brand |
|---|---|---|---|---|---|---|---|---|---|
| level_size | page_level_bra | front_color | front_weight | front_size | front_brand | back_color | back_weight | back_size | back_brand |

Table

| Tabs Color | Tabs Bank Num | Tabs Printed | Tabs Provided | Inserts | Inserts Instructions | Input Orientation | Output Orientation | Orientation Instr |
|---|---|---|---|---|---|---|---|---|
| tabs_color | tabs_bank_num | tat | tab | ins | ins | input_orientation | output_orientati | ori |

E.r.e

| ble | Reduction Percent | Enlarge Percent | Scale Instructions | Crop | Window | Image Shift | Merge | Finishing | Innouse | ( |
|---|---|---|---|---|---|---|---|---|---|---|
| scr | reduction_perce | enlarge_percen | sc | cr | wi | im | me | finishing | inhouse | color_specificatio |

Color

| Specifications | Explanations | Image Shiftx | Image |
|---|---|---|---|
| ns | explanations | image_shiftx | image_s |

| Shifty | Center Image | Primary Software |
| --- | --- | --- |
| shifty | ce: | primary_software |

```
DataWindow: d_update_wo                                                        Page: 2
Library: d:\projects\nwire\client\v1-0b1\aiconcd.pbl
Date: 7/6/95   Time: 11:04:27

 UMN(NAME="work_order.scale_instructions") COLUMN(NAME="work_order.crop")
 LUMN(NAME="work_order.window") COLUMN(NAME="work_order.image_shift")
COLUMN(NAME="work_order.merge") COLUMN(NAME="work_order.finishing")
COLUMN(NAME="work_order.inhouse") COLUMN(NAME="work_order.color_specifications")
COLUMN(NAME="work_order.explanations") COLUMN(NAME="work_order.image_shifhtx")
COLUMN(NAME="work_order.image_shifty") COLUMN(NAME="work_order.center_image")
COLUMN(NAME="work_order.primary_software"))
Arguments: None
Update Table: work_order
Filter: None
Sort: None
Sparse: None
Column: number
    Updateable:  Yes
    Key:  Yes
    Format: "[general]"
    Border style: None
    Validation: None
    Validation Message: None
    Tab Sequence: 10
    Initial Value: None
    Edit Style: Edit
    Edit limit: 0
 Column: customer_id
    Updateable:  Yes
    Key:  Yes
    Format: "[general]"
    Border style: None
    Validation: None
    Validation Message: None
    Tab Sequence: 20
    Initial Value: None
    Edit Style: Edit
    Edit limit: 15
Column: job_number
    Updateable:  Yes
    Key:  No
    Format: "[general]"
    Border style: None
    Validation: None
    Validation Message: None
    Tab Sequence: 30
    Initial Value: None
    Edit Style: Edit
    Edit limit: 0
Column: wo_date
    Updateable:  Yes
    Key:  No
    Format: "[general]"
    Border style: None
    Validation: None
    Validation Message: None
```

```
DataWindow: d_update_wo                                          Page: 2
Library: d:\projects\nwire\client\v1-0b1\aicond.pbl
Date: [illegible]    Time: 11:04:27

    Tab Sequence: 40
    Initial Value: None
    Edit Style: Edit
    Edit limit: 0
Column: time_in
    Updateable:  Yes
    Key:  No
    Format: "[time]"
    Border style: None
    Validation: None
    Validation Message: None
    Tab Sequence: 50
    Initial Value: None
    Edit Style: Edit
    Edit limit: 0
Column: due_cust_day
    Updateable:  Yes
    Key:  No
    Format: "[general]"
    Border style: None
    Validation: None
    Validation Message: None
    Tab Sequence: 60
    Initial Value: None
    Edit Style: Edit
    Edit limit: 3
Column: due_cust_date
    Updateable:  Yes
    Key:  No
    Format: "[general]"
    Border style: None
    Validation: None
    Validation Message: None
    Tab Sequence: 70
    Initial Value: None
    Edit Style: Edit
    Edit limit: 0
Column: due_cust_time
    Updateable:  Yes
    Key:  No
    Format: "[time]"
    Border style: None
    Validation: None
    Validation Message: None
    Tab Sequence: 80
    Initial Value: None
    Edit Style: Edit
    Edit limit: 0
Column: due_vend_day
    Updateable:  Yes
    Key:  No
    Format: "[general]"
    Border style: None
```

```
DataWindow: d_update_wo                                              Page: ?
Library: d:\projects\nwire\client\v1 0b1\aiconcd.pbl
Date: ? ?/95   Time: 11:04:17

    Validation: None
    Validation Message: None
    Tab Sequence: 90
    Initial Value: None
    Edit Style: Edit
    Edit limit: 3
Column: due_vend_date
    Updateable:  Yes
    Key:  No
    Format: "[general]"
    Border style: None
    Validation: None
    Validation Message: None
    Tab Sequence: 100
    Initial Value: None
    Edit Style: Edit
    Edit limit: 0
Column: due_vend_time
    Updateable:  Yes
    Key:  No
    Format: "[time]"
    Border style: None
    Validation: None
    Validation Message: None
    Tab Sequence: 110
    Initial Value: None
    Edit Style: Edit
    Edit limit: 0
Column: production_approval
    Updateable:  Yes
    Key:  No
    Format: "[general]"
    Border style: None
    Validation: None
    Validation Message: None
    Tab Sequence: 120
    Initial Value: None
    Edit Style: Edit
    Edit limit: 25
Column: pager_phone
    Updateable:  Yes
    Key:  No
    Format: "[general]"
    Border style: None
    Validation: None
    Validation Message: None
    Tab Sequence: 130
    Initial Value: None
    Edit Style: Edit
    Edit limit: 20
Column: media_format
    Updateable:  Yes
    Key:  No
```

```
DataWindow: d_update_w
Library: d:\projects\nwire\client\v1.0b1\aiconed.pbl
Date: [illegible]    Time: 11:04:1[illegible]
```

```
    Format: "[general]"
    Border style: None
    Validation: None
    Validation Message: None
    Tab Sequence: 140
    Initial Value: None
    Edit Style: Edit
    Edit limit: 0
Column: proof_required
    Updateable:  Yes
    Key:  No
    Format: "[general]"
    Border style: None
    Validation: None
    Validation Message: None
    Tab Sequence: 150
    Initial Value: None
    Edit Style: Edit
    Edit limit: 1
Column: ordered_by
    Updateable:  Yes
    Key:  No
    Format: "[general]"
    Border style: None
    Validation: None
    Validation Message: None
    Tab Sequence: 160
    Initial Value: None
    Edit Style: Edit
    Edit limit: 128
Column: job_type
    Updateable:  Yes
    Key:  No
    Format: "[general]"
    Border style: None
    Validation: None
    Validation Message: None
    Tab Sequence: 170
    Initial Value: None
    Edit Style: Edit
    Edit limit: 0
Column: transmitted
    Updateable:  Yes
    Key:  No
    Format: "[general]"
    Border style: None
    Validation: None
    Validation Message: None
    Tab Sequence: 180
    Initial Value: None
    Edit Style: Edit
    Edit limit: 1
Column: wc_type
```

```
DataWindow: d_update_wr                                         Page: 6
Library: d:\projects\nwire\client\v1-0b1\aiconcd.pbl
Date: ... Time: 11:04:2?

    Updateable:  Yes
    Key:  No
    Format: "[general]"
    Border style: None
    Validation: None
    Validation Message: None
    Tab Sequence: 190
    Initial Value: None
    Edit Style: Edit
    Edit limit: 0
Column: job_name
    Updateable:  Yes
    Key:  No
    Format: "[general]"
    Border style: None
    Validation: None
    Validation Message: None
    Tab Sequence: 200
    Initial Value: None
    Edit Style: Edit
    Edit limit: 128
Column: account
    Updateable:  Yes
    Key:  No
    Format: "[general]"
    Border style: None
    Validation: None
    Validation Message: None
    Tab Sequence: 210
    Initial Value: None
    Edit Style: Edit
    Edit limit: 30
Column: telephone
    Updateable:  Yes
    Key:  No
    Format: "[general]"
    Border style: None
    Validation: None
    Validation Message: None
    Tab Sequence: 220
    Initial Value: None
    Edit Style: Edit
    Edit limit: 20
Column: message
    Updateable:  Yes
    Key:  No
    Format: "[general]"
    Border style: None
    Validation: None
    Validation Message: None
    Tab Sequence: 230
    Initial Value: None
    Edit Style: Edit
```

```
    Edit limit: 128
umn: instructions
    Updateable:  Yes
    Key:  No
    Format: "[general]"
    Border style: None
    Validation: None
    Validation Message: None
    Tab Sequence: 240
    Initial Value: None
    Edit Style: Edit
    Edit limit: 250
Column: deliver_to
    Updateable:  Yes
    Key:  No
    Format: "[general]"
    Border style: None
    Validation: None
    Validation Message: None
    Tab Sequence: 250
    Initial Value: None
    Edit Style: Edit
    Edit limit: 128
Column: originals
    Updateable:  Yes
    Key:  No
    Format: "[general]"
    Border style: None
    Validation: None
    Validation Message: None
    Tab Sequence: 260
    Initial Value: None
    Edit Style: Edit
    Edit limit: 0
Column: sets
    Updateable:  Yes
    Key:  No
    Format: "[general]"
    Border style: None
    Validation: None
    Validation Message: None
    Tab Sequence: 270
    Initial Value: None
    Edit Style: Edit
    Edit limit: 0
Column: impressions
    Updateable:  Yes
    Key:  No
    Format: "[general]"
    Border style: None
    Validation: None
    Validation Message: None
    Tab Sequence: 280
```

```
Datawindow: d_update_w1                                         Page: 6
Library: d:\projects\nwire\client\v1-0b1\aiconcd.pbl
Date: ...96    Time: 11:04:07

    Initial Value: None
    Edit Style: Edit
    Edit limit: 0
Column: input_output
    Updateable:  Yes
    Key:  No
    Format: "[general]"
    Border style: None
    Validation: None
    Validation Message: None
    Tab Sequence: 290
    Initial Value: None
    Edit Style: Edit
    Edit limit: 0
Column: collated
    Updateable:  Yes
    Key:  No
    Format: "[general]"
    Border style: None
    Validation: None
    Validation Message: None
    Tab Sequence: 300
    Initial Value: None
    Edit Style: Edit
    Edit limit: 0
Column: page_numbering
    Updateable:  Yes
    Key:  No
    Format: "[general]"
    Border style: None
    Validation: None
    Validation Message: None
    Tab Sequence: 310
    Initial Value: None
    Edit Style: Edit
    Edit limit: 1
Column: num_font_size
    Updateable:  Yes
    Key:  No
    Format: "[general]"
    Border style: None
    Validation: None
    Validation Message: None
    Tab Sequence: 320
    Initial Value: None
    Edit Style: Edit
    Edit limit: 0
    mn: tabs_numbered
    Updateable:  Yes
    Key:  No
    Format: "[general]"
    Border style: None
    Validation: None
```

DataWindow: d_update_wc
Library: d:\projects\nwire\client\v1-0b1\aiconcd.pbl
Date: 7.6.95 Time: 11:04:27

Page: 9

```
    Validation Message: None
    Tab Sequence: 330
    Initial Value: None
    Edit Style: Edit
    Edit limit: 1
Column: num_location
    Updateable:  Yes
    Key:  No
    Format: "[general]"
    Border style: None
    Validation: None
    Validation Message: None
    Tab Sequence: 340
    Initial Value: None
    Edit Style: Edit
    Edit limit: 2
Column: mirror
    Updateable:  Yes
    Key:  No
    Format: "[general]"
    Border style: None
    Validation: None
    Validation Message: None
    Tab Sequence: 350
    Initial Value: None
    Edit Style: Edit
    Edit limit: 1
Column: pg_num_orientation
    Updateable:  Yes
    Key:  No
    Format: "[general]"
    Border style: None
    Validation: None
    Validation Message: None
    Tab Sequence: 360
    Initial Value: None
    Edit Style: Edit
    Edit limit: 0
Column: start_page
    Updateable:  Yes
    Key:  No
    Format: "[general]"
    Border style: None
    Validation: None
    Validation Message: None
    Tab Sequence: 370
    Initial Value: None
    Edit Style: Edit
    Edit limit: 0
Column: start_number
    Updateable:  Yes
    Key:  No
    Format: "[general]"
```

```
DataWindow: d_update_wc                                          Page: 10
Library: d:\projects\nwire\client\v1 0bi\aiconcd.pbl
Date: 7/6/95    Time: 11:04:2?

    Border style: None
    Validation: None
    Validation Message: None
    Tab Sequence: 380
    Initial Value: None
    Edit Style: Edit
    Edit limit: 0
Column: covers
    Updateable:  Yes
    Key:  No
    Format: "[general]"
    Border style: None
    Validation: None
    Validation Message: None
    Tab Sequence: 390
    Initial Value: None
    Edit Style: Edit
    Edit limit: 1
Column: provided
    Updateable:  Yes
    Key:  No
    Format: "[general]"
    Border style: None
    Validation: None
    Validation Message: None
    Tab Sequence: 400
    Initial Value: None
    Edit Style: Edit
    Edit limit: 1
Column: front_back_same
    Updateable:  Yes
    Key:  No
    Format: "[general]"
    Border style: None
    Validation: None
    Validation Message: None
    Tab Sequence: 410
    Initial Value: None
    Edit Style: Edit
    Edit limit: 1
Column: front_text_side1
    Updateable:  Yes
    Key:  No
    Format: "[general]"
    Border style: None
    Validation: None
    Validation Message: None
    Tab Sequence: 420
    Initial Value: None
    Edit Style: Edit
    Edit limit: 1
Column: front_text_side2
    Updateable:  Yes
```

```
    Key:  No
    Format: "[general]"
    Border style: None
    Validation: None
    Validation Message: None
    Tab Sequence: 430
    Initial Value: None
    Edit Style: Edit
    Edit limit: 1
Column: back_text_side1
    Updateable:  Yes
    Key:  No
    Format: "[general]"
    Border style: None
    Validation: None
    Validation Message: None
    Tab Sequence: 440
    Initial Value: None
    Edit Style: Edit
    Edit limit: 1
Column: back_text_side2
    Updateable:  Yes
    Key:  No
    Format: "[general]"
    Border style: None
    Validation: None
    Validation Message: None
    Tab Sequence: 450
    Initial Value: None
    Edit Style: Edit
    Edit limit: 1
Column: page_level_color
    Updateable:  Yes
    Key:  No
    Format: "[general]"
    Border style: None
    Validation: None
    Validation Message: None
    Tab Sequence: 460
    Initial Value: None
    Edit Style: Edit
    Edit limit: 0
Column: page_level_weight
    Updateable:  Yes
    Key:  No
    Format: "[general]"
    Border style: None
    Validation: None
    Validation Message: None
    Tab Sequence: 470
    Initial Value: None
    Edit Style: Edit
    Edit limit: 0
```

```
DataWindow: d_update_wt                                                Page: [illegible]
Library: d:\projects\nwire\client\v1-0b1\a:concd.pbl
Date: [illegible]   Time: 11:04:27

Column: page_level_size
    Updateable:  Yes
    Key:  No
    Format: "[general]"
    Border style: None
    Validation: None
    Validation Message: None
    Tab Sequence: 480
    Initial Value: None
    Edit Style: Edit
    Edit limit: 0
Column: page_level_brand
    Updateable:  Yes
    Key:  No
    Format: "[general]"
    Border style: None
    Validation: None
    Validation Message: None
    Tab Sequence: 490
    Initial Value: None
    Edit Style: Edit
    Edit limit: 0
Column: front_color
    Updateable:  Yes
    Key:  No
    Format: "[general]"
    Border style: None
    Validation: None
    Validation Message: None
    Tab Sequence: 500
    Initial Value: None
    Edit Style: Edit
    Edit limit: 0
Column: front_weight
    Updateable:  Yes
    Key:  No
    Format: "[general]"
    Border style: None
    Validation: None
    Validation Message: None
    Tab Sequence: 510
    Initial Value: None
    Edit Style: Edit
    Edit limit: 0
Column: front_size
    Updateable:  Yes
    Key:  No
    Format: "[general]"
    Border style: None
    Validation: None
    Validation Message: None
    Tab Sequence: 520
    Initial Value: None
```

```
DataWindow: d_update_wo
Library: d:\projects\nwire\client\v1 0b1\aiconcd.pbl
Date: 7 6 96   Time: 11:04:27

    Edit Style: Edit
    Edit limit: 0
Column: front_brand
    Updateable:  Yes
    Key:  No
    Format: "[general]"
    Border style: None
    Validation: None
    Validation Message: None
    Tab Sequence: 530
    Initial Value: None
    Edit Style: Edit
    Edit limit: 0
Column: back_color
    Updateable:  Yes
    Key:  No
    Format: "[general]"
    Border style: None
    Validation: None
    Validation Message: None
    Tab Sequence: 540
    Initial Value: None
    Edit Style: Edit
    Edit limit: 0
Column: back_weight
    Updateable:  Yes
    Key:  No
    Format: "[general]"
    Border style: None
    Validation: None
    Validation Message: None
    Tab Sequence: 550
    Initial Value: None
    Edit Style: Edit
    Edit limit: 0
Column: back_size
    Updateable:  Yes
    Key:  No
    Format: "[general]"
    Border style: None
    Validation: None
    Validation Message: None
    Tab Sequence: 560
    Initial Value: None
    Edit Style: Edit
    Edit limit: 0
Column: back_brand
    Updateable:  Yes
    Key:  No
    Format: "[general]"
    Border style: None
    Validation: None
    Validation Message: None
```

```
    Tab Sequence: 570
    Initial Value: None
    Edit Style: Edit
    Edit limit: 0
Column: tabs_color
    Updateable:  Yes
    Key:  No
    Format: "[general]"
    Border style: None
    Validation: None
    Validation Message: None
    Tab Sequence: 580
    Initial Value: None
    Edit Style: Edit
    Edit limit: 0
Column: tabs_bank_num
    Updateable:  Yes
    Key:  No
    Format: "[general]"
    Border style: None
    Validation: None
    Validation Message: None
    Tab Sequence: 590
    Initial Value: None
    Edit Style: Edit
    Edit limit: 0
Column: tabs_printed
    Updateable:  Yes
    Key:  No
    Format: "[general]"
    Border style: None
    Validation: None
    Validation Message: None
    Tab Sequence: 600
    Initial Value: None
    Edit Style: Edit
    Edit limit: 1
Column: tabs_provided
    Updateable:  Yes
    Key:  No
    Format: "[general]"
    Border style: None
    Validation: None
    Validation Message: None
    Tab Sequence: 610
    Initial Value: None
    Edit Style: Edit
    Edit limit: 1
Column: inserts
    Updateable:  Yes
    Key:  No
    Format: "[general]"
    Border style: None
```

```
    Validation: None
    Validation Message: None
    Tab Sequence: 620
    Initial Value: None
    Edit Style: Edit
    Edit limit: 1
Column: inserts_instructions
    Updateable:  Yes
    Key:  No
    Format: "[general]"
    Border style: None
    Validation: None
    Validation Message: None
    Tab Sequence: 630
    Initial Value: None
    Edit Style: Edit
    Edit limit: 1
Column: input_orientation
    Updateable:  Yes
    Key:  No
    Format: "[general]"
    Border style: None
    Validation: None
    Validation Message: None
    Tab Sequence: 640
    Initial Value: None
    Edit Style: Edit
    Edit limit: 0
Column: output_orientation
    Updateable:  Yes
    Key:  No
    Format: "[general]"
    Border style: None
    Validation: None
    Validation Message: None
    Tab Sequence: 650
    Initial Value: None
    Edit Style: Edit
    Edit limit: 0
Column: orientation_instr
    Updateable:  Yes
    Key:  No
    Format: "[general]"
    Border style: None
    Validation: None
    Validation Message: None
    Tab Sequence: 660
    Initial Value: None
    Edit Style: Edit
    Edit limit: 1
Column: scalable
    Updateable:  Yes
    Key:  No
```

```
DataWindow: d_update_wc                                              Page: 16
Library: d:\projects\nwire\client\v1.0n\adconrd.pbl
Date: 7-6-9   Time: 11:04:27

    Format: "[general]"
    Border style: None
    Validation: None
    Validation Message: None
    Tab Sequence: 670
    Initial Value: None
    Edit Style: Edit
    Edit limit: 1
Column: reduction_percent
    Updateable:  Yes
    Key:  No
    Format: "[general]"
    Border style: None
    Validation: None
    Validation Message: None
    Tab Sequence: 680
    Initial Value: None
    Edit Style: Edit
    Edit limit: 0
Column: enlarge_percent
    Updateable:  Yes
    Key:  No
    Format: "[general]"
    Border style: None
    Validation: None
    Validation Message: None
    Tab Sequence: 690
    Initial Value: None
    Edit Style: Edit
    Edit limit: 0
Column: scale_instructions
    Updateable:  Yes
    Key:  No
    Format: "[general]"
    Border style: None
    Validation: None
    Validation Message: None
    Tab Sequence: 700
    Initial Value: None
    Edit Style: Edit
    Edit limit: 1
Column: crop
    Updateable:  Yes
    Key:  No
    Format: "[general]"
    Border style: None
    Validation: None
    Validation Message: None
    Tab Sequence: 710
    Initial Value: None
    Edit Style: Edit
    Edit limit: 1
Column: window
```

```
DataWindow: d_job_data_wr
Library: d:\projects\nwire\client\v1-0b1\alconcd.pbl          Page: 17
Date: 7/6/95   Time: 11:04:27

    Updateable:  Yes
    Key:  No
    Format: "[general]"
    Border style: None
    Validation: None
    Validation Message: None
    Tab Sequence: 720
    Initial Value: None
    Edit Style: Edit
    Edit limit: 1
Column: image_shift
    Updateable:  Yes
    Key:  No
    Format: "[general]"
    Border style: None
    Validation: None
    Validation Message: None
    Tab Sequence: 730
    Initial Value: None
    Edit Style: Edit
    Edit limit: 1
Column: merge
    Updateable:  Yes
    Key:  No
    Format: "[general]"
    Border style: None
    Validation: None
    Validation Message: None
    Tab Sequence: 740
    Initial Value: None
    Edit Style: Edit
    Edit limit: 1
Column: finishing
    Updateable:  Yes
    Key:  No
    Format: "[general]"
    Border style: None
    Validation: None
    Validation Message: None
    Tab Sequence: 750
    Initial Value: None
    Edit Style: Edit
    Edit limit: 0
Column: inhouse
    Updateable:  Yes
    Key:  No
    Format: "[general]"
    Border style: None
    Validation: None
    Validation Message: None
    Tab Sequence: 760
    Initial Value: None
    Edit Style: Edit
```

272

```
    Edit limit: 0
 mn: color_specifications
    Updateable:  Yes
    Key:  No
    Format: "[general]"
    Border style: None
    Validation: None
    Validation Message: None
    Tab Sequence: 770
    Initial Value: None
    Edit Style: Edit
    Edit limit: 40
Column: explanations
    Updateable:  Yes
    Key:  No
    Format: "[general]"
    Border style: None
    Validation: None
    Validation Message: None
    Tab Sequence: 780
    Initial Value: None
    Edit Style: Edit
    Edit limit: 128
Column: image_shifhtx
    Updateable:  Yes
    Key:  No
    Format: "[general]"
    Border style: None
    Validation: None
    Validation Message: None
    Tab Sequence: 790
    Initial Value: None
    Edit Style: Edit
    Edit limit: 0
Column: image_shifty
    Updateable:  Yes
    Key:  No
    Format: "[general]"
    Border style: None
    Validation: None
    Validation Message: None
    Tab Sequence: 800
    Initial Value: None
    Edit Style: Edit
    Edit limit: 0
Column: center_image
    Updateable:  Yes
    Key:  No
    Format: "[general]"
    Border style: None
    Validation: None
    Validation Message: None
    Tab Sequence: 810
```

```
DataWindow: d_update_wc
Library: d:\projects\nwire\client\v1-0b1\aiconcd.pbl                    Page: 19
Date: 7/6/95    Time: 11:04:27

     Initial Value: None
     Edit Style: Edit
     Edit limit: 1
Column: primary_software
     Updateable:  Yes
     Key:  No
     Format: "[general]"
     Border style: None
     Validation: None
     Validation Message: None
     Tab Sequence: 820
     Initial Value: None
     Edit Style: DropDownList
     Edit limit: 0
     Coded Values:
          "MS Word for Windows" to "MS Word for Windows"
          "MS Word for MAC" to "MS Word for MAC"
          "Quark / MAC" to "Quark / MAC"
          "MS Excel Windows" to "MS Excel Windows"
          "MS Excel MAC" to "MS Excel MAC"
          "Word Perfect" to "Word Perfect"
          "AMI Pro" to "AMI Pro"
          "PageMaker Windows" to "PageMaker Windows"
          "PageMaker MAC" to "PageMaker MAC"
```

Datawindow: d_wt
Library: d:\projects\nwtrc\client\v1-0bi\aiconcd.pbl
Date: 7-6 95 Time: 11:04:44
Page: 1
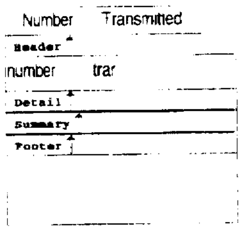

```
DataWindow: d_wo                                                  Page: 2
Library: d:\projects\nwire\client\v1-0b1\aiconcd.pbl
Date: 7/6/95   Time: 11:04:44

Retrieve: PBSELECT(TABLE(NAME="work_order" ) COLUMN(NAME="work_order.number")
    UMN(NAME="work_order.transmitted")WHERE( EXP1 ="~"work_order~".~"number~"" OP ="=" EXP2
    :work_order" ) ) ARG(NAME = "work_order" TYPE = number)
Arguments: work_order
Update Table: work_order
Filter: None
Sort: None
Sparse: None
Column: number
    Updateable:  Yes
    Key:  Yes
    Format: "[general]"
    Border style: None
    Validation: None
    Validation Message: None
    Tab Sequence: 10
    Initial Value: None
    Edit Style: Edit
    Edit limit: 0
Column: transmitted
    Updateable:  Yes
    Key:  Yes
    Format: "[general]"
    Border style: None
    Validation: None
    Validation Message: None
    Tab Sequence: 20
    Initial Value: None
    Edit Style: Edit
    Edit limit: 1
```

DataWindow: d_wo_number
Library: d:\projects\nwire\client\v1-0b1\alconcd.pbl
Date: [illegible] Time: 11:04:45
Page: [illegible]
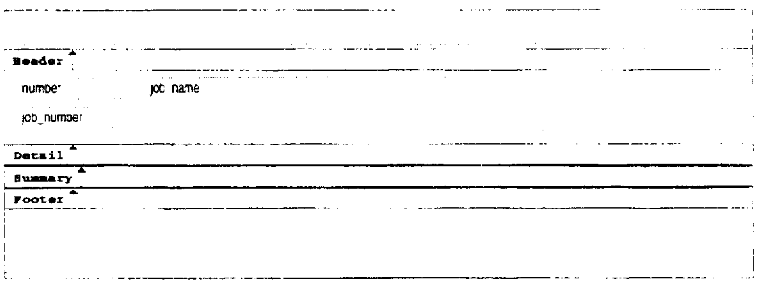

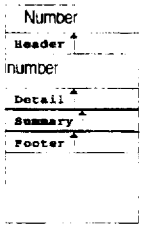
Number
Header
number
Detail
Summary
Footer

```
DataWindow: d_wo_number_ddw                                        Page: 1
Library: d:\projects\nwire\client\v1-0b1\aiconed.pbl
Date: 9/6/95   Time: 11:04:45

Retrieve: PBSELECT(TABLE(NAME="work_order") COLUMN(NAME="work_order.number") )
Arguments: None
Update Table: work_order
Filter: None
Sort: None
Sparse: None
Column: number
    Updateable:  Yes
    Key:  Yes
    Format: "[general]"
    Border style: None
    Validation: None
    Validation Message: None
    Tab Sequence: 10
    Initial Value: None
    Edit Style: Edit
    Edit limit: 0
```

Datawindow: d_wo_page_1
Library: d:\projects\nwire\client\v1-0b1\aiconcd.pbl
Date: 7.6.95   Time: 11:04:46
Page: 1
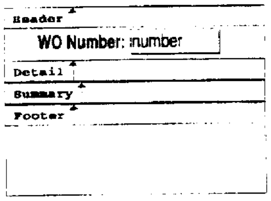

```
DataWindow: d_wc_page_1                                         Page: 1
Library: d:\projects\nwire\client\v1-0b1\aiconcd.pbl
Date: 7/6/95    Time: 11:04:46

Retrieve: PBSELECT(TABLE(NAME="work_order") COLUMN(NAME="work_order.number") )
   iments: None
Update Table: work_order
Filter: None
Sort: None
Sparse: None
Column: number
    Updateable:  Yes
    Key:  Yes
    Format: "[general]"
    Border style: Shadow Box
    Validation: None
    Validation Message: None
    Tab Sequence: 10
    Initial Value: None
    Edit Style: Edit
    Edit limit: 0
```

DataWindow: d_work_order
Library: d:\projects\nwire\client\v1-0b1\aiconcd.pbl
Date: 7/6/95    Time: 11:04:46
Page: 1
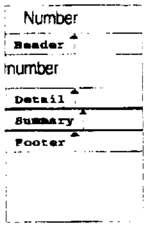

```
DataWindow: d_work_order                                                  Page: 2
Library: d:\projects\nwire\client\v1-0b1\aiconcd.pbl
Date: 7/6/95    Time: 11:04:48

Retrieve: PBSELECT(TABLE(NAME="work_order" ) COLUMN(NAME="work_order.number")WHERE( EXP1
    "work_order~".~"number~"" OP ="=" EXP2 =":l_wo_number" ) ) ARG(NAME = "l_wo_number" TYPE =
number)
Arguments: l_wo_number
Update Table: work_order
Filter: None
Sort: None
Sparse: None
Column: number
    Updateable:  Yes
    Key:  Yes
    Format: "[general]"
    Border style: None
    Validation: None
    Validation Message: None
    Tab Sequence: 10
    Initial Value: None
    Edit Style: Edit
    Edit limit: 0
```

DataWindow: dw_calendar
Library: d:\projects\nwire\client\v1-0b1\aiconcd.pbl
Date: 7 6 9.  Time: 11:04:47
Page: 1
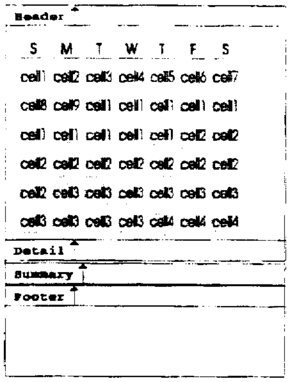

```
DataWindow: dw_calendar                                          Page: 2
Library: d:\projects\nwire\client\v1-0b1\aiconcd.pbl
Date: 7/6/95   Time: 11:04:47

R--rieve: Script
  ments: None
Update Table: Not Allowed
Filter: None
Sort: None
Sparse: None
Column: cell1
    Format: "[general]"
    Border style: None
    Validation: None
    Validation Message: None
    Tab Sequence: 0
    Initial Value: None
    Edit Style: Edit
    Edit limit: 0
Column: cell2
    Format: "[general]"
    Border style: None
    Validation: None
    Validation Message: None
    Tab Sequence: 0
    Initial Value: None
    Edit Style: Edit
    Edit limit: 0
Column: cell3
    Format: "[general]"
    Border style: None
    Validation: None
    Validation Message: None
    Tab Sequence: 0
    Initial Value: None
    Edit Style: Edit
    Edit limit: 0
Column: cell4
    Format: "[general]"
    Border style: None
    Validation: None
    Validation Message: None
    Tab Sequence: 0
    Initial Value: None
    Edit Style: Edit
    Edit limit: 0
Column: cell5
    Format: "[general]"
    Border style: None
    Validation: None
    Validation Message: None
    Tab Sequence: 0
    Initial Value: None
    Edit Style: Edit
    Edit limit: 0
Column: cell6
    Format: "[general]"
```

```
    Border style: None
    Validation: None
    Validation Message: None
    Tab Sequence: 0
    Initial Value: None
    Edit Style: Edit
    Edit limit: 0
Column: cell7
    Format: "[general]"
    Border style: None
    Validation: None
    Validation Message: None
    Tab Sequence: 0
    Initial Value: None
    Edit Style: Edit
    Edit limit: 0
Column: cell8
    Format: "[general]"
    Border style: None
    Validation: None
    Validation Message: None
    Tab Sequence: 0
    Initial Value: None
    Edit Style: Edit
    Edit limit: 0
Column: cell9
    Format: "[general]"
    Border style: None
    Validation: None
    Validation Message: None
    Tab Sequence: 0
    Initial Value: None
    Edit Style: Edit
    Edit limit: 0
Column: cell10
    Format: "[general]"
    Border style: None
    Validation: None
    Validation Message: None
    Tab Sequence: 0
    Initial Value: None
    Edit Style: Edit
    Edit limit: 0
Column: cell11
    Format: "[general]"
    Border style: None
    Validation: None
    Validation Message: None
    Tab Sequence: 0
    Initial Value: None
    Edit Style: Edit
    Edit limit: 0
Column: cell12
```

DataWindow: dw_calendar Page:
Library: d:\projects\nwire\client\v1-0b1\aiconcd.pbl
Date: 7/6/95 Time: 11:04:47

```
    Format: "[general]"
    Border style: None
    Validation: None
    Validation Message: None
    Tab Sequence: 0
    Initial Value: None
    Edit Style: Edit
    Edit limit: 0
Column: cell13
    Format: "[general]"
    Border style: None
    Validation: None
    Validation Message: None
    Tab Sequence: 0
    Initial Value: None
    Edit Style: Edit
    Edit limit: 0
Column: cell14
    Format: "[general]"
    Border style: None
    Validation: None
    Validation Message: None
    Tab Sequence: 0
    Initial Value: None
    Edit Style: Edit
    Edit limit: 0
Column: cell15
    Format: "[general]"
    Border style: None
    Validation: None
    Validation Message: None
    Tab Sequence: 0
    Initial Value: None
    Edit Style: Edit
    Edit limit: 0
Column: cell16
    Format: "[general]"
    Border style: None
    Validation: None
    Validation Message: None
    Tab Sequence: 0
    Initial Value: None
    Edit Style: Edit
    Edit limit: 0
Column: cell17
    Format: "[general]"
    Border style: None
    Validation: None
    Validation Message: None
    Tab Sequence: 0
    Initial Value: None
    Edit Style: Edit
    Edit limit: 0
```

DataWindow: dw_calendar Page: 5
Library: d:\projects\nwire\client\v1-0b1\aiconcd.pbl
Date: 7/6/95 Time: 11:04:47

Column: cell118
    Format: "[general]"
    Border style: None
    Validation: None
    Validation Message: None
    Tab Sequence: 0
    Initial Value: None
    Edit Style: Edit
    Edit limit: 0
Column: cell119
    Format: "[general]"
    Border style: None
    Validation: None
    Validation Message: None
    Tab Sequence: 0
    Initial Value: None
    Edit Style: Edit
    Edit limit: 0
Column: cell120
    Format: "[general]"
    Border style: None
    Validation: None
    Validation Message: None
    Tab Sequence: 0
    Initial Value: None
    Edit Style: Edit
    Edit limit: 0
Column: cell121
    Format: "[general]"
    Border style: None
    Validation: None
    Validation Message: None
    Tab Sequence: 0
    Initial Value: None
    Edit Style: Edit
    Edit limit: 0
Column: cell122
    Format: "[general]"
    Border style: None
    Validation: None
    Validation Message: None
    Tab Sequence: 0
    Initial Value: None
    Edit Style: Edit
    Edit limit: 0
Column: cell123
    Format: "[general]"
    Border style: None
    Validation: None
    Validation Message: None
    Tab Sequence: 0
    Initial Value: None
    Edit Style: Edit DataWindow: dw_calendar Page: 6
Library: d:\projects\nwire\client\v1-0b1\aiconcd.pbl
Date: 7/6/95 Time: 11:04:47

```
    Edit limit: 0
    umn: cell24
    Format: "[general]"
    Border style: None
    Validation: None
    Validation Message: None
    Tab Sequence: 0
    Initial Value: None
    Edit Style: Edit
    Edit limit: 0
Column: cell25
    Format: "[general]"
    Border style: None
    Validation: None
    Validation Message: None
    Tab Sequence: 0
    Initial Value: None
    Edit Style: Edit
    Edit limit: 0
Column: cell26
    Format: "[general]"
    Border style: None
    Validation: None
    Validation Message: None
    Tab Sequence: 0
    Initial Value: None
    Edit Style: Edit
    Edit limit: 0
Column: cell27
    Format: "[general]"
    Border style: None
    Validation: None
    Validation Message: None
    Tab Sequence: 0
    Initial Value: None
    Edit Style: Edit
    Edit limit: 0
Column: cell28
    Format: "[general]"
    Border style: None
    Validation: None
    Validation Message: None
    Tab Sequence: 0
    Initial Value: None
    Edit Style: Edit
    Edit limit: 0
    mn: cell29
    Format: "[general]"
    Border style: None
    Validation: None
    Validation Message: None
    Tab Sequence: 0
    Initial Value: None
```

```
DataWindow: dw_calendar                                          Page: 7
Library: d:\projects\nwire\client\v1-0b1\aiconcd.pbl
Date: 7/6/95   Time: 11:04:47

    Edit Style: Edit
    Edit limit: 0
Column: cell130
    Format: "[general]"
    Border style: None
    Validation: None
    Validation Message: None
    Tab Sequence: 0
    Initial Value: None
    Edit Style: Edit
    Edit limit: 0
Column: cell131
    Format: "[general]"
    Border style: None
    Validation: None
    Validation Message: None
    Tab Sequence: 0
    Initial Value: None
    Edit Style: Edit
    Edit limit: 0
Column: cell132
    Format: "[general]"
    Border style: None
    Validation: None
    Validation Message: None
    Tab Sequence: 0
    Initial Value: None
    Edit Style: Edit
    Edit limit: 0
Column: cell133
    Format: "[general]"
    Border style: None
    Validation: None
    Validation Message: None
    Tab Sequence: 0
    Initial Value: None
    Edit Style: Edit
    Edit limit: 0
Column: cell134
    Format: "[general]"
    Border style: None
    Validation: None
    Validation Message: None
    Tab Sequence: 0
    Initial Value: None
    Edit Style: Edit
    Edit limit: 0
.mn: cell135
    Format: "[general]"
    Border style: None
    Validation: None
    Validation Message: None
    Tab Sequence: 0
```

```
DataWindow: dw_calendar                                          Page: 8
Library: d:\projects\nwire\client\v1-0b1\aiconcd.pbl
Date: 7/6/95   Time: 11:04:47

    Initial Value: None
    Edit Style: Edit
    Edit limit: 0
Column: cell136
    Format: "[general]"
    Border style: None
    Validation: None
    Validation Message: None
    Tab Sequence: 0
    Initial Value: None
    Edit Style: Edit
    Edit limit: 0
Column: cell137
    Format: "[general]"
    Border style: None
    Validation: None
    Validation Message: None
    Tab Sequence: 0
    Initial Value: None
    Edit Style: Edit
    Edit limit: 0
Column: cell138
    Format: "[general]"
    Border style: None
    Validation: None
    Validation Message: None
    Tab Sequence: 0
    Initial Value: None
    Edit Style: Edit
    Edit limit: 0
Column: cell139
    Format: "[general]"
    Border style: None
    Validation: None
    Validation Message: None
    Tab Sequence: 0
    Initial Value: None
    Edit Style: Edit
    Edit limit: 0
Column: cell140
    Format: "[general]"
    Border style: None
    Validation: None
    Validation Message: None
    Tab Sequence: 0
    Initial Value: None
    Edit Style: Edit
    Edit limit: 0
Column: cell141
    Format: "[general]"
    Border style: None
    Validation: None
    Validation Message: None
```

DataWindow: dw_calendar

Page: 9

Library: d:\projects\nwire\client\v1-0b1\aiconcd.pbl

Date: 7/6/95 Time: 11:04:47

```
    Tab Sequence: 0
    Initial Value: None
    Edit Style: Edit
    Edit limit: 0
Column: cell42
    Format: "[general]"
    Border style: None
    Validation: None
    Validation Message: None
    Tab Sequence: 0
    Initial Value: None
    Edit Style: Edit
    Edit limit: 0
```

DataWindow: d_multi_path_directory_list Page: 1
Library: d:\projects\nwire\client\v1-0b1\aiconcdr.pbl
Date: 7/6/95 Time: 11:04:49

| |
|---|
| Header |
| directory_detail_line |
| Detail |
| Summary |
| Footer |

```
DataWindow: d_multi_path_directory_list                              Page: 2
Library: d:\projects\nwire\client\v1-0b1\aiconcdr.pbl
Date: 7/6/95    Time: 11:04:49

Retrieve: Script
    ments: None
Update Table: Not Allowed
Filter: None
Sort: None
Sparse: None
Column: directory_detail_line
    Format: "[general]"
    Border style: None
    Validation: None
    Validation Message: None
    Tab Sequence: 0
    Initial Value: None
    Edit Style: Edit
    Edit limit: 0
```

DataWindow: d_multi_path_directory_list_a Page: 1
Library: d:\projects\nwire\client\v1-0b1\alconcdr.pbl
Date: [illegible]6/95 Time: 11:04:49

Header
directory_detail_line
Detail
Summary
Footer

DataWindow: d_multi_path_directory_list_a
Library: d:\projects\nwire\client\v1-0b1\aiconcdr.pbl
Date: 7/6/95 Time: 11:04:49

Page: 2

Retrieve: Script
Arguments: None
Update Table: Not Allowed
Filter: None
Sort: None
Sparse: None
Column: directory_detail_line
    Format: "[general]"
    Border style: None
    Validation: None
    Validation Message: None
    Tab Sequence: 0
    Initial Value: None
    Edit Style: Edit
    Edit limit: 0

DataWindow: d_multi_path_directory_list_[illegible] Page: 1
Library: d:\projects\nwire\client\v1-0b1\aiconcdr.pbl
Date: [illegible] Time: 11:04:49

Header
directory_detail line
Detail
Summary
Footer

```
DataWindow: d_multi_path_directory_list_s                              Page: 1
Library: d:\projects\nwire\client\v1-0b1\aiconcdr.pbl
Date: 7/6/95   Time: 11:04:49

Retrieve: Script
   ments: None
Update Table: Not Allowed
Filter: None
Sort: None
Sparse: None
Column: directory_detail_line
    Format: "[general]"
    Border style: None
    Validation: None
    Validation Message: None
    Tab Sequence: 0
    Initial Value: None
    Edit Style: Edit
    Edit limit: 0
```

DataWindow: d_multi_path_directory_list_x Page: 1
Library: d:\projects\nwire\client\v1-0b1\aiconcdr.pbl
Date: 7/6/95 Time: 11:04:49
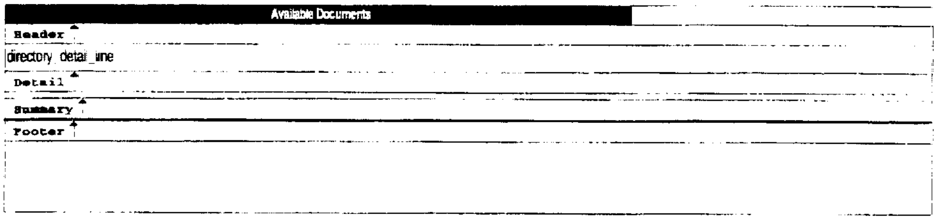

DataWindow: d_multi_path_directory_list_x Page: 1
Library: d:\projects\nwire\client\v1 0b1\aiconedr.pbl
Date: 7/6/95 Time: 11:04:49

Retrieve: Script
Arguments: None
Update Table: Not Allowed
Filter: None
Sort: None
Sparse: None
Column: directory_detail_line
    Format: "[general]"
    Border style: None
    Validation: None
    Validation Message: None
    Tab Sequence: 0
    Initial Value: None
    Edit Style: Edit
    Edit limit: 0

```
Function: f_delete_file
Library: d:\projects\nwire\client\v1-0b1\aiconcf.pbl
Date: 7/6/95     Time: 11:03:11
```

Page: 1

```
Function     :  f_delete_file
Return Type  :  boolean
Arguments    :
                            string                        file_parm
End of Arguments

int     li_ret
string ls_title = "File Delete Window"
string ls_prompt
string ls_prompt1 = "The file "
string ls_prompt2 = "Will be deleted !"

ls_prompt = ls_prompt1  + file_parm + " " + ls_prompt2
li_ret = &
MessageBox(ls_title, ls_prompt, Exclamation!, OKCancel!, 2)
If li_ret = 1 then
   FileDelete( file_parm )             //Process OK.
   Return( true )
Else
   Return( false )                     //Process CANCEL.
End If

end function
```

```
Function:  f_disk_transfer                                             Page:
Library: d:\projects\nwire\client\v1 0b1\aiconcf.pbl
Date: [illegible]/6/95    Time: 11:03:11



Function      :  f_disk_transfer
Return Type  :  none
Arguments     :
                          string                     filename
End of Arguments

//
//
//

   messagebox( "Diskette(s) Transfer", "Insert Diskette into drive" + &
                 " and copy the file: " + &
                 filename + " to it and deliver to your local" +&
                 "NightRider Corporate Reprographics Office or" +&
                 " call your NightRider Account Manager", exclamation! )

end subroutine
```

```
Function:  f_get_parms
Library: d:\projects\nwire\client\v1-0b1\aiconcf.pbl                                    Page: 1
Date: 7/6/95     Time: 11:03:11



Function     :  f_get_parms
Return Type  :  none
Arguments    :  none

//
//
//

gs_tape_command = ProfileString( "AICONT.OVL", &
                      "AICON Client Settings","TapeCommand","" )

gs_tape_suffix = ProfileString( "AICONT.OVL", &
                      "AICON Client Settings","TapeSuffix","" )

gs_acrobat_reader = ProfileString( "AICONT.OVL", &
                      "AICON Client Settings","ReaderExec","" )
end subroutine
```

```
Function: f_get_phonenum                                              Page: 1
Library: d:\projects\nwire\client\v1 0bl\aiconcf.pbl
Date: 7/6/95     Time: 11:03:11


Function     :  f_get_phonenum
Return Type  :  string
Arguments    :  none

//
//
//
string ls_s1, ls_s2, ls_s3, ls_s4

ls_s1 = ProfileString( "AICONT.OVL", &
                      "AICON Client Settings","PhoneNumber","" )

ls_s2 = ProfileString( "AICONT.OVL", &
                      "AICON Client Settings","DialPrefix","" )

ls_s3 = ProfileString( "AICONT.OVL", &
                      "AICON Client Settings","ModemInit","" )

gs_aicon_phone = ls_s1
gs_dialprefix = ls_s2
gs_init_string = ls_s3

if ls_s2 > "" then
   ls_s4 = ls_s2 + "," + ls_s1

   ls_s4 = ls_s1
end if

return( ls_s4 )

end function
```

Function: f_get_token
Library: d:\projects\nwire\client\v1-0b1\aiconcf.pbl
Date: 7/6/95 Time: 11:03:11

Page: 1

```
Function     : f_get_token
Return Type  : string
Arguments    :
     ref              string                 source
                      string                 separator
End of Arguments

// String Function f_GET_TOKEN (ref string Source, string Separator)

// The function Get_Token receive, as arguments, the string from which
// the token is to be stripped off, from the left, and the separator
// character.  If the separator character does not appear in the string,
// it returns the entire string.  Otherwise, it returns the token, not
// including the separator character.  In either case, the source string
// is truncated on the left, by the length of the token and separator
// character, if any.


int        p
string ret

p = Pos(source, separator)   // Get the position of the separator

if p = 0 then                // if no separator,
   ret = source              // return the whole source string and
   source = ""                   // make the original source of zero length
else
   ret = Mid(source, 1, p - 1)  // otherwise, return just the token and
   source = Right(source, Len(source) - p) // strip it & the separator
end if

return ret
end function
```

```
Function:   f_get_tomorrow                                        Page: 1
Library: d:\projects\nwire\client\v1-0b1\aiconcf.pbl
Date: 7/6/95     Time: 11:03:11



Function      :  f_get_tomorrow
Return Type   :  date
Arguments     :  none

int li_d1, li_m1, li_y1
int li_d2, li_m2, li_y2
int li_1, li_2
date    ld_date1, ld_date2

ld_date1 = today()
li_d1 = day( ld_date1 )
li_m1 = month( ld_date1 )
li_y1 = year( ld_date1 )

li_d2 = day( ld_date1 ) + 1
li_m2 = month( ld_date1 )
li_y2 = year( ld_date1 )

ld_date2 = date( li_y2, li_m2, li_d2 )

return( ld_date2 )


end function
```

Function: f_global_replace
Library: d:\projects\nwire\client\v1-0b1\aiconcf.pbl
Date: 7/6/95 Time: 11:03:11

Page: 1

```
Function     :  f_global_replace
Return Type  :  string
Arguments    :
                     string                  source
                     string                  look_for
                     string                  replace_with
End of Arguments

/*
A String Occurrence Search and Replace Routine

The following code demonstrates a string occurrence search and replace routine.

This routine works generically for any string. For example,
if old_str = "red" and new_str = "green", all occurrences of
 "red" inside of mystring will be replaced with "green".
*/
int start_pos=1,len_look_for
len_look_for = len(look_for)

//find the first occurrence of look_for ...
start_pos = Pos(source,look_for,start_pos)

//only enter the loop if you find whats in look_for

DO WHILE start_pos > 0
   //replace look_for with replace_with ...
   source = Replace(source,start_pos,Len_look_for,replace_with)
   //find the next occurrence of look_for
   start_pos = Pos(source,look_for,start_pos+Len(replace_with))
LOOP
return source


end function
```

```
Function:  f_sendfile                                                  Page: 1
Library: d:\projects\nwire\client\v1-0p1\aicontf.pbl
Date: 7/6/95     Time: 11:03:11


Function      :  f_sendfile
Return Type   :  none
Arguments     :
                         string                  filename
                         string                  phonenum
End of Arguments

string      ls_exec_command

ls_exec_command  = "aicont /f" + &
                            TRIM(filename) + " /n" + TRIM(phonenum)

//messagebox("File Transfer Command",ls_exec_command )

run (ls_exec_command)

end subroutine
```

```
Function: f_syquest_transfer                                          Page: 1
Library: d:\projects\nwire\client\v1-0b1\aiconcf.pbl
Date: 7/6/95    Time: 11:03:11


Function      :  f_syquest_transfer
Return Type   :  none
Arguments     :
                        string                    filename
End of Arguments

//
//
//

   messagebox( "SyQuest Cartridge Transfer", "Insert SyQuest Cartridfge" +&
               " into drive and copy the file: " + &
               filename + " to it and deliver to your local" +&
               "NightRider Corporate Reprographics Office or" +&
               " call your NightRider Account Manager", exclamation! )

end subroutine
```

```
Function:  f_tape_transfer                                         Page:  1
Library: d:\projects\nwire\client\v1-0b1\aiconcf.pbl
Date: 7/6/95    Time: 11:03:11



Function      :  f_tape_transfer
Return Type   :  none
Arguments     :
                        string                        filename
End of Arguments

//
//
//

   messagebox( "Tape Backup Transfer", "Load your tape backup" + &
               " software and copy the file: " + &
               filename + " to it and deliver to your local" +&
               "NightRider Corporate Reprographics Office or" +&
               " call your NightRider Account Manager", exclamation! )

end subroutine
```

```
Structure:  nv_diskfile
Library: d:\projects\nwire\client\v1-0b1\aiconcu.pbl                    Page: 1
Date: 7/6/95    Time: 11:03:11


forward
    global type nv_diskfile from nonvisualobject
end type
end forward


global type nv_diskfile from nonvisualobject
end type


global nv_diskfile nv_diskfile


type prototypes
//Disk, file and environment Windows API functions
FUNCTION string DF_getenv( string  _Name ) LIBRARY "diskfile.dll"
FUNCTION int DF_MkDir( string _DirName ) LIBRARY "diskfile.dll"
FUNCTION int DF_RmDir(  string _DirName ) LIBRARY "diskfile.dll"
FUNCTION int DF_ChDir( string _DirName ) LIBRARY "diskfile.dll"
FUNCTION int DF_DeleteFile(  string _FileName )  LIBRARY "diskfile.dll"
FUNCTION string DF_TimeFile(  string _FileName )  LIBRARY "diskfile.dll"
FUNCTION long DF_SizeFile(  string _FileName )  LIBRARY "diskfile.dll"
FUNCTION int DF_RenameFile(string  _OldName, ref string _NewName )  LIBRARY "diskfile.dll"
FUNCTION int DF_CopyFile(string  _Source, string _Target )  LIBRARY "diskfile.dll"
FUNCTION int DF_ChDrive( int _Drive )  LIBRARY "diskfile.dll"
FUNCTION int DF_GetDrive(  ) LIBRARY "diskfile.dll"
FUNCTION string DF_GetDirectory( )  LIBRARY "diskfile.dll"
FUNCTION int DF_DiskSpace( int _Drive, ref long _Space ) LIBRARY "diskfile.dll"
FUNCTION int DF_DiskFreeSpace( int _Drive, ref long _FreeSpace ) LIBRARY "diskfile.dll"
FUNCTION int DF_IsFloppy( int _Drive ) LIBRARY "diskfile.dll"

end prototypes


forward prototypes
public function int fnv_change_dir (string a_s_directory)
public function int fnv_change_drive (char a_c_drive)
public function int fnv_copy_file (string a_s_source, string a_s_target)
public function int fnv_delete_file (string a_s_filename)
public function long fnv_disk_free_space (char a_c_drive)
public function long fnv_disk_space (char a_c_drive)
public function string fnv_get_directory ()
public function char fnv_get_drive ()
public function string fnv_get_env (string a_s_name)
public function int fnv_is_floppy (char a_c_drive)
public function int fnv_make_dir (string a_s_directory)
public function int fnv_remove_dir (string a_s_directory)
public function int fnv_rename_file (string a_s_original, string a_s_new)
public function long fnv_size_file (string a_s_filename)
public function string fnv_time_file (string a_s_filename)
end prototypes


public function int fnv_change_dir (string a_s_directory);RETURN (DF_chdir (a_s_directory))
end function


public function int fnv_change_drive (char a_c_drive);RETURN DF_chdrive (Asc (a_c_drive) - 64)
```

```
end function

public function int fnv_copy_file (string a_s_source, string a_s_target);RETURN (DF_copyfile (a_s_source, a_s_target))
end function

public function int fnv_delete_file (string a_s_filename);RETURN (DF_deletefile (a_s_filename))
end function

public function long fnv_disk_free_space (char a_c_drive);long l_freespace

DF_diskfreespace (Asc (a_c_drive) - 64, l_freespace)
RETURN (l_freespace)
end function

public function long fnv_disk_space (char a_c_drive);long l_space

DF_diskspace (Asc (a_c_drive) - 64, l_space)
RETURN (l_space)
end function

public function string fnv_get_directory ();RETURN (DF_getdirectory ())
end function

public function char fnv_get_drive ();RETURN Char (DF_getdrive () + 64)
end function

public function string fnv_get_env (string a_s_name);RETURN DF_getenv (a_s_name)
end function

public function int fnv_is_floppy (char a_c_drive);RETURN DF_isfloppy (Asc (a_c_drive) - 65)
end function

public function int fnv_make_dir (string a_s_directory);RETURN (DF_mkdir (a_s_directory))
end function

public function int fnv_remove_dir (string a_s_directory);RETURN (DF_rmdir (a_s_directory))
end function

public function int fnv_rename_file (string a_s_original, string a_s_new);RETURN (DF_renamefile (a_s_original, a_s_new))
end function

public function long fnv_size_file (string a_s_filename);RETURN (DF_sizefile (a_s_filename))
end function
```

```
public function string fnv_time_file (string a_s_filename);RETURN (DF_timefile (a_s_fil
```

```
end function

on nv_diskfile.create
TriggerEvent( this, "constructor" )
end on

on nv_diskfile.destroy
TriggerEvent( this, "destructor" )
end on
```

I claim:

1. A computer-aided method for producing at a remote high speed printing facility a document file created in digital format at a computer terminal, the method comprising in combination, the steps of:

reformatting the document file at the computer terminal in a cross-platform format with printer resources embedded therein;

preparing an electronic work order file at the terminal by displaying a work order form and entering in the work order a description of the required work, general and account information, and paper and stock required;

combining the reformatted document and work order files into a single electronic folder;

transmitting the combined folder to the printing facility;

separating the reformatted document and work order files;

entering the reformatted document file into a high speed printer; and initiating operation of the printer according to the work order.

2. A computer-aided method according to claim 1 wherein the printer resources embedded in the reformatting step include fonts and graphics.

3. A computer-aided method according to claim 1 further comprising the step of transmitting the document and work order file at the printing facility to a data storage center.

4. A computer-aided method according to claim 1 wherein the combined folder is delivered by diskette to the printing facility.

5. A computer-aided method according to claim 1 wherein the combined folder is transmitted by wide-area network to the printing facility.

6. A computer-aided method for producing at a remote high speed printing facility a document file created in digital format at a computer terminal, the method comprising in combination, the steps of:

reformatting the document file at the computer terminal in a cross-platform format with printer resources embedded therein;

preparing an electronic work order file at the terminal;

translating the work order file into an external data object code:

combining the reformatted document and translated work order files into a single electronic folder;

transmitting the combined folder to the printing facility;

separating the reformatted document and work order files;

entering the reformatted document file into a high speed printer; and initiating operation of the printer according to the work order.

7. A computer-aided method for producing at a remote high speed printing facility a document file created in digital format at a computer terminal, the method comprising in combination, the steps of:

reformatting the document file at the computer terminal in a cross-platform format with printer resources embedded therein;

preparing an electronic work order file at the terminal;

combining the reformatted document and work order files into a single electronic folder;

transmitting the combined folder to the printing facility;

separating the reformatted document and work order files and extracting the reformatted document and work order files into a work order database and a job database, respectively;

entering the reformatted document file into a high speed printer; and initiating operation of the printer according to the work order.

8. A computer-aided method for producing at a remote high speed printing facility a document file created in digital format at a computer terminal, the method comprising in combination, the steps of:

reformatting the document file at the computer terminal in a cross-platform format with printer resources embedded therein;

preparing an electronic work order file at the terminal;

combining the reformatted document and work order files into a single electronic folder;

creating an audit file at the terminal for checking integrity of the reformatted document;

transmitting the combined folder to the printing facility;

separating the reformatted document and the work order files;

entering the reformatted document file into a high speed printer; and initiating operation of the printer according to the work order.

9. A computer-aided method according to claim 8 in which the document file is compressed at the computer terminal and the combined folder is decompressed at the printing facility, and further comprising the step of executing the audit file at the printing facility before decompressing the folder.

10. A computer-aided method according to claim 9 further comprising executing the audit file at the terminal before transmitting the combined folder to the printing facility.

11. A computer-aided document printing management system for producing at a printing facility document files created in a digital format at a computer terminal, comprising the steps of:

formatting the document files at the terminal in a cross-platform format with embedded resources of fonts and graphics;

displaying a work order form at the terminal;

entering in the work order a description of the work required, general and account information, and paper and stock required;

combining the formatted document and work order files into a single electronic folder, the work order being translated to external data object code;

transmitting the combined folder to the printing facility;

separating the formatted document and work order files into a job database and a work order database, respectively;

entering the formatted document file into a high speed printer; and initiating operation of the printer according to the work order.

12. A computer-aided document printing management system according to claim 11 further comprising the steps of creating an audit file at the terminal and using the audit file to check the integrity of the reformatted document.

13. A computer-aided document printing management system according to claim 11 further comprising the step of creating an audit file at the terminal for checking integrity of the reformatted document.

14. A computer-aided document printing management system according to claim 11 further comprising the step of executing the audit file for checking the integrity of the combined folder before transmission thereof to the printing facility.

15. A computer-aided document printing management system according to claim 11 further comprising the step of executing the audit file at the printing facility for checking the integrity of the combined folder.

16. A computer-aided document printing management system according to claim 11 further comprising the step of transmitting the document and work order file at the printing facility to a data storage center.

17. A computer-aided method for producing at a remote high speed printing facility document files created in digital format at computer terminals at locations remote from the printing facility, the method comprising in combination, the steps of:

reformatting the document files at the computer terminals in a cross-platform format with printer resources embedded therein;

creating and executing audit files at the terminals, for checking the integrity of the reformatted documents;

after executing said audit files, transmitting the reformatted document files to the printing facility over a wide area network;

entering the reformatted document files into a high speed printer; and printing documents from the document files, using the printer.

18. A computer-aided method according to claim 17 in which the document files are compressed at the computer terminals and decompressed at the printing facility, and further comprising executing the audit files at the printing facility before decompressing the document files.

* * * * *